US005835911A

United States Patent [19]

Nakagawa et al.

[11] Patent Number: 5,835,911

[45] Date of Patent: Nov. 10, 1998

[54] SOFTWARE DISTRIBUTION AND MAINTENANCE SYSTEM AND METHOD

[75] Inventors: Toru Nakagawa; Yuji Takada, both of Kawasaki, Japan

[73] Assignee: Fujitsu Limited, Kanagawa, Japan

[21] Appl. No.: 517,133

[22] Filed: Aug. 21, 1995

Related U.S. Application Data

[63] Continuation-in-part of Ser. No. 385,460, Feb. 8, 1995, abandoned.

[30] Foreign Application Priority Data

| | | | |
|---|---|---|---|
| Feb. 8, 1995 | [JP] | Japan | 06-014706 |
| Feb. 8, 1995 | [JP] | Japan | 06-014710 |
| Aug. 17, 1995 | [JP] | Japan | 7-233422 |

[51] Int. Cl.[6] .......... G06F 17/30

[52] U.S. Cl. .......... 707/203; 707/3; 707/10; 395/200.33; 395/200.51

[58] Field of Search .......... 395/608, 610, 395/619, 500, 200.09, 700, 200.33, 200.51; 364/401, 300; 707/203, 10, 3

[56] References Cited

U.S. PATENT DOCUMENTS

| | | | |
|---|---|---|---|
| 4,558,413 | 12/1985 | Schmidt et al. | 364/300 |
| 5,247,683 | 9/1993 | Holmes et al. | 395/700 |
| 5,390,314 | 2/1995 | Swanson | 395/500 |
| 5,526,257 | 6/1996 | Lerner | 364/401 |
| 5,544,320 | 8/1996 | Konrad | 395/200.09 |

*Primary Examiner*—Thomas G. Black
*Assistant Examiner*—Cheryl Lewis
*Attorney, Agent, or Firm*—Staas & Halsey

[57] ABSTRACT

A number of sets of software may be systematically distributed and maintained via a network connecting many vendors and users of client/server software. A client program in a user computer detects when software subject to maintenance is activated and transmits an inquiry over the network to the software vendor's computer for information on the current version of the software. The server program compares data in the inquiry with data relating to the latest version of the software and returns update instruction information and updated software if appropriate. The client program automatically updates the software to the latest version according to the update instruction information when it is received. The client program can also send inquires at predetermined times, or in response to a user command. The inquiry can include a request for purchase information in which case the server checks qualifications of the user, processes the inquiry according to vendor management data and returns the requested software, if appropriate. Other inquiries can also be made in response to user commands or automatically, e.g., to obtain information on the most recent version and transmission of data from client to server in response to an abnormal termination of client software.

94 Claims, 24 Drawing Sheets

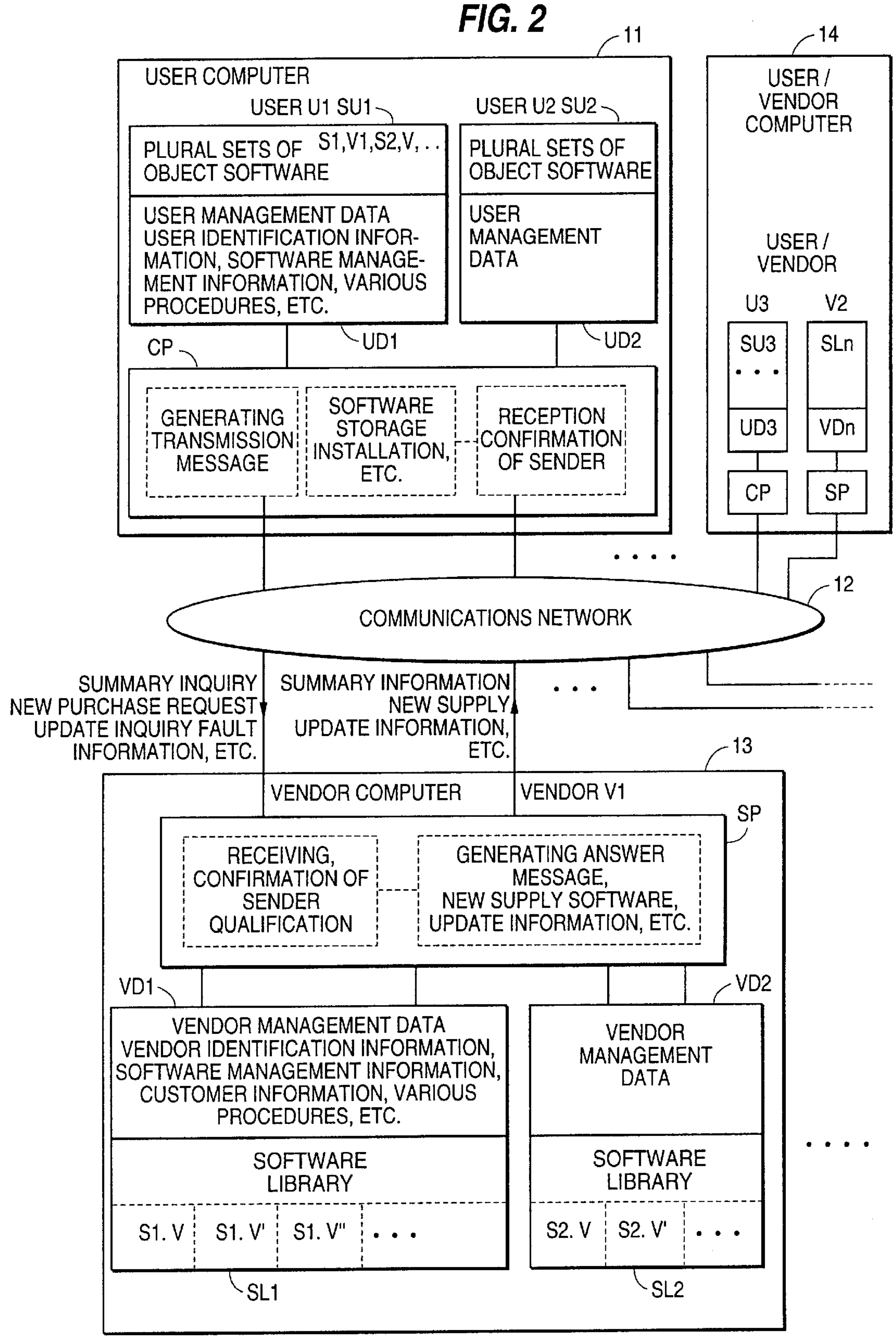
FIG. 2
11
USER COMPUTER
USER U1 SU1
S1,V1,S2,V, . .
PLURAL SETS OF OBJECT SOFTWARE
USER MANAGEMENT DATA USER IDENTIFICATION INFORMATION, SOFTWARE MANAGEMENT INFORMATION, VARIOUS PROCEDURES, ETC.
UD1
USER U2 SU2
PLURAL SETS OF OBJECT SOFTWARE
USER MANAGEMENT DATA
UD2
CP
GENERATING TRANSMISSION MESSAGE
SOFTWARE STORAGE INSTALLATION, ETC.
RECEPTION CONFIRMATION OF SENDER
14
USER / VENDOR COMPUTER
USER / VENDOR
U3
V2
SU3
SLn
UD3
VDn
CP
SP
12
COMMUNICATIONS NETWORK
SUMMARY INQUIRY NEW PURCHASE REQUEST UPDATE INQUIRY FAULT INFORMATION, ETC.
SUMMARY INFORMATION NEW SUPPLY UPDATE INFORMATION, ETC.
13
VENDOR COMPUTER
VENDOR V1
SP
RECEIVING, CONFIRMATION OF SENDER QUALIFICATION
GENERATING ANSWER MESSAGE, NEW SUPPLY SOFTWARE, UPDATE INFORMATION, ETC.
VD1
VENDOR MANAGEMENT DATA VENDOR IDENTIFICATION INFORMATION, SOFTWARE MANAGEMENT INFORMATION, CUSTOMER INFORMATION, VARIOUS PROCEDURES, ETC.
SOFTWARE LIBRARY
S1. V
S1. V'
S1. V"
SL1
VD2
VENDOR MANAGEMENT DATA
SOFTWARE LIBRARY
S2. V
S2. V'
SL2

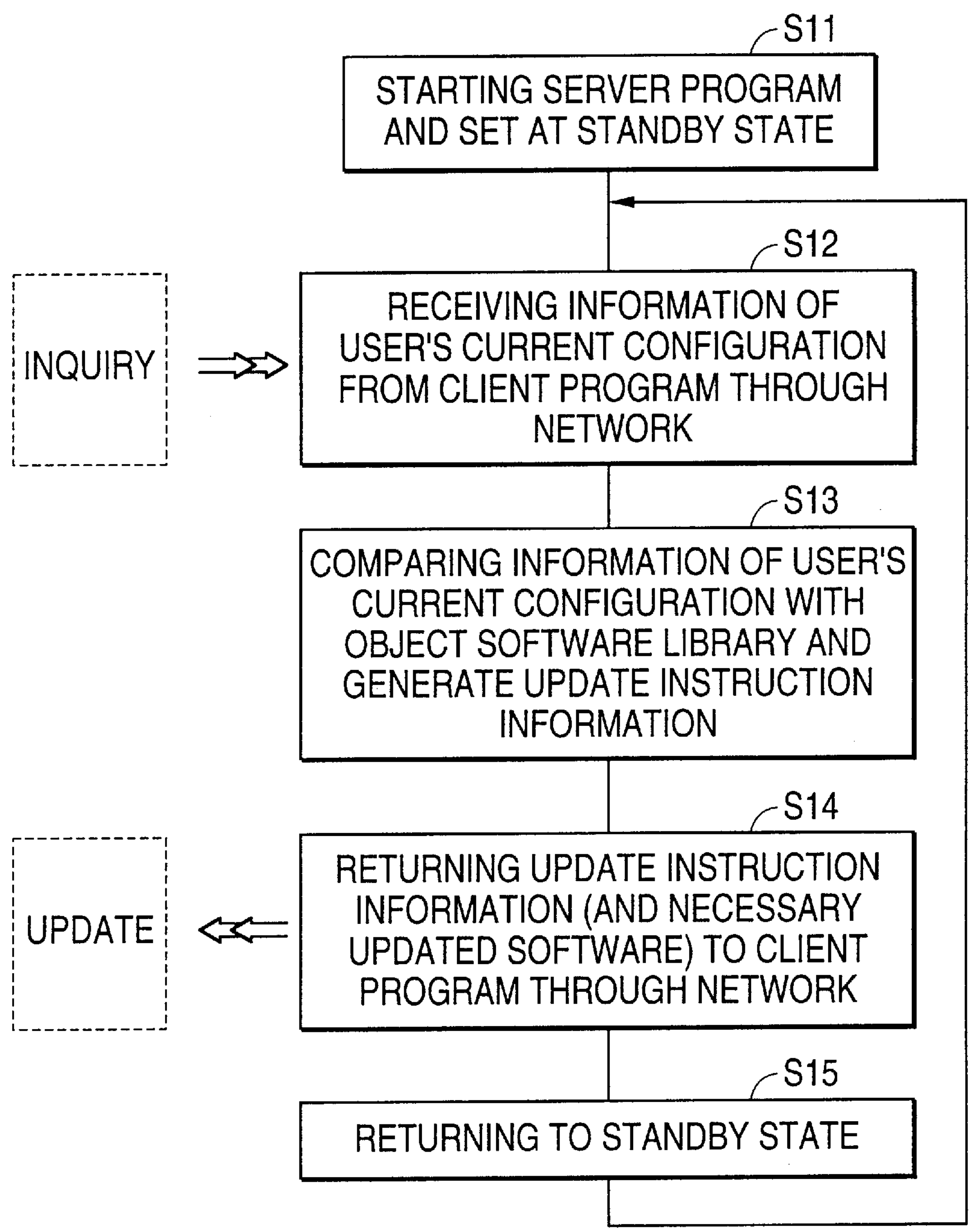
FIG. 5
S11
STARTING SERVER PROGRAM AND SET AT STANDBY STATE
S12
INQUIRY
RECEIVING INFORMATION OF USER'S CURRENT CONFIGURATION FROM CLIENT PROGRAM THROUGH NETWORK
S13
COMPARING INFORMATION OF USER'S CURRENT CONFIGURATION WITH OBJECT SOFTWARE LIBRARY AND GENERATE UPDATE INSTRUCTION INFORMATION
S14
UPDATE
RETURNING UPDATE INSTRUCTION INFORMATION (AND NECESSARY UPDATED SOFTWARE) TO CLIENT PROGRAM THROUGH NETWORK
S15
RETURNING TO STANDBY STATE NETWORK
REQUEST FOR DISTRIBUTION /MAINTENANCE (SENDING)
DISTRIBUTION /MAINTENANCE (RECEIVING)
REQUEST FOR DISTRIBUTION /MAINTENANCE (RECEIVING)
DISTRIBUTING /MAINTAINING (ANSWERING)
CP
SP
SU1
SU3
SL10
SL11
U10 (USER/VENDOR) V10
(CLIENT PROGRAM CP)
(OBJECT SOFTWARE) SU
(SERVER PROGRAM SP)
(VENDOR SOFTWARE LIBRARY SL)
(USER/VENDOR COMPUTER) 38

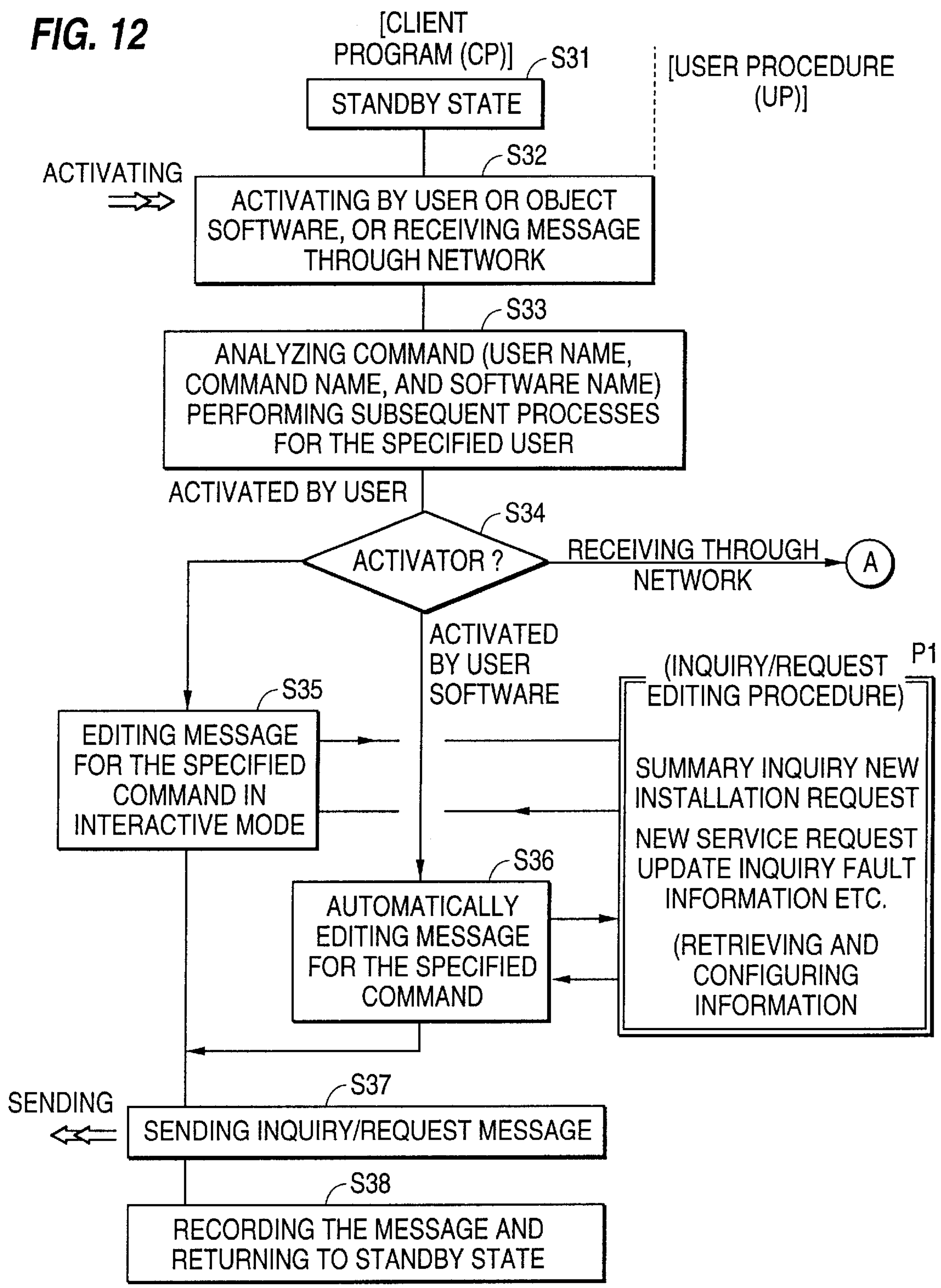
FIG. 12
[CLIENT PROGRAM (CP)]
S31
[USER PROCEDURE (UP)]
STANDBY STATE
S32
ACTIVATING
ACTIVATING BY USER OR OBJECT SOFTWARE, OR RECEIVING MESSAGE THROUGH NETWORK
S33
ANALYZING COMMAND (USER NAME, COMMAND NAME, AND SOFTWARE NAME) PERFORMING SUBSEQUENT PROCESSES FOR THE SPECIFIED USER
ACTIVATED BY USER
S34
ACTIVATOR ?
RECEIVING THROUGH NETWORK
A
ACTIVATED BY USER SOFTWARE
(INQUIRY/REQUEST EDITING PROCEDURE)
P1
S35
EDITING MESSAGE FOR THE SPECIFIED COMMAND IN INTERACTIVE MODE
SUMMARY INQUIRY NEW INSTALLATION REQUEST
NEW SERVICE REQUEST UPDATE INQUIRY FAULT INFORMATION ETC.
(RETRIEVING AND CONFIGURING INFORMATION
S36
AUTOMATICALLY EDITING MESSAGE FOR THE SPECIFIED COMMAND
S37
SENDING
SENDING INQUIRY/REQUEST MESSAGE
S38
RECORDING THE MESSAGE AND RETURNING TO STANDBY STATE

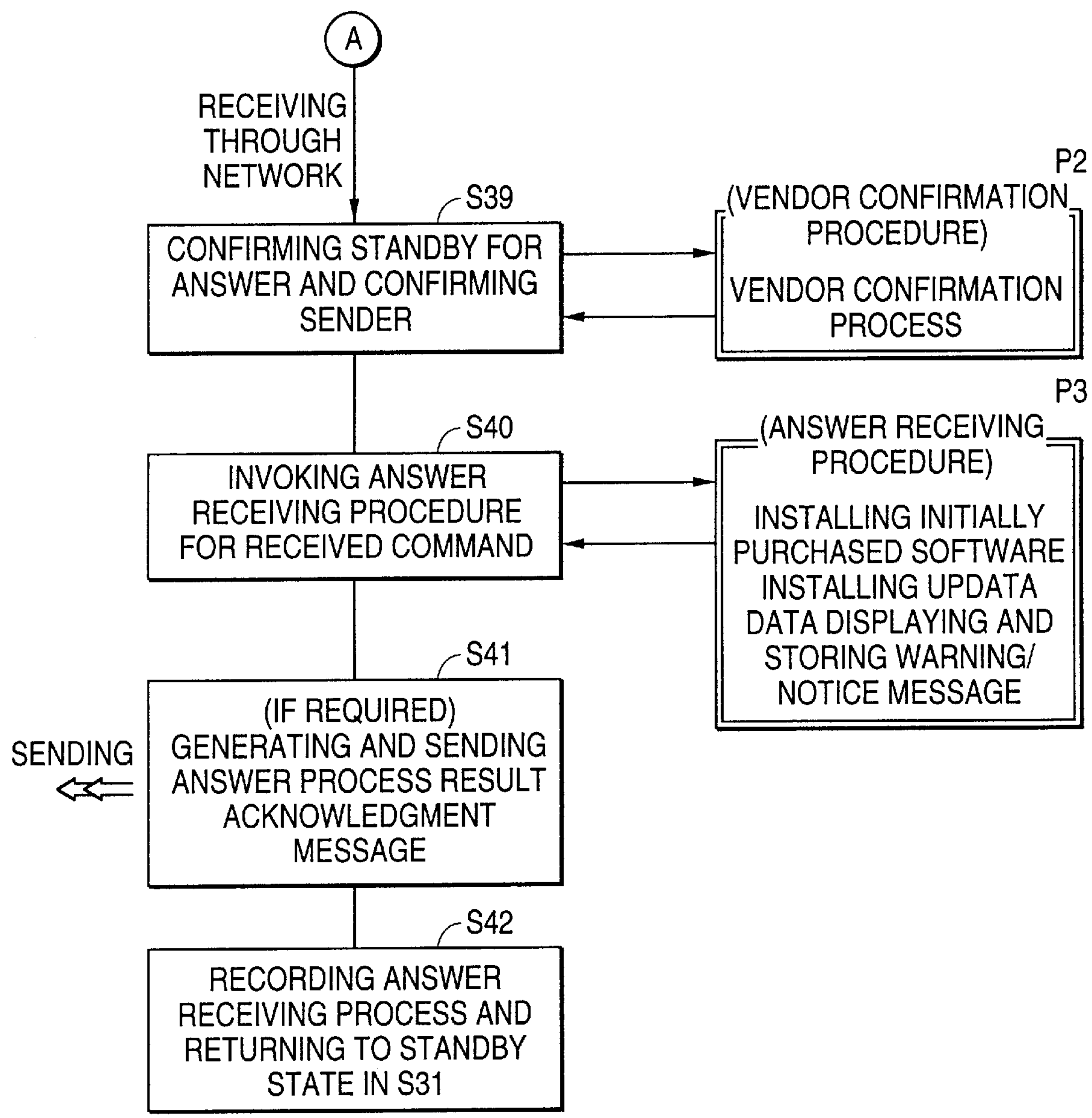
FIG. 13
A
RECEIVING THROUGH NETWORK
S39
CONFIRMING STANDBY FOR ANSWER AND CONFIRMING SENDER
P2
(VENDOR CONFIRMATION PROCEDURE)
VENDOR CONFIRMATION PROCESS
S40
INVOKING ANSWER RECEIVING PROCEDURE FOR RECEIVED COMMAND
P3
(ANSWER RECEIVING PROCEDURE)
INSTALLING INITIALLY PURCHASED SOFTWARE INSTALLING UPDATA DATA DISPLAYING AND STORING WARNING/ NOTICE MESSAGE
S41
SENDING
(IF REQUIRED) GENERATING AND SENDING ANSWER PROCESS RESULT ACKNOWLEDGMENT MESSAGE
S42
RECORDING ANSWER RECEIVING PROCESS AND RETURNING TO STANDBY STATE IN S31

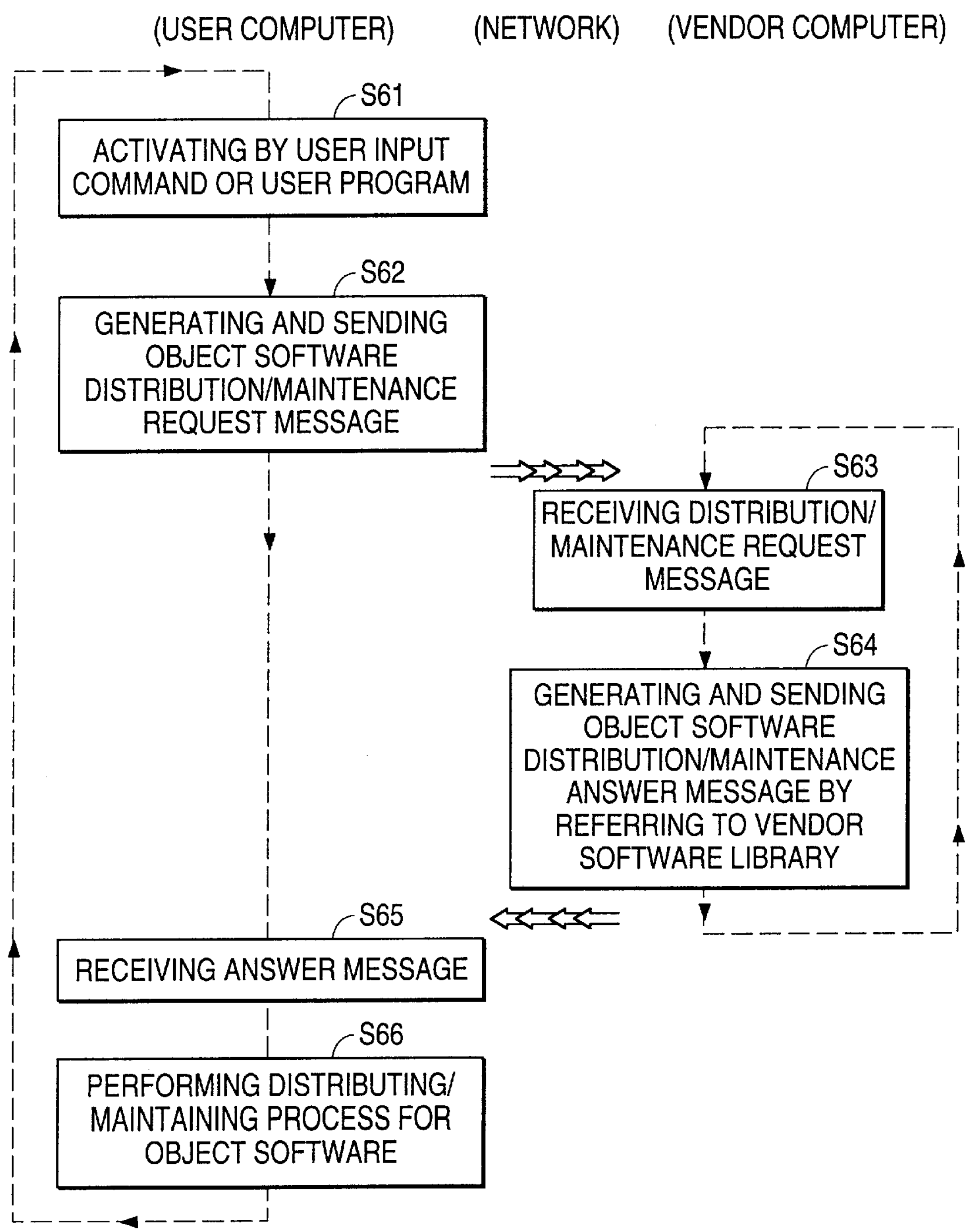
FIG. 16
(USER COMPUTER)
(NETWORK)
(VENDOR COMPUTER)
S61
ACTIVATING BY USER INPUT COMMAND OR USER PROGRAM
S62
GENERATING AND SENDING OBJECT SOFTWARE DISTRIBUTION/MAINTENANCE REQUEST MESSAGE
S63
RECEIVING DISTRIBUTION/ MAINTENANCE REQUEST MESSAGE
S64
GENERATING AND SENDING OBJECT SOFTWARE DISTRIBUTION/MAINTENANCE ANSWER MESSAGE BY REFERRING TO VENDOR SOFTWARE LIBRARY
S65
RECEIVING ANSWER MESSAGE
S66
PERFORMING DISTRIBUTING/ MAINTAINING PROCESS FOR OBJECT SOFTWARE

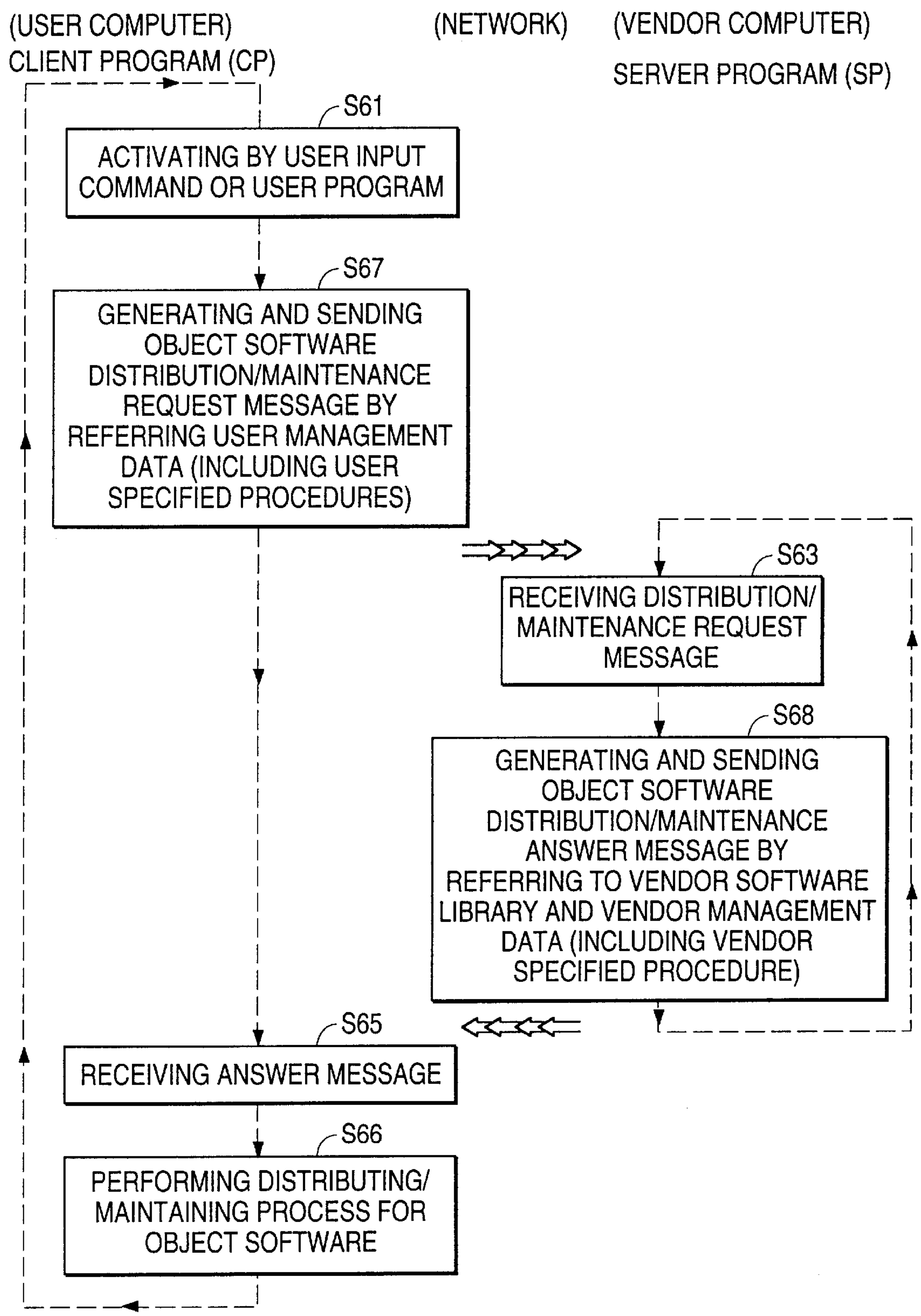
FIG. 17
(USER COMPUTER)
CLIENT PROGRAM (CP)
(NETWORK)
(VENDOR COMPUTER)
SERVER PROGRAM (SP)
S61
ACTIVATING BY USER INPUT COMMAND OR USER PROGRAM
S67
GENERATING AND SENDING OBJECT SOFTWARE DISTRIBUTION/MAINTENANCE REQUEST MESSAGE BY REFERRING USER MANAGEMENT DATA (INCLUDING USER SPECIFIED PROCEDURES)
S63
RECEIVING DISTRIBUTION/ MAINTENANCE REQUEST MESSAGE
S68
GENERATING AND SENDING OBJECT SOFTWARE DISTRIBUTION/MAINTENANCE ANSWER MESSAGE BY REFERRING TO VENDOR SOFTWARE LIBRARY AND VENDOR MANAGEMENT DATA (INCLUDING VENDOR SPECIFIED PROCEDURE)
S65
RECEIVING ANSWER MESSAGE
S66
PERFORMING DISTRIBUTING/ MAINTAINING PROCESS FOR OBJECT SOFTWARE

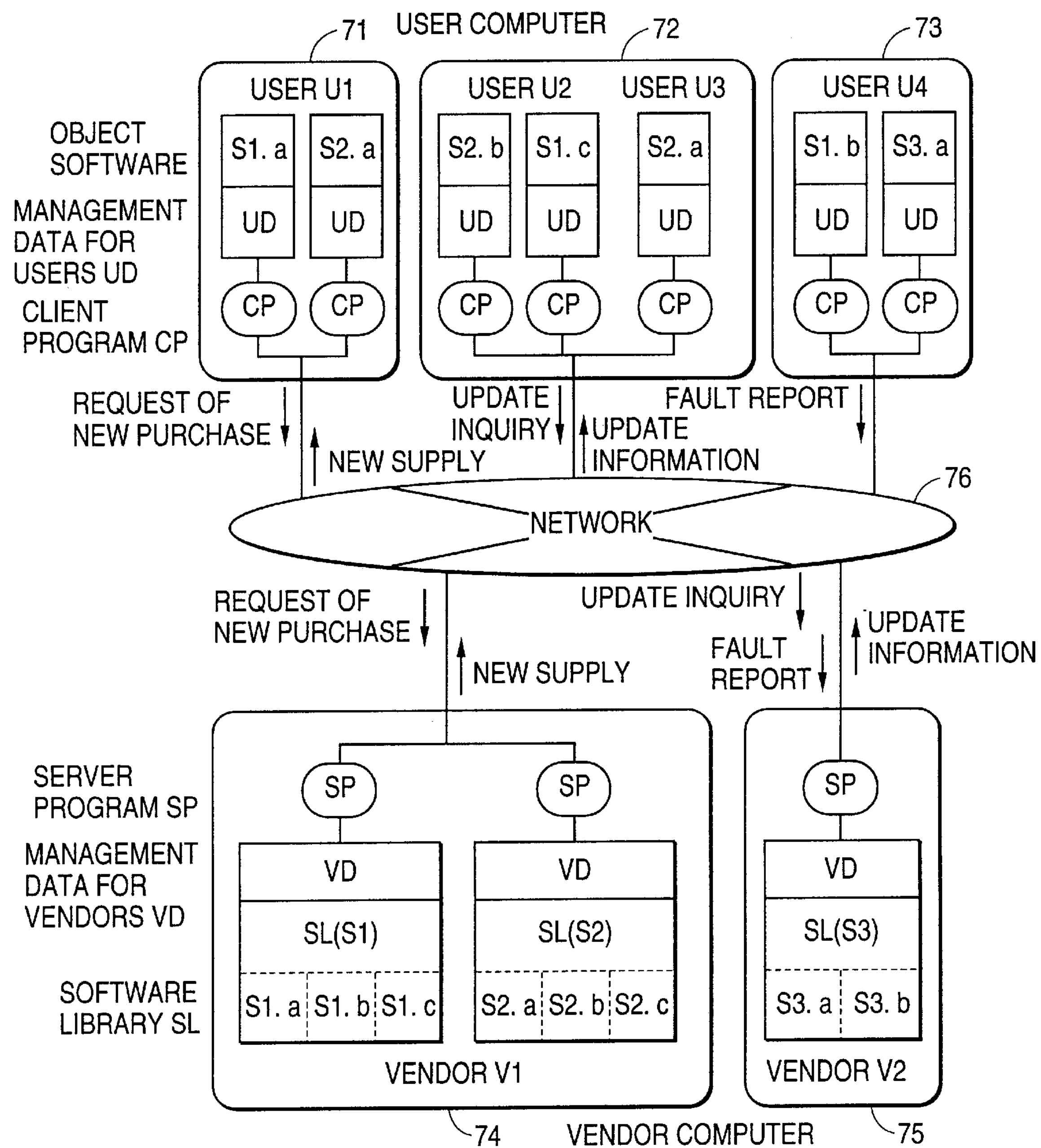
FIG. 18
USER COMPUTER
71
72
73
USER U1
USER U2
USER U3
USER U4
OBJECT SOFTWARE
S1. a
S2. a
S2. b
S1. c
S2. a
S1. b
S3. a
MANAGEMENT DATA FOR USERS UD
UD
CLIENT PROGRAM CP
CP
REQUEST OF NEW PURCHASE
NEW SUPPLY
UPDATE INQUIRY
UPDATE INFORMATION
FAULT REPORT
76
NETWORK
REQUEST OF NEW PURCHASE
NEW SUPPLY
UPDATE INQUIRY
FAULT REPORT
UPDATE INFORMATION
SERVER PROGRAM SP
SP
MANAGEMENT DATA FOR VENDORS VD
VD
SL(S1)
SL(S2)
SL(S3)
SOFTWARE LIBRARY SL
S1. a
S1. b
S1. c
S2. a
S2. b
S2. c
S3. a
S3. b
VENDOR V1
VENDOR V2
74
VENDOR COMPUTER
75

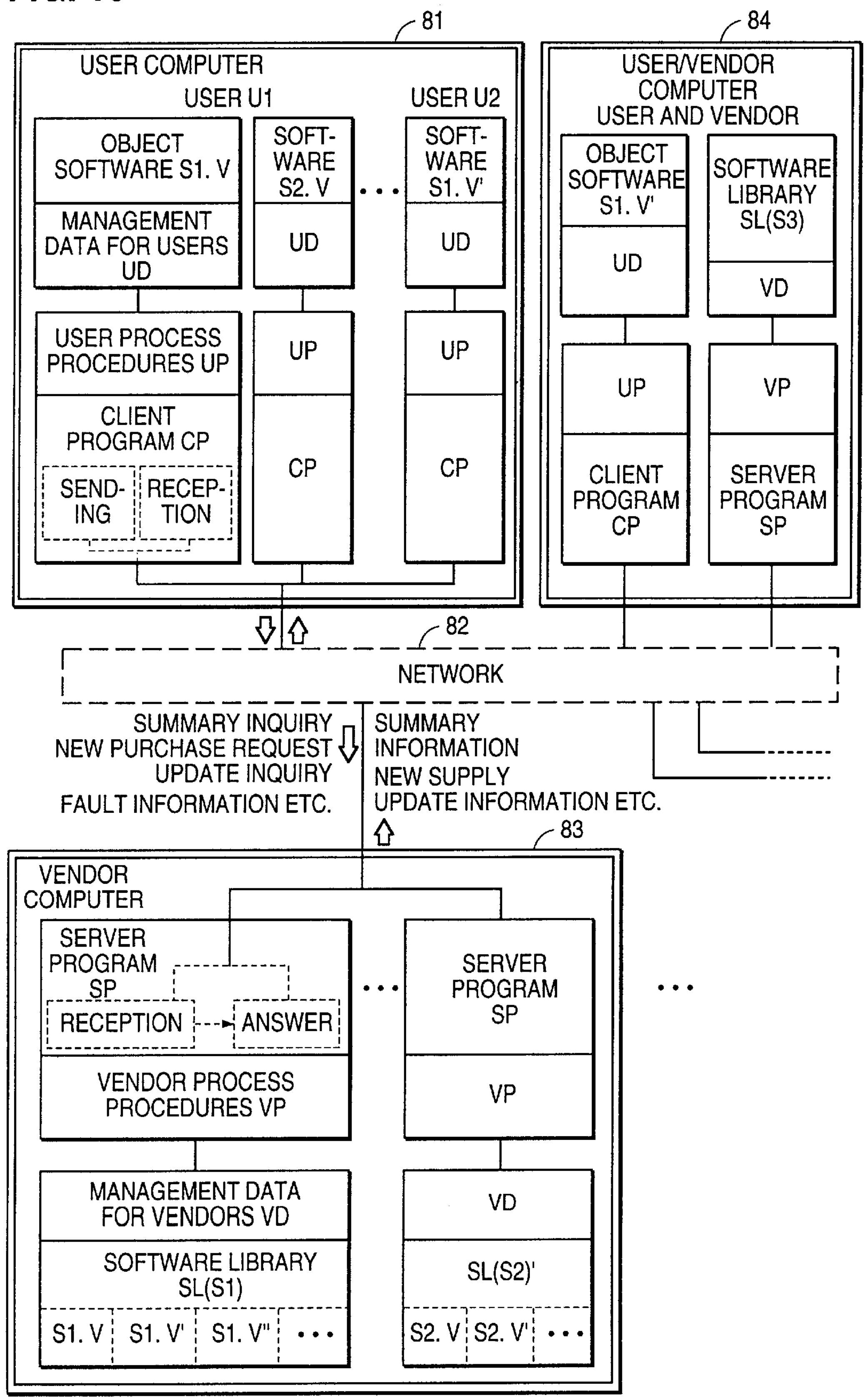
FIG. 19
81
USER COMPUTER
USER U1
USER U2
OBJECT SOFTWARE S1. V
SOFT-WARE S2. V
SOFT-WARE S1. V'
MANAGEMENT DATA FOR USERS UD
UD
UD
USER PROCESS PROCEDURES UP
UP
UP
CLIENT PROGRAM CP
SEND-ING
RECEP-TION
CP
CP
84
USER/VENDOR COMPUTER
USER AND VENDOR
OBJECT SOFTWARE S1. V'
SOFTWARE LIBRARY SL(S3)
UD
VD
UP
VP
CLIENT PROGRAM CP
SERVER PROGRAM SP
82
NETWORK
SUMMARY INQUIRY
NEW PURCHASE REQUEST
UPDATE INQUIRY
FAULT INFORMATION ETC.
SUMMARY INFORMATION
NEW SUPPLY
UPDATE INFORMATION ETC.
83
VENDOR COMPUTER
SERVER PROGRAM SP
RECEPTION
ANSWER
SERVER PROGRAM SP
VENDOR PROCESS PROCEDURES VP
VP
MANAGEMENT DATA FOR VENDORS VD
VD
SOFTWARE LIBRARY SL(S1)
SL(S2)'
S1. V
S1. V'
S1. V"
S2. V
S2. V'

FIG. 21

| CLASSIFICATION | COMMAND NAME | COMMAND MEANINGS |
|---|---|---|
| UPWARD MESSAGE | Infom | INQUIRY ABOUT SUMMARY INFORMATION, NEW SERVICES, PURCHASE METHOD ETC. |
| | WantNew | REQUEST OF NEW PURCHASE |
| | WantRenew | REQUEST OF ADDITIONAL PURCHASE OF NEW SERVICES |
| | CheckUpdate | REQUEST TO SEND AN UPDATE INQUIRY AND UPDATED SOFTWARE INFORMATION |
| | BugReport | AUTOMATIC REPORT OF FAULT INFORMATION DURING EXECUTION |
| | Comment | COMMENT, COMPLAINT, OPINION, QUESTION FROM USER |
| | IntallAck | REPORT OF PROPER SOFTWARE ACQUISITION/INSTALLATION |
| | IntallTrouble | ERROR REPORT WHEN INSTALLING PURCHASED SOFTWARE |
| | FinishUse | REPORT OF TERMINATION |
| DOWNWARD MESSAGE | ReplyInfo | ANSWERS SUCH AS SUMMARY INFORMATION, NEW SERVICES, PURCHASE METHOD ETC. |
| | NewInstall | NEW SOFTWARE SUPPLY |
| | Renew | (ADDITIONAL) SUPPLY OF NEW SOFTWARE SERVICES |
| | NoUpdate | ANSWER OF NO UPDATE |
| | Update | SENDING UPDATED SOFTWARE INFORMATION |
| | Answer | ANSWER TO USER'S COMMENT, COMPLAINT, OPINION, AND QUESTION |
| | BugAck | ANSWER OF RECEIVING AUTOMATIC REPORT OF FAULT INFORMATION |
| | Notice | IMPORTANT REPORT TO USER |
| | Warning | WARNING TO USER |
| | Erase | REMOVAL OF PROGRAM SENT BY USER AT TERMINATION |

FIG. 22

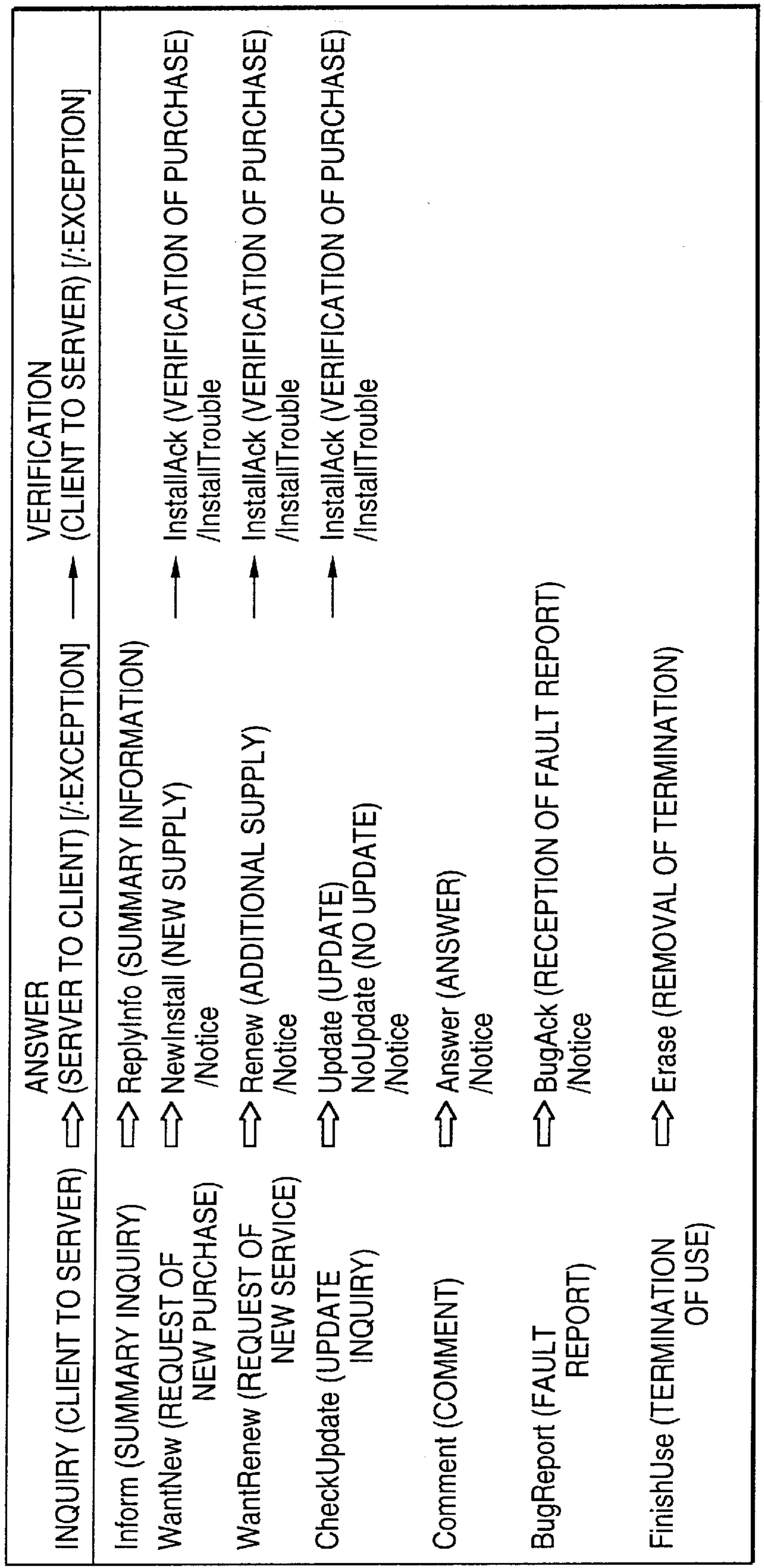

| INQUIRY (CLIENT TO SERVER) | | ANSWER (SERVER TO CLIENT) [/:EXCEPTION] | | VERIFICATION (CLIENT TO SERVER) [/:EXCEPTION] |
|---|---|---|---|---|
| Inform (SUMMARY INQUIRY) | ⇨ | ReplyInfo (SUMMARY INFORMATION) | | |
| WantNew (REQUEST OF NEW PURCHASE) | ⇨ | NewInstall (NEW SUPPLY) /Notice | → | InstallAck (VERIFICATION OF PURCHASE) /InstallTrouble |
| WantRenew (REQUEST OF NEW SERVICE) | ⇨ | Renew (ADDITIONAL SUPPLY) /Notice | → | InstallAck (VERIFICATION OF PURCHASE) /InstallTrouble |
| CheckUpdate (UPDATE INQUIRY) | ⇨ | Update (UPDATE) NoUpdate (NO UPDATE) /Notice | → | InstallAck (VERIFICATION OF PURCHASE) /InstallTrouble |
| Comment (COMMENT) | ⇨ | Answer (ANSWER) /Notice | | |
| BugReport (FAULT REPORT) | ⇨ | BugAck (RECEPTION OF FAULT REPORT) /Notice | | |
| FinishUse (TERMINATION OF USE) | ⇨ | Erase (REMOVAL OF TERMINATION) | | |

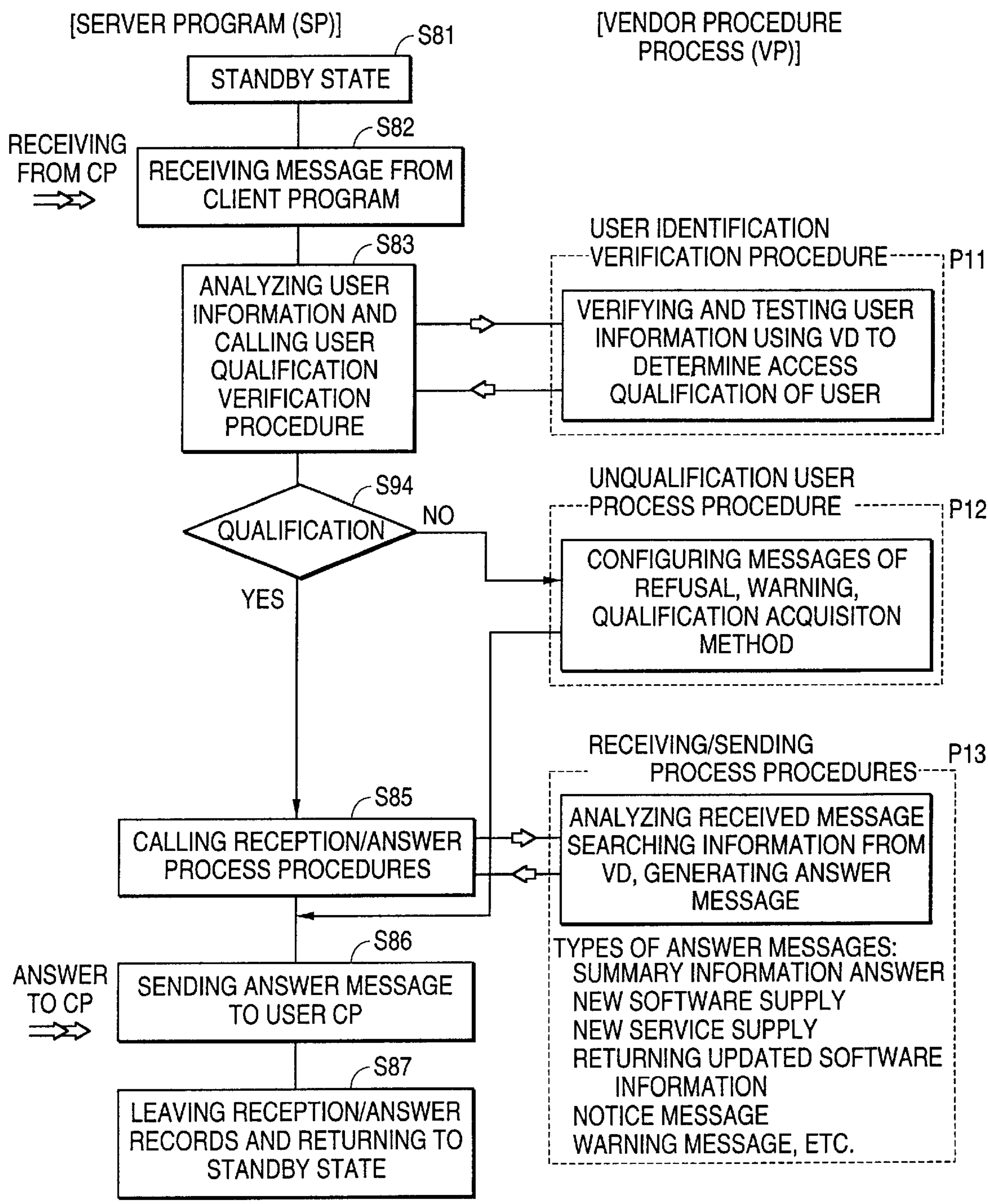
FIG. 24
[SERVER PROGRAM (SP)]
[VENDOR PROCEDURE PROCESS (VP)]
S81
STANDBY STATE
S82
RECEIVING FROM CP
RECEIVING MESSAGE FROM CLIENT PROGRAM
S83
ANALYZING USER INFORMATION AND CALLING USER QUALIFICATION VERIFICATION PROCEDURE
USER IDENTIFICATION VERIFICATION PROCEDURE
P11
VERIFYING AND TESTING USER INFORMATION USING VD TO DETERMINE ACCESS QUALIFICATION OF USER
S94
QUALIFICATION
NO
YES
UNQUALIFICATION USER PROCESS PROCEDURE
P12
CONFIGURING MESSAGES OF REFUSAL, WARNING, QUALIFICATION ACQUISITON METHOD
RECEIVING/SENDING PROCESS PROCEDURES
P13
S85
CALLING RECEPTION/ANSWER PROCESS PROCEDURES
ANALYZING RECEIVED MESSAGE SEARCHING INFORMATION FROM VD, GENERATING ANSWER MESSAGE
TYPES OF ANSWER MESSAGES:
SUMMARY INFORMATION ANSWER
NEW SOFTWARE SUPPLY
NEW SERVICE SUPPLY
RETURNING UPDATED SOFTWARE INFORMATION
NOTICE MESSAGE
WARNING MESSAGE, ETC.
S86
ANSWER TO CP
SENDING ANSWER MESSAGE TO USER CP
S87
LEAVING RECEPTION/ANSWER RECORDS AND RETURNING TO STANDBY STATE

SOFTWARE DISTRIBUTION AND MAINTENANCE SYSTEM AND METHOD

CROSS REFERENCE TO RELATED APPLICATION

This application is a continuation-in-part application of U.S. patent application Ser. No. 08/385,460 filed an Feb. 8, 1995, now abandoned.

BACKGROUND OF THE INVENTION

1. Field of the Invention

The present invention relates to a software distribution and maintenance system and method with which a software vendor can provide a number of users with software over a network, and update and maintain the software at requests of the users, and with which the users obtain a lot of software from plural software vendors over the network and can use the latest versions of the software over the network.

2. Description of the Related Art

The well-known prior art to distribute and obtain software update information is as follows.

(a) Method of Distributing Software using Portable Media

To sell and distribute computer software to users, the software is normally stored in portable media such as magnetic tapes, floppy disks, etc.

In this case, it is necessary to provide additional services such as correcting bugs, adding functions, and supplying new versions.

If the additional services are to be installed in the users' computer systems, the vendors have to visit the users' offices, or the users must install necessary services by themselves.

(b) Method of Distributing Software over a Network from a Vendor

Recently, software is transmitted over a communications network to users. Information required to correct bugs, add functions, and supply new versions can also be provided for users from vendors over a network. If a vendor is informed of a user address, then the vendor can decide to transmit necessary information to the user.

When computer software is actually updated in user computer, the software should be re-installed by the user according to the software update information and instructions from the vendor of the software.

(c) Method of Users' Obtaining Software over a Network

Recently, a user can obtain a software over a network, when required, by accessing a software library which is stored in a vendor (or an agent) computer file (download). Likewise obtained at a request of a user is the information about correcting bugs, adding functions, and supplying new versions. The vendor only has to manage the library. The obtained software is installed, updated, and managed in the user computer at the user's responsibility.

In this case, the software used to obtain a necessary software over a network is quite separate from the necessary software, and therefore is not used to update the necessary software. The user has to decide which software/information is to be obtained and is responsible for the access operations.

(d) Linking and Processing Distributed Software over a Network

Software should be appropriately converted in an executable format normally by compiling and linking source programs. Usually, the source programs are stored in a user computer and then compiled and linked when necessary. However, the source programs can be stored in another computer (that is, the vendor computer). In this case, the user accesses the vendor computer from the user computer over a network, then either (1) compiles and links the source programs in the vendor computer to download the resultant programs or (2) downloads the source programs and then compiles and links them in the user computer, thereby converting the software into an executable format.

This method fundamentally belongs to the above described method (c), but is an easier method of executing software.

In this method, the user recognizes that the source programs are stored in another computer, and then clearly specifies necessary modules and files (for example, specifies the name of a file with its version number) to transfer and link the programs. The entire process is performed at the user's responsibility.

Described below are the prior arts partially similar to the above described technology but different in purpose, object, and method.

(e) Automatic Download

This method is used for an electronic notice board. In this method, a large amount of news information is stored in a central computer, etc., and a terminal computer can access the central computer through the network periodically at intervals and automatically read new information in a specified category if newly stored (download).

In this case, the central computer is regarded as a vendor computer, and the terminal computer is regarded as a user computer. Object information is news, software (so-called freeware), etc.

The software which is automatically downloaded is stored as ordinary data, and does not directly update or manage the software currently used in the user computer. That is, the above described automatic download system does not manage the software currently used by a user.

(f) Mirroring

A mirroring process is used to access new/updated data and obtain the latest information among a plurality of central computers, etc. which store and provide a large amount of document data, etc.

A central computer is a primary storage center of information of a specific category. Stored information is copied to other plural central computers (secondary storage centers) for disclosing the stored information.

To attain this, the secondary storage centers periodically access the primary storage center, and detect and read newly stored/updated information only. This method is different from the above described automatic downloading method (e) in obtaining information in plural categories by switching for each category the functions of the primary storage center and the secondary storage centers among the central computers in a network.

In this method, the information exchanged among the central computers (including software) is handled as ordinary data. That is, the software currently used by a user is not directly updated or managed through mirroring.

(g) Remote Maintenance over a Network

If a fault occurs in a user computer, a software (or hardware) vendor directly operates user software through a network at a user's request (or through automatic communications over the network) to detect the reason for the fault and recover from the fault.

This process is normally performed as a service individually provided by a vendor engineer to recover from a software fault.

That is, the process is different from an automatic supply of maintenance and update services by automatic software for a number of users.

(h) Client/Server Method

The client/server method, in which information is communicated between the client and server software and a client operates server software, is well known and has been used to realize the above listed technologies (b)–(f). No systems, however, have been developed so far with this method to automatically update software already distributed to a user, by simply updating the software in the vendor computer.

Generally, computer software has been designed as an advanced, complicated, and large-scale product with wide variation, and is used by the increasing number of users in various fields.

Under such conditions, optimally maintaining, managing, updating, and improving user computer software is a big consuming job to vendors and users.

Nevertheless, according to the above listed conventional methods, the software update information is distributed individually by a vendor to a user as in the cases of (a) and (b), or is obtained by the user as in the cases of (c) and (d). It is determined individually either by a vendor or by a user which version or part of software is transmitted and obtained, and the software is manually installed or re-installed. These manual operations cause many inconveniences and problems.

From a viewpoint of vendors, since software is supplied to a large number of users on a variety of time schedule and is independently managed by users, it brings forth various problems when the software should be optimally maintained and managed.

That is, the following problems are caused in the above listed prior art technologies.

<Problem 1> Since a great number of users obtain and use software with different configurations according to different schedules, it is very difficult for vendors to correctly recognize the configuration of the software of each user.

<Problem 2> Although a bug is detected and the vendor software is corrected in a vendor computer, the software in a user computer cannot be corrected immediately. Therefore, the user faces inconvenience until the incomplete software is corrected in a user computer.

<Problem 3> It takes a long time to provide all users with new services such as extended functions, new versions, etc.

<Problem 4> Since actual users of software cannot be sufficiently recognized by a vendor in many cases, the vendor cannot send necessary information promptly to the users. This problem grows as the users increase in number and in variation, especially for commercially distributed software.

<Problem 5> Since a large cost is required when a vendor has to visit a user to install software, it is practically impossible to install the software in many cases. Whereas not all services provided by the vendor for the software can be realized when the user is made responsible to install the software.

From a viewpoint of users, a quick and proper service cannot be given by the vendor, and a time-consuming process is required onto the user to install, update, or manage the software. Thus, the software cannot be sufficiently utilized.

<Problem 6> Sufficient knowledge and time consuming work are required to optimally install software depending on the hardware/software environment of each user and to manage the versions of the installed software, thereby permitting only skilled engineer to perform the required processes.

<Problem 7> If software contains bugs, an object job cannot be performed properly or smoothly in a user computer, and the user must obtain a bug-corrected version from the vendor and install it with taking a long time for the process.

<Problem 8> Even when new functions are added or new versions are developed by the vendor, they are not significant until the users can obtain and re-install them successfully. obviously, long processes and time are required to obtain and re-install them.

<Problem 9> Users are often ignorant of the information of bug correction, function addition, new version development, etc. pertaining their software and are using the old software as being incomplete.

<Problem 10> It is troublesome for a user to frequently receive information from the software vendor about bug correction, additional functions, etc. and to have to install additional technologies.

Summing up the above listed problems, they are caused by manual processes performed by software vendors or users in distributing/obtaining software update information (and updated software) and updating the software in the users' computers (re-installing the software).

A comparatively simple system to solve these problems can be a system of automatically updating an object software in a computer of each user to the latest version by use of a client/server method A single object program is managed by client programs in a number of user computers and is supported by a server program which manages the software library of the object software in a vendor computer.

However, such a system cannot be successfully designed without solving the following various problems of wide-purpose and wide-variation software of late.

<Problem 11> A number of users refer to wide variation. For example, (1) various computers, (2) various software environments in user computers, (3) various electronic skill levels of users, (4) various skill levels and purposes of use for an object software, (5) various uses of user computers (for office use, personal use, etc.), and the like.

Considering the above listed variation, client programs must have sufficient variety in the process to manage software in user computers. Software vendors and server programs in vendor computers should properly recognize the above listed variation at users'.

<Problem 12> The variation pertaining to a number of software affects the distribution and management of the software.

There are various types of software which differ in distribution and usage. For example, (1) product software, published common-use software, and intra-office software, (2) embedded software, basic software (OS), and application software, (3) operating system, online software, and batch run software, (4) load module provided, object module provided, and source provided software. Each type of software should be processed appropriately.

<Problem 13> Even a single user has different levels and phases in using a single object software.

For example, there are different levels or phases of usage as follows: (1) a phase having no purchase right, and a phase having an purchase right, (2) a phase of without initial installation and a phase complete initial installation, (3) beginner user phase, stable user phase, and advanced user phase, (4) conventional version phase, version switching phase, new version phase, (5) a phase of stable use of conventional environment, a phase of trial use of new environment, and new environment phase, etc.

These phase differences should be sufficiently considered for each user to obtain software services properly.

<Problem 14> A single user usually adopts plural sets of object software provided by different vendors. It is not convenient for users that plural sets of object software are managed by different distribution/maintenance systems provided by different vendors. A more systematic and convenient system is required by users.

Summarizing the above problems 11 through 14, a unified system and method for distributing and maintaining software are required where a number of various software users and a number of vendors can systematically manage the distribution and maintenance of plural sets of various object software.

SUMMARY OF THE INVENTION

Object of the Invention

The present invention has been developed to solve the above described problems of the prior art technologies.

The first object of the present invention is to provide a software distribution/maintenance system and method over a network so that a number of various software vendors and users can systematically manage plural sets of various object software.

The second object of the present invention is to provide a software distribution/maintenance system and method over a network so that users can quickly and properly obtain and use the software developed and updated by the software vendor.

The third object of the present invention is to provide a software distribution/maintenance system and method over a network so that computer users connected to the network can quickly and properly obtain software used by another user in the network.

The fourth object of the present invention is to provide a software distribution/maintenance system and method over a network so that users can make requests and inquiries to software suppliers in various formats, for example, inquiries of the outline of software, requests for initial purchase of software, inquiries of update, request for new services, etc.

The fifth object of the present invention is to provide a software distribution/maintenance system and method over a network in order to distribute and maintain various types of software such as product software, shareware, freeware, scientific prototype software, intra-office software, etc.

The sixth object of the present invention is to provide a software distribution/maintenance system and method over a network so that even an unskilled user can obtain a new software or an updated software in an immediately operable form.

The seventh object of the present invention is to provide a software distribution/maintenance system and method over a network so that a software vendor can immediately detect an occurrence of a software fault in order to quickly correct the fault.

The eighth object of the present invention is to provide a software distribution/maintenance system and method over a network which allows to unify a program of managing the software of user computers and to unify a program of managing each software library of vendor computers.

The ninth object of the present invention is to provide a software distribution/maintenance system and method over a network which allows flexible message communication between users and vendors by introducing procedure definition of methods of processing the messages.

The tenth object of the present invention is to provide a software distribution/maintenance system and method over a network which allows secured message communication between users and vendors by introducing procedure definition of methods of confirming a vendor and determining the qualification of a user.

The eleventh object of the present invention is to provide software on a worldwide scale, or build a standardized technical framework suitable for a form of software distribution without making the designs of the client program CP and the server program SP complicated. That is, the present invention is intended to provide a software distribution and maintenance system and method, which uses a number of and a variety of pieces of software as objects and can be utilized by a number of software users joined on a worldwide scale, comprises a capability to rapidly and properly acquire and use software created and updated by software vendor.

A feature of the present invention resides in a software distribution/maintenance system having a plurality of user computers and a vendor computer connected to the plurality of user computers through a network to manage and automatically update over the network a set of object software sent and stored in the user computers from the vendor computer through the network, comprising: first process means in the user computers; second process means in the vendor computer; and object software library in the vendor computer, wherein said first process means sends current configuration information of the object software stored in the user computers to said second process means of the vendor computer through the network to inquire the latest configuration, receives an answer from said second process means, and updates the object software stored in the user computers according to an instruction in a received answer; and said second process means receives an inquiry from said first process means in the user computers, generates update instruction information for the object software to match a configuration of the object software in the user computers with the configuration of an updated version in said object software library stored in the vendor computer, and returns through the network to the first process means the update instruction information and the software of the updated version.

Another feature of the present invention resides in a software distribution/maintenance system having a plurality of user computers and a vendor computer to manage and automatically update object software provided for the plurality of user computers from the vendor computer thorough a network, comprising: first process means in each of the user computers; and network means for connecting the user computers to the vendor computers; wherein said first process means sends current configuration information of the object software stored in the user computers to the vendor computer through the network to inquire the latest configuration, receives an answer from the vendor computer, and updates the object software stored in the user computers according to an instruction in a received answer.

A further feature of the present invention resides in a software distribution and maintenance system using a network in which a number of users U1, U2, . . . using a number of types of object software to be distributed, managed, and maintained, and a number of software vendors V1 , V2, . . . supplying the object software manage the distribution and maintenance of the object software over a computer network, comprising: one or more first process means CPs installed in each of user computers, that manage object software groups S1, S2, . . . to be used by one of more users U1, U2, . . . individually for every object software and for every user; one or more second process means SPs installed in either of software vendor computers, that gives services to vendor software libraries SL (S1), SL (S2), . . . for each of the software libraries; a network that connects the first process means CP installed in the user computer to the second process means SP, based on standardized communications protocols; and wherein said first process means CP has a capability that perform distribution and/or maintenance of the object software by sending a message that requests to distribute and/or maintain the object software for one piece of object software over the network, according to instructions given by the users U1, U2, . . . or a user-defined program, receiving an answer message from the second process means SP, and processing it depending on contents of the answer message and settings made by the users U1, U2, . . . ; and said second process means SP has a capability to receive the message from an arbitrary first process means CP, to reference the software libraries SL(S1), SL(S2), . . . managed by the vendors V1, V2, . . . depending on the contents of a received message and settings made by the vendors V1, V2, . . . for the object software specified with the message, to generate an answer message to answer the request of distribution and/or maintenance of the object software, and to send the answer message to said first process means CP of the sender of the corresponding message.

BRIEF DESCRIPTION OF THE DRAWINGS

FIG. 2 shows the principle of the second embodiment of the present invention;

FIG. 5 shows the process performed by a server program of a vendor computer according to the first embodiment;

FIG. 12 shows the entire configuration of the process performed by a client program according to the second embodiment;

FIG. 13 shows the entire configuration (continued) of the process performed by a client program according to the second embodiment;

FIG. 16 is a flowchart showing the entire process of the software distribution/maintenance method according to the second embodiment;

FIG. 17 is a flowchart showing the entire process performed by the software distribution/maintenance method using user management data and vendor management data;

FIG. 18 shows a block diagram of a principle structure according to the third embodiment of the present invention;

FIG. 19 shows a block diagram of the third embodiment shown in FIG. 18 of a software distribution and maintenance system utilizing a network according to the present invention;

FIG. 21 depicts an example of a processing command;

FIG. 22 shows the correspondence relationship between various messages;

FIG. 24 shows a flowchart of an entire process performed by a server program SP according to the third embodiment.

DESCRIPTION OF THE PREFERRED EMBODIMENTS

Figure 1:
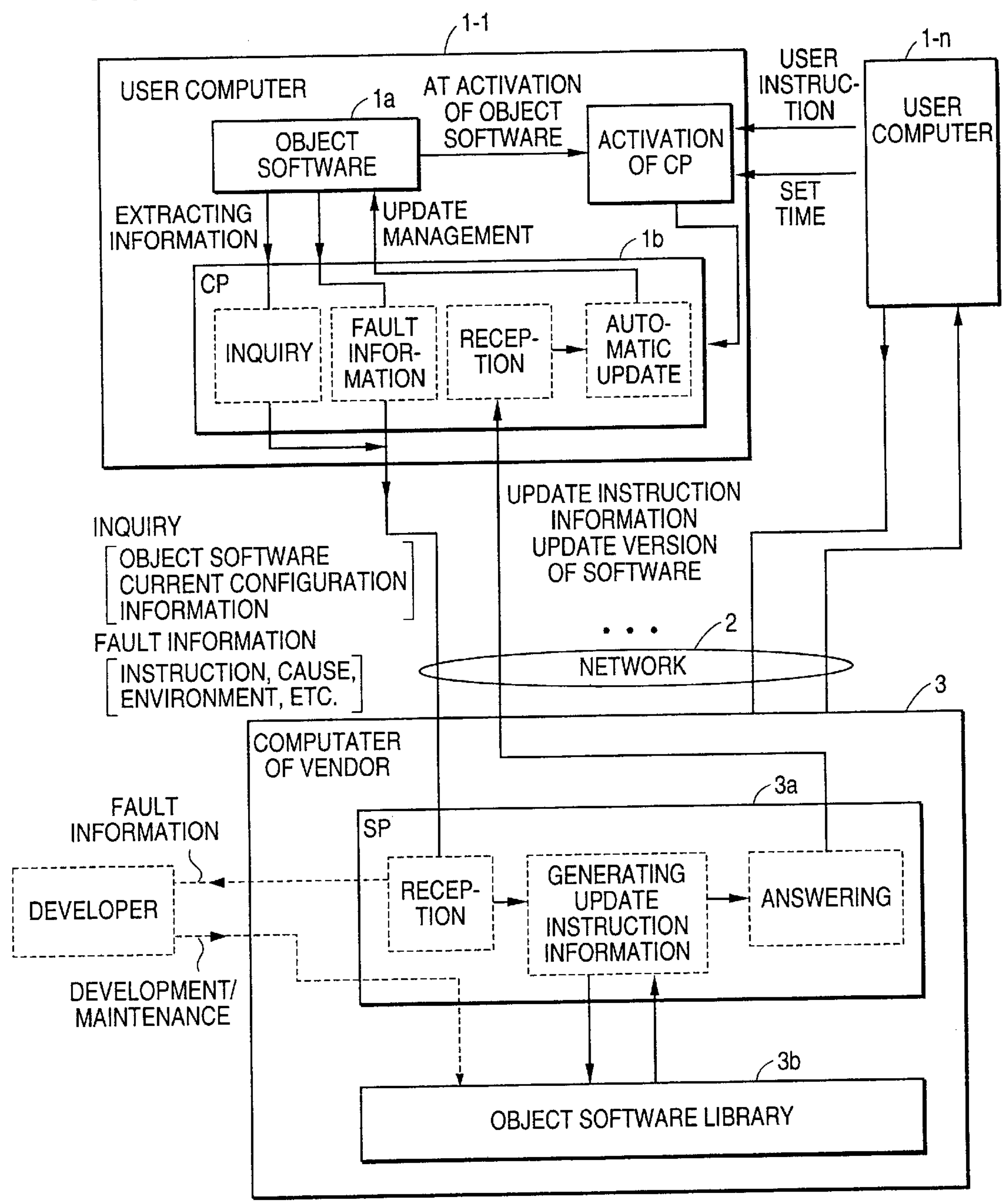
FIG. 1 shows the principle of the first embodiment of the present invention.

First Preferred Embodiment for Distributing/Maintaining an Object Software

According to the first embodiment of the present invention, a client program is stored in each user computer to manage an object software to be distributed and maintained, and a server program is stored in a vendor computer to manage an object software library.

The client program sends configuration information indicating the modules forming the object software in the user computer to the server program of the vendor computer through the network, inquires whether or not the configuration of the present object software matches the configuration of the latest configuration, receives an answer from the server program, and updates the object software according to the answer.

On the other hand, the server program receives an inquiry about the configuration of software from any client program in a plurality of user computers, generates update instruction information for the object software so that the configuration of the user software matches the latest version of the object software in the vendor computer, and answers the inquiring client program. by providing the update instruction information and the software of the latest version over the network.

Second Preferred Embodiment for Distributing/ Maintaining Multiple Object Software of Multiple Vendors The above described configuration is used in an automatic remote software update system in which a single object software is used as a principle. Furthermore, according to the second embodiment, each user computer is usually provided with plural sets of object software, and each vendor computer is usually provided with a plurality of software libraries.

According to the second embodiment, each user computer stores a client program for managing plural sets of software used by a plurality of users, and each vendor computer stores a server program for managing a plurality of software libraries provided by the vendor.

The client program in each user computer sends according to the instruction of the user over a network a message requesting to distribute/maintain a single object software to the server program in the vendor computer from which the software is supplied, and then performs processes to distribute and maintain the object software according to the answer message from the server program and the answer instruction predetermined by the user.

In response to this, when the server program receives a message from the client program in any user computer, it refers to the software library of the object software specified by the message according to the received message and the received instruction predetermined by the vendor, generates an answer message to the distribution/maintenance request message, and returns the answer message to the client program over the network.

According to the present invention, the server program in the vendor computer returns the answer message in response to the software distribution/maintenance request message from the client program, thereby automatically distributing/maintaining the object software as described above.

Explanation of the Principle

Explanation of the Principle of the First Embodiment

Described first is the principle of the first embodiment of the present invention.

FIG. 1 shows the principle of the first embodiment. In FIG. 1, user computers 1-1, . . . , 1-n are connected to a vendor computer 3. Each of the user computers 1-1, . . . , 1-n is equipped with an object software 1*a* to be updated/managed and a first process unit 1*b* (which may be called a client program CP) for managing the configuration and operation of is the object software 1*a*, for example. A user can perform a necessary job by operating the object software 1*a*.

3 is a vendor computer. The vendor computer 3 is provided with a second process unit 3*a* (which may be called a server program SP) for managing the object software 1*a* stored in the user computers 1-1, . . . , 1-n, and an object software library 3*b*.

To solve the above described problems, a software distribution/maintenance system according to the present invention comprises, as shown in FIG. 1, a plurality of the user computers 1-1, . . . , 1-n and the vendor computer 3 connected to the plurality of user computers 1-1, . . . , 1-n through the network 2, and manages and automatically updates over a network the object software 1*a* stored in the user computers 1-1, . . . 1-n from the vendor computer 3 through the network 2.

In this system, the user computers 1-1, . . . , 1-n comprise the first process units 1*b*, and the vendor computer 3 comprises the second process unit 3*a* and the object software library 3*b*.

The first process unit 1*b* sends the current configuration information of the object software 1*a* stored in the user computers 1-1, . . . , 1-n to the second process unit 3*a* of the vendor computer 3 through the network 2 to inquire the latest configuration, receives an answer from the second process unit 3*a*, and updates the object software 1*a* stored in the user computers 1-1, . . . , 1-n according to the instruction in the received answer. The second process unit 3*a* receives the inquiry from any of the first process units 1*b* stored in the user computers 1-1, . . . , 1-n, generates update instruction information for the object software 1*a* to match the configuration of the object software 1*a* in the user computers 1-1, . . . , 1-n with the configuration of the updated version in the object software library 3*b* stored in the vendor computer 3, and returns through the network 2 to the inquiring first process unit 1*b* the update instruction information and the software of the updated version.

Furthermore, according to the present invention, if the operation of the object software 1*a* abnormally terminates in the user computers 1-1, . . . , 1-n, the first process units 1*b* in the user computers 1-1, . . . 1-n automatically inform over the network 2 the vendor computer 3 of an abnormal termination and its state.

The first process unit 1*b* according to the present invention automatically informs the vendor computer 3 of the abnormal termination, the instruction causing the abnormal termination and the reason for the abnormal termination, a series of instructions which invoked the instruction causing the abnormal termination, and the environment of the software/hardware used when the abnormal termination is detected.

The first process unit 1*b* can be designed to automatically informs over the network 2 the vendor computer 3 of the fact and state of the termination of an abnormal condition by general-purpose electronic mail.

According to the present invention, the software distribution/maintenance method manages and automatically updates the object software 1*a* stared in the user computers 1-1, . . . , 1-n from the vendor computer 3 through network 2 .

In this method, the first process units 1*b* in the user computers 1-1, . . . , 1-n send the current configuration information of the object software 1*a* to the second process unit 3*a* in the vendor computer 3 through the network 2 to inquire the latest configuration.

The second process unit 3*a* in the vendor computer 3 receives the above described inquiry, generates update instruction information for the object software 1*a* to match the configuration of the object software 1*a* in the user computers 1-1, . . . , 1-n with the configuration of the updated version in the object software library 3*b* stored in the vendor computer 3, and returns through the network 2 to the inquiring first process unit 1*b* the update instruction information and the software of the updated version.

The first process units 1*b* stored in the user computers 1-1, . . . , 1-n receive an answer from the second process unit 3*a*, update the object software 1*a* according to the update instruction information in the answer, and prepare for the compiling and linking of programs if necessary.

There can be plural ways of activating the first process unit 1*b*. Three ways of them are shown below:

When the object software 1*a* is activated in the user computers 1-1, . . . , 1-n, the first process unit 1*b* immediately sends the current configuration information of the object software 1*a* to the second process unit 3*a* in the vendor computer 3 through the network 2 to inquire the latest configuration, receives an answer from the second process unit 3*a*, updates the object software 1*a* according to the update instruction information in the answer, and prepares is for the compiling and linking of programs if necessary.

When the first process unit 1*b* is activated in the user computers 1-1, . . . , 1-n at a predetermined time, the first process unit 1*b* sends the current configuration information of the object software 1*a* to the second process unit 3*a* in the vendor computer 3 through the network 2 to inquire the latest configuration, receives an answer from the second process unit 3*a*, updates the object software 1*a* according to the update instruction information in the answer, and prepares for the compiling and linking of programs if necessary. Thus, the object software la can be automatically updated.

When a user instructs the user computers 1-1, . . . 1-n to activate the first process unit 1*b*, the first process unit 1*b* sends the current configuration information of the object software 1*a* to the second process unit 3*a* in the vendor computer 3 through the network 2 to inquire the latest configuration, receives an answer from the second process unit 3*a*, updates the object software 1*a* according to the update instruction information in the answer, and prepares for the compiling and linking of programs if necessary. Thus, the object software 1*a* can be automatically updated.

The above described methods can be selectively used to activate the first process unit 1*b*.

Function of the First Embodiment of the Present Invention

In FIG. 1, if a user activates the object software 1*a* of the user computers 1-1, . . . , 1-n, then the first process unit 1*b* detects the activation and sends configuration information of the current version to the second process unit 3*a* in the vendor computer 3 through the network 2. When the second process unit 3*a* in the vendor computer 3 receives the information, it compares the current configuration with the configuration stored in the object software library 3*b*, and returns the instruction information for the update of the object software 1*a* of the user together with the update software. The user's first process unit 1*b* automatically updates the object software 1*a* using the received information.

The first process unit 1*b* can be activated at a predetermined time or at a user instruction as shown in FIG. 1, thereby updating the object software 1*a*.

Thus, the current configurations of the software in the computers of a number of users can be exactly recognized by the vendor, and the vendor can automatically provide the users with the latest version of the software and the latest information relating to the software.

Furthermore, the software can be automatically installed and the latest version of the software can also be automatically managed. Therefore, the vendor does not have to visit the user's office to install the software, and even beginners and unskilled users can correctly receive the latest version of the software.

In case that the operation of the object software 1*a* abnormally terminates in the user computers 1-1, . . . , 1-n, the first process units 1*b* in the user computers 1-1, . . . , 1-n automatically inform over the network 2 the vendor computer 3 of an abnormal termination and its state if the operation of the object software 1*a* abnormally terminates in the user computers 1-1, . . . , 1-n. Therefore, the user system automatically informs the vendor of the exact information of a fault of the software in the user computer when it occurs. The vendor corrects the software library according to the fault information. Then, the user can immediately use or operate the corrected software without a burden on the user.

The first process unit 1*b* automatically informs the vendor computer 3 of the abnormal termination, the instruction causing the abnormal termination and the reason for the abnormal termination, a series of instructions which invoked the instruction causing the abnormal termination, and the environment of the software/hardware used when the abnormal termination is detected. Accordingly, the vendor can efficiently correct the object software according to the above described detailed fault information. The first process unit 1*b* automatically informs the vendor computer 3 of an abnormal termination and state over the network 2 in the format of general-purpose electronic mail, thereby transmitting the abnormal termination information and the state in the common communications.

The first process unit 1*b* sends the current configuration information of the object software 1*a* to the second process unit 1*a* in the vendor computer 3 through the network 2 to inquire the latest configuration. The second process unit 3*a* in the vendor computer 3 receives the above described inquiry, generates update instruction information for the object software 1*a* to match the configuration of the object software 1*a* with the configuration of the updated version in the object software library 3*b*, and returns through the network 2 to the inquiring first process unit 1*b* the update instruction information and the software of the updated version. The first process unit 1*b* receives an answer from the second process unit 3*a*, updates the object software 1*a* according to the update instruction information in the answer, and prepares for the compiling and linking of programs if necessary.

When the object software 1*a* is activated, the first process unit 1*b* immediately sends the current configuration information of the object software la to the second process unit 3*a* in the vendor computer 3 through the network 2 to inquire the latest configuration, receives an answer from the second process unit 3*a*, updates the object software 1*a* according to the update instruction information in the answer, and prepares for the compiling and linking of programs if necessary. Thus, the user can automatically update the object software 1*a* without considering the activation of the first process unit 1*b*.

When the first process unit 1*b* is activated at a predetermined time, the first process unit 1*b* sends the current configuration information of the object is software 1*a* to the second process unit 3*a* to inquire the latest configuration, receives an answer from the second process unit 3*a*, updates the object software 1*a* according to the update instruction information in the answer, and prepares for the compiling and linking of programs if necessary. Thus, the object software 1*a* can be automatically updated. Therefore, the object software 1*a* can be automatically updated at night, for example, with the user released of being kept waiting in updating the object software 1*a* during the operation of the software. Furthermore, by the activation of the first process unit 1*b* at times predetermined by user's software, the object software 1*a* can be automatically updated periodically every dawn, every week, or every month without user's explicit operations.

When the user explicitly activates the first process unit 1*b*, it immediately sends the current configuration information of the object software 1*a* to the second process unit 3*a* in the vendor computer 3 through the network 2 to inquire the latest configuration, receives an answer from the second process unit 3*a*, updates the object software 1*a* according to the update instruction information in the answer, and prepares for the compiling and linking of programs if necessary. Thus, the object software can be automatically updated by the user's initiation at any time when necessary.

The above described methods can be selectively used to update the object software 1*a*.

Explanation of the Principle of the Second Embodiment

Described below is the principle of the second embodiment. According to the second embodiment, unlike the first embodiment, each user computer normally comprises plural sets of software which are used by each user and provided by a plurality of vendors, and a plurality of vendor computers store a plurality of software libraries.

General Structure of the System

FIG. 2 shows the principle of the second embodiment. In FIG. 2, a user computer 11 is used by a plurality of users U1, U2, . . . (normally represented as user Uj). The users are provided with object software SU1, SU2, . . . (normally represented as object software SUj) to be managed by the present invention, user management data UD1, UD2, . . . (normally represented as management data UDj), and a third process unit CP, for example, a client program.

The third process unit CP sends to a vendor various messages from a user to the vendor such as software purchase requests, update inquiries, fault reports, etc., receives an answer from the vendor, updates user software, etc. The user management data UD1, UD2, . . . contain user identification information, software management/configuration information, information (procedure) for regulating a processing method (method of installing software), etc. The information is used when various messages such as software purchase requests, update inquiries, fault reports, etc. are issued by the third process unit CP and when the user software is updated.

A vendor computer 13 is provided with software libraries SL1, SL2 (normally represented as SLi) of a vendor V1 (normally represented as a vendor Vk), vendor management data VD1, VD2 (normally represented by VDi), and a fourth process unit SP, for example, a server program.

The fourth process unit SP returns necessary information and software in response to various inquiries and requests from the users U1, U2, The vendor management data VD1, VD2 contain data such as vendor identification information, software configuration information, customer management information, etc.; and regulatory information (procedure) for defining an answering method.

A user/vendor computer 14 is used by a user U3 and a vendor V2 (or a user can be a vendor) and they are individually provided with object software SU3, user management data UD3, the third process units CP, software libraries SLn, vendor management data VDn, and the fourth process units SP.

A network 12 connects the above mentioned computers 11, 13, and 14, and transmits messages communicated among them.

The configurations and versions of an object software are represented using the following terms and identification characters in this specification.

Each object software is referred to as object software Si. For example, S1 and S2 are different software. Since a single set of software Si has a number of version types depending on the type of computer, the specification of functions, etc., the version types are specified by respective characters such as Si.V, Si.V', Si.V", etc. Furthermore, each version type is qualified with a version number for management of update order. For example, Si.V.1 indicates the version type and number of a set of software. The set of version type and number are referred to as a version for short.

The object software Si is supplied by a vendor (Vk) and managed in the software library SLi which stores software of all versions (Si.V.1, Si.V.2, . . . Si.V'.1, . . . ) of all version types Si.V, Si.V', . . . Each object software Si normally comprises a number of modules M1, M2, . . . (Commonly represented by Mm), and each of these modules is also assigned a new version number each time the module is updated. Thus, a module is represented by a module type and version number, for example, Mm.n. Generally, a software version Si.V.1 of software Si comprises a number of versions of modules (for example, M1.2, M2.1, M3.5, . . . ), and a specific module version can be shared by different software versions.

When users adopt object software Si, they normally desire to select the optimum version type Si.V from among a number of version types and then use the latest version Si.V.1 in the selected type.

Usually, a single user uses plural sets of software. Plural sets of object software SUj used by user Uj comprise a number of versions of software (for example, S1.V.1, S2.V'.3, S3.V".1, . . . ).

As described above, a vendor manages a number of versions for a single set of software, and a user manipulates plural sets of software (supplied by different vendors), but usually a single version for each set. Thus, the second embodiment is based on the supply/use of plural sets of software from a number of vendors to a number of users.

As shown in FIG. 2, the distribution of object software is managed over the communications network 2 by a number of users U1, U2, . . . who actually use plural sets of object software S1, S2, . . . to be distributed, managed, and maintained and by a number of software vendors V1, V2, . . . who supply the users with the above listed object software in the software distribution/maintenance system according to the present invention. The system comprises the following units.

(a) In each user computer 11, object software SU1, SU2, . . . to be used by users U1, U2, . . . , and a third process unit CP for managing plural sets of object software SU1, SU2, . . . .

(b) In each software vendor computer 13, vendor software libraries SLI, SL2, . . . and a fourth process unit SP for providing services relating to the software libraries SL1, SL2, . . . .

(c) a network 12 for connecting each user computer 11 and vendor computer 13

Each unit has the following functions.

(d) The third process unit CP sends over the network 12 an object software distribution and/or maintenance request message according to an instruction of users U1, U2, . . . or an instruction of a user-written program to the fourth process unit SP of the vendor computer 13 which stores a software library containing the above described object software, receives an answer message from the fourth process unit SP, and performs processes for distributing and/or maintaining the object software.

(e) The fourth process unit SP receives the message from any third process unit CP, refers to software libraries SL1, SL2, . . . managed by vendors V1, V2, . . . according to the received message and the settings made by vendors V1, V2, . . . , generates an answer message in response to the object software distribution and/or maintenance request message, and sends the answer message to the third process unit CP of the message sender.

When any object software managed by the third process unit CP in the user computer 11 abnormally terminates during its operation, the third process unit CP detects and analyzes the abnormal condition, and then automatically sends the fault report to the fourth process unit SP of vendors V1, V2, . . . over the network 12. The fourth process unit SP of vendors V1, V2, . . . receives the fault report and informs vendors V1, V2, . . . of the fault.

When each version of the object software is provided for a number of users U1, U2, . . . by vendors V1, V2, . . . , a single computer user can be user Uj of a version of software and at the same time vendor Vk of a version of another software, and furthermore, a single computer can be provided with one or more third process units CP and one or more fourth process units SP.

Each user computer 11 can be designed to store user management data UD1, UD2, . . . for each of users U1, U2, . . . or each user group, and the data can be set for each object software. The third process unit CP refers to user management data UD1, UD2, . . . to manage one or more sets of object software SU1, SU2, . . .

User management data UD1, UD2, . . . can be designed to comprise user identification information of each user U1, U2, . . . or each user group, software management information of each object software used by each user U1, U2, . . . , software configuration information, and message process method specification information.

In specifying a method of processing a message according to user management data UD1, UD2, . . . , users U1, U2, . . . can specify a process method as a procedure for each function performed by the third process unit CP.

In specifying a method of processing a message according to user management data UD1, UD2, . . . , a vendor confirmation procedure can be used so that the vendor can be confirmed in order to protect the user software.

When the fourth process unit SP of the vendor computer 13 offers services using software libraries SL1, SL2 . . . , it can refer to vendor management data VD1, VD2 stored for each software library SL1, SL2, . . . .

Vendor management data VD1, VD2 can be designed to comprise the vendor identification information, software management information, software configuration information, message process method specification information, customer information, fault history information, etc.

When a message process method is specified using vendor management data VD1, VD2, vendors V1, V2, . . . can specify a method of the process as a procedure for each function performed by the fourth process unit SP.

When a message process method is specified using vendor management data VD1, VD2, a selection of user confirmation procedure can be implemented.

Users U1, U2, . . . can simultaneously obtain and use a plurality of versions of each object software.

General Method of Processing

The distribution of object software is managed over the communications network 2 by a number of users U1, U2, . . . who actually use plural sets of object software S1, S2, . . . to be distributed, managed, and maintained and by a number of software vendors V1, V2, . . . who supply the users with the above listed object software in the software distribution/maintenance system according to the present invention. The system comprises, in each user computer 11, object software SU1, SU2, . . . to be used by users U1, U2, . . . , and a third process unit CP for managing plural sets of object software SU1, SU2, . . . ; in each software vendor computer 13, vendor software libraries SL1, SL2, . . . and a fourth process unit SP for providing services relating to the software libraries SL1, SL2, . . . ; and a network 12 for connecting each user computer 11 and vendor computer 13. This system performs the following processes.

(a) Users U1, U2, . . . activate the third process unit CP through a command input by users U1, U2, . . . in the user computer 11 or according to the activation through a command from a user's program.

(b) Users U1, U2, . . . send over the network 12 an object software distribution and/or maintenance request message to the fourth process unit SP of the vendor computer 13 from which the object software is provided.

(c) The fourth process unit SP in the vendor computer 13, from which the object software is provided, receives the message from the third process unit CP.

(d) The fourth process unit SP refers to software libraries SL1, SL2, . . . managed by vendors V1, V2, . . . according to the received message and the settings made by vendors V1, V2, . . . , generates an answer message in response to the object software distribution and/or maintenance request message, and sends the answer message to the third process unit CP of the message sender.

(e) The third process unit CP in the computers of the message sending users U1, U2, . . . receives the answer message from the fourth process unit SP, and performs processes for distributing and/or maintaining the above described object software according to the answer message and the settings made by users U1, U2, . . . .

When any object software managed by the third process unit CP in the user computer 11 abnormally terminates during its operation, the third process unit CP detects and analyzes the abnormal condition, and then sends the fault report message to the vendor Vk of the software over the network 12. The fourth process unit SP of vendors Vk receives the fault report message over the network 12, and informs the vendor Vk of the fault.

Management Data and Processing in a User Computer

Each user computer 11 can be designed to store user management data UD1, UD2, . . . for each of users U1, U2, . . . or each user group, and the data can be set for each object software. The third process unit CP refers to user management data UD1, UD2, . . . to manage one or more sets of object software SU1, SU2, . . . .

User management data UDj can be designed to comprise at least user identification information of user Uj or each user group, software management information of each object software S1, S2, . . . in object software group SUj used by each user Uj software configuration information, and message process method specification information. The third process unit CP refers to user management data UDj.

In referring to a method of processing a message according to user management data UDj, user Uj can specify and use a process method as a procedure for each function performed by the third process unit CP.

In referring to the method of processing a message according to user management data UD1, UD2, . . . , a user-Uj-defined vendor confirmation procedure can be used so that the message received by the third process unit CP can be recognized as a correct message from the predetermined vender Vk.

When user Uj activates the third process unit CP in the user computer 11 by inputting a command, the third process unit CP obtains a user name, a command name, and an object software name to generate an interactive screen displaying messages according to the input command, promotes the generation of a message in response to the command from user Uj by referring to user management data UDj of user Uj and object software Si or by invoking a user-defined process procedure, sends the generated message to the fourth process unit SP of the computer of vendors Vk of object software Si, and returns to a standby state after recording the transmission of the message.

The third process unit CP performs the following processes depending on the cause of the activation of the third process unit CP.

(a) When the third process unit CP is activated in the user computer 11 by an input command, the third process unit CP obtains a user name, a command name, and an object software name to generate an interactive screen displaying messages according to the input command, promotes the generation of a message in response to the command from user Uj by referring to user management data UDj of user Uj and object software Si or by invoking a user-defined process procedure, sends the generated message to the fourth process unit SP of the computer of vendors Vk of object software Si, and returns to a standby state after recording the transmission of the message.

(b) If the third process unit CP is activated in the user computer 11 by a command from a program defined by user Uj or through an abnormal termination of the object software managed by the third process unit CP, the third process unit CP obtains a user name, a command name, and an object software name to, promotes in response to the activated command the generation of a message in response to the command from user Uj by referring to user management data UDj of user Uj and object software Si or by invoking a user-defined process procedure, sends the generated message to the fourth process unit SP of the computer of vendors Vk of object software Si, and returns to a standby state after recording the transmission of the message.

(c) If the third process unit CP is activated in the user computer 11 by a message received from the network 12, then the third process unit CP obtains from the header of the received message a destination user name, a command name, and an object software name, uses user management data UDj for the specified user Uj and object software Si, then obtains a sender name from the header of the received message, confirms that the sender is a right vendor Vk of object software Si, also confirms that the third process unit CP is in an answer-wait state, refers to user management data UDj or invokes the user-defined process procedure depending on the command in the received message, analyzes or stores the message data or stores or installs the software specified by the message, returns, in response to a specific message which requires acknowledgement, the acknowledgement or the process in response to the reception to the fourth process unit SP over the network 12, and then returns to a standby state after recording the transmission of the message.

Each time the third process unit CP is activated, a new process is generated to allow plural processes to be performed in parallel on the processes other than the process relating to a specific object software of a specific user.

Management Data and Processing in a Vendor Computer

When the fourth process unit SP in the vendor computer 13 offers services using software libraries SL1, SL2, . . . , vendor management data VDi, which is stored in each software library SLi, is referred to.

When the fourth process unit SP refers to vendor management data VDi, it refers corresponding to software library SLi to at least the vendor identification information, software management information, software configuration information, message process method specification information, customer information, update history information, and fault history information.

When a message process method is referred to using vendor management data VDi, vendor Vk can invoke a method of the process as a procedure for each function performed by the fourth process unit SP.

When a message process method is referred to using vendor management data VDi, a user confirmation procedure can be invoked to confirm the identity of user Uj who is a sender of the message, determine the qualification of the user, and return appropriate answer to the user.

In the user confirmation procedure as a part of vendor management data VDi, the qualification of a user can be determined based on commercial relations such as contracts relating to the object software, payments relating to the object software, payments relating to new services for the object software, etc.

In the user confirmation procedure as a part of vendor management data VDi, the object software can be provided and distributed only to specified users U1, U2, . . . by referring to their identification information such as the organizations to which they belong, their titles, personal names, etc.

In the user confirmation procedure as a part of vendor management data VD1, VD2, . . ., users U1, U2, . . . can be identified by passwords.

The user computer 11 and/or the vendor computer 13 should be connected to the network 12 only when it is necessary to send or receive messages to or from each other. For example, the network connection in the way of telephone or the network transmission in the way of mail can be used properly.

The header of a message transmitted over the network 12 specifies the destination and the source of the message. Additionally, the title column of the message specifies the name of a software distribution/maintenance system, the name of a software distribution/maintenance process type, and the name of the object software.

The fourth process unit SP in the vendor computer 13 performs the following processes.

(a) The fourth process unit SP is constantly in a standby state, and activated when it receives a message from the third process unit CP over the network 12;

(b) obtains the command name and the object software name from the header of the received message, and then assigns the processes to be performed to each software Si;

(c) obtains the name of the sending user and the user identification information from the received message compares it with vendor management data VDi to confirm user Uj and determine the user Uj's access qualification relating to the command, (d) analyzes the received message from the qualified user Uj;

(e) in response to the received command, provides summary information of software Si, provides new services for the software, supplies the updated software and the instructions to correctly update the software, retrieves information of other messages, and generates an answer message;

(f) records the summary of the answer message to user Uj, and sends the answer message to the third process unit CP of user Uj over the network 12; and (g) returns to the standby state.

Each time the fourth process unit SP is activated, a new process is generated to allow a plurality of processes to be concurrently performed on the processes other than the process relating to a specific object software of a specific user Distribution and Maintenance Processes When users U1, U2, . . . want to obtain the summary information of the object software not used by them, the following processes are performed.

In the user computer 11;

(a) User Uj enters a summary inquiry command, activates the third process unit CP in the user computer 11, sets the name of software Si, the name of vendor Vk, the network address of the vendor, an answer information storage directory, etc., and generates a summary information inquiry message.

(b) The third process unit CP sends the generated message to the fourth process unit SP of the vendor Vk.

In the vendor computer 13;

(c) The fourth process unit SP is activated when it receives the summary information inquiry message over the network 12.

(d) The fourth process unit SP refers to vendor management data VDi about object software Si cited by the summary information inquiry message to confirm the identification of the sending user Uj and determine the access qualification of the user;

(e) invokes, in response to the inquiry of the qualified user Uj, a vendor-defined procedure to provide the summary information, and generates the summary information as a summary information message; and (f) sends the generated message to the third process unit CP of the sending user Uj over the network 12.

When users U1, U2, . . . newly obtain an object software not used by them, the following processes are performed.

In the user computer 11;

(a) User Uj enters a new installation request command, activates the third process unit CP in the user computer 11, sets the user identification information, software information of object software, vendor identification information, and installation process information, and generates a new installation request message.

(b) The third process unit CP sends the generated message to the fourth process unit SP of the vendor Vk of software Si.

In the vendor computer 13;

(c) The fourth process unit SP is activated when it receives the new installation request message over the network 12.

(d) The fourth process unit SP refers to vendor management data VDi about object software Si cited by the new installation request to confirm the identification of the sending user Uj and determine the access qualification of the user;

(e) invokes, in response to the inquiry of the qualified user Uj, a vendor-defined procedure for the new installation to determine a version Si.V.1 to be provided, obtains a set of modules of the provided version, organizes the instruction information of the installation in the user computer 11, and generates a new installation message as an answer, and (f) sends the generated new installation message as an answer to the third process unit CP of the sending user Uj over the network 12.

In the user computer 11;

(g) The third process unit CP is activated when it receives a new installation message from vendor Vk over the network 12.

(h) The third process unit CP obtains the name of a destination user and the name of an object software from the header of the received message, refers to the corresponding user management data UDj, and confirms that the third process unit CP is currently in a new installation standby state and that the sender is a correct vendor Vk;

(i) invokes a user-defined new installation process procedure, refers to the installation information in the received message, stores the software Si to be newly installed in the user computer 11, and actually installs the newly supplied software if the new installation is acceptable; and (j) records the received message and the process result, and returns to a standby state.

When users U1, U2, . . . add or switch to a new service of an object software already used by them, the following processes are performed.

In the user computer 11;

(a) User Uj enters a new service request command, activates the third process unit CP in the user computer 11, sets the user identification information, software information of object software, vendor identification information, and installation process information, and generates a new service request message.

(b) The third process unit CP sends the generated message to the fourth process unit SP of the vendor vk.

In the vendor computer 13;

(c) The fourth process unit SP is activated when it receives the new service request message over the network 12.

(d) The fourth process unit SP refers to vendor management data VDi about object software Si cited by the new service request to confirm the identification of the sending user Uj and determine the access qualification of the user;

(e) invokes, in response to the inquiry of the qualified user Uj, a vendor-defined procedure for the supply of the new service to determine a version Si.V.1 to be provided, obtains a set of modules of the provided version, organizes the instruction information of the installation in the user computer 11, specifies a process performed on the old service, and generates a new installation message as an answer, and (f) sends the generated new service supply message as an answer to the third process unit CP of the sending user Uj over the network 12.

In the user computer 11;

(g) The third process unit CP is activated when it receives a new service installation message from vendor Vk over the network 12.

(h) The third process unit CP obtains the name of a destination user and the name of an object software from the header of the received message, refers to the corresponding user management data UDj, and confirms that the third process unit CP is currently in a new service installation standby state and that the sender is a correct vendor Vk;

(i) invokes a user-defined process procedure, refers to the installation information in the received message, stores the software Si supplied as a new service in the user computer 11, and actually stores the new service of the software if the new service is acceptable; and (j) records the received message and the process result, and returns to a standby state.

When users U1, U2, . . . inquire the update state of an object software already used by them of vendors V1, V2, . . . and request to send an updated software, the following processes are performed.

In the user computer 11;

(a) User Uj enters an update inquiry command, activates the third process unit CP in the user computer 11, sets the user identification information, software information of object software, vendor identification information, software management information, and post-installation process information, and generates an update inquiry message.

(b) The third process unit CP sends the generated message to the fourth process unit SP of the vendor Vk of software Si.

In the vendor computer 13;

(c) The fourth process unit SP is activated when it receives the update inquiry message over the network 12.

(d) The fourth process unit SP refers to vendor management data VDi about object software Si cited by the update inquiry to confirm the identification of the sending user Uj and determine the access qualification of the user;

(e) invokes, in response to the inquiry of the qualified user Uj, a vendor-defined update inquiry answering procedure to determine the version type Si.V to be supplied and the latest version Si.V.1, and compares it with the current version of user Uj;

(f) if the current version of user Uj matches the latest version, then generates a non-update answer message, sends it to the third process unit CP of the inquiring user Uj;

(g) if object software Si.V of the same version type as the current version of user Uj has been updated, then module delete/add instruction information and information about modules to be added are generated as an update instruction message as an answer, and the generated answer is sent to the third process unit CP of the inquiring user Uj over the network 12; and (h) if it is determined that the current version should be switched to a newly served version of object software Si, then generates a non-update and information message about a newly served version Si.V', and sends the generated information message to the third process unit CP of the inquiring user Uj over the network 12.

In the user computer 11;

(i) The third process unit CP is activated when it receives an update instruction message or a non-update message from vendor Vk over the network 12.

(j) The third process unit CP obtains the name of a destination user and the name of an object software from the header of the received message, refers to the corresponding user management data UDj, and confirms that the third process unit CP is currently in a standby state after inquiry and that the sender is a correct vendor Vk;

(k) if it receives a non-update message, records the received message and the process result, and returns to a standby state;

(l) if it receives an update instruction message, invokes a user-defined update reception process procedure, refers to the update instruction information in the received message, stores in the user computer 11 the software specified by the update instruction message, and actually installs the software if the specified software is acceptable; and (m) records the received message and the process result, and returns to a standby state.

When users U1, U2, . . . inquire the update state of an object software already used by them of vendors V1, V2, . . . and request to send an updated software, the following processes are performed.

In the user computer 11;

(a) the third process unit CP in the user computer 11 is activated according to the update inquiry command instruction of a user's program, invokes an automatically-editing update inquiry procedure, refers to user management data UDj, and generates an update inquiry message.

(b) The third process unit CP sends the generated message to the fourth process unit SP of the vendor Vk of software Si.

In the vendor computer 13;

(c) The fourth process unit SP is activated when it receives the update inquiry message over the network 12.

(d) The fourth process unit SP refers to vendor management data VDi about object software Si cited by the update inquiry to confirm the identification of the sending user Uj and determine the access qualification of the user;

(e) invokes, in response to the inquiry of the qualified user Uj, a update inquiry answering procedure to determine the version type Si.V to be supplied and its latest version Si.V.1, and compares it with user Uj's current version;

(f) if the current version of user Uj matches the latest version, then generates a non-update answer message, sends it to the third process unit CP of the inquiring user Uj;

(g) if the object software of the same version type as the current version of user Uj has been updated, then module delete/add instruction information and information about modules to be added are generated as an update instruction message as an answer, and the generated answer is sent to the third process unit CP of the inquiring user Uj over the network 12; and (h) if it is determined that the current version should be switched to a newly served version of object software Si, then generates a non-update and information message about a newly served version, and sends the generated information message to the third process unit CP of the inquiring user Uj over the network 12.

In the user computer 11;

(i) The third process unit CP is activated when it receives an update instruction message or a non-update message from vendor Vk over the network 12.

(j) The third process unit CP obtains the name of a destination user and the name of an object software from the header of the received message, refers to the corresponding user management data UDj, and confirms that the third process unit CP is currently in a standby state after inquiry and that the sender is a correct vendor Vk;

(k) if it receives a non-update message, records the received message and the process result, and returns to a standby state;

(l) if it receives an update instruction message, invokes a user-defined update reception process procedure, refers to the update instruction information in the received message, stores in the user computer 11 the software specified by the update instruction message, and actually installs the software if the specified software is acceptable, and (m) records the received message and the process result, and returns to a standby state.

If the third process unit CP receives a message from vendor Vk, and stores or installs in the user computer 11 new software, newly served software, or updated software received from vendor Vk, then the third process unit CP monitors the result of these processes and sends to the fourth process unit SP over the network 12 a process result confirmation message informing whether the process has terminated normally or abnormally.

Function of the Second Embodiment of the Present Invention

Function of the System

In FIG. 2, if users U1, U2, . . . activate an purchase inquiry instruction by specifying necessary software and vendors V1, V2, . . ., then the third process unit CP sends an purchase inquiry message to vendors VI, V2, . . . .

The fourth process unit SP of each vendor receives the message, checks the user's qualification, automatically performs processes according to vendor management data VD1, VD2, . . . , and answers the user.

The third process unit CP which sent the purchase inquiry message receives the answer and sends it to the user. If entire software is returned, the third process unit CP stores the software according to the instruction information in the answer.

The third process unit CP refers to user management data UD1, UD2, . . . to compile and link programs and automatically install the software at a predetermined area. Furthermore, if users U1, U2, . . . want to inquire whether or not the current software used by the users has been updated, and, in case of being updated, want to request the updated version of software, the users activate the third process unit CP with an update inquiry instruction. The third process unit CP refers to user management data UD1, UD2, . . . to extract the configuration of software Si.V currently being used by the user, add user identification information, and sends to vendors V1, V2, . . . an automatic update inquiry message.

If the fourth process unit SP receives the message, it checks the qualification of the user according to vendor management data VD1, VD2, . . . , and returns software update information only to the qualified user. It returns "no update" information if the software has not been updated, and returns a method of updating the software at user site and the software itself required for the update if the software has been updated. If the third process unit CP receives the above described answer from the fourth process unit SP, then it first stores the updated software according to the answer message and based on user management data UD1, UD2, . . . , replaces the old version according to the update instruction information, etc. in the answer message with the newly stored version, and compiles and links programs if necessary to set the new version in an executable format.

The update inquiry can be activated alternatively by a user, by an automatic activation caused by the user's invoke of the object software, and by an automatic activation at a time specified by a demon program (for example, every dawn, every week, every month, etc.).

If the software managed by the third process unit CP abnormally terminates in the user computer 11, then the third process unit CP detects the cause and the state of the abnormal termination, and automatically sends a fault report message to vendors V1, V2, . . . .

The fourth process unit SP records the message, reports it to the software developer, and returns a fault information acknowledgement message to the user.

Bugs are manually corrected by a software developer, and the correction is entered in the object software library of the vendor. Afterwards, an updated version is immediately provided for all the users.

As described above, the distribution and maintenance of object software is managed over the computer network 12 to which a number of users U1, U2, . . . who actually use plural sets of object software S1, S2, . . . and a number of software vendors V1, V2, . . . who supply the users with the above listed object software are connected. The software distribution/maintenance system comprises, in each user computer 11, object software SU1, SU2, . . . to be used by users U1, U2, . . ., and a third process unit CP for managing plural sets of object software SU1, SU2, . . . ; and, in each software vendor computer 13, vendor software libraries SL1, SL2, . . . and a fourth process unit SP for providing services relating to the software libraries SL1, SL2, . . . . The computer network 12 connects each user computer 11 to its vendor computer 13. As a result, a number of software vendors and users can distribute and use desired software, and various software developed and updated by software vendors can be distributed to users quickly and appropriately.

When any object software abnormally terminates during the operation, the third process unit CP detects and analyzes the abnormal condition, and then automatically sends the fault report to the fourth process unit SP of vendors V1, V2, . . . over the network 12. The fourth process unit SP of vendors V1, V2, . . . receives the fault report and informs vendors V1, V2, . . . of the fault. As a result, the software vendor immediately detects the occurrence of the fault of the software and can take an immediate action against the software fault.

A single computer can be used by users U1, U2, . . . of a version of software and at the same time by vendors V1, V2, . . . , and furthermore, a single computer can be provided with one or more third process units CP and one or more fourth process units SP. As a result, a computer and also a person using a computer can have a simultaneous role of a user and a vendor. This also allows, if properly authorized, easy re-distribution of software.

Each user computer 11 can be designed to store user management data UD1, UD2, . . . for each of users U1, U2, . . . or each user group, and the data can be set for each object software. The third process unit CP refers to user management data UD1, UD2, . . . to manage one or more sets of object software SU1, SU2, . . . As a result, the third process unit CP can be unified among users, and various settings can easily be defined for respective users and for respective software.

User management data UD1, UD2, . . . can be designed to comprise user identification information of each user U1, U2, . . . or each user group, software management information of each object software used by each user U1, U2, . . . , software configuration information, and message process method specification information. As a result, the third process unit CP can be unified among users, and various settings can be easily defined for respective users and for respective software.

Users U1, U2, . . . can specify a process method as a procedure for each function performed by the third process unit CP. As a result, the third process unit CP can be unified among users, and an appropriate process method can be defined for each user and for each software.

Among message processing methods in user management data UD1, UD2, . . . , a vendor confirmation procedure can be specified. As a result, the third process unit CP can be unified among users and software, and a method of confirming the vendor can be defined for each user and for each software.

When the fourth process unit SP of the vendor computer 13 offers services using software libraries SL1, SL2 . . . , it can refer to vendor management data VD1, VD2 stored for each software library SL1, SL2, . . . As a result, the fourth process unit SP can be unified for software libraries Sl1, SL2, . . . , and each vendor can easily and properly define various settings for each software library.

Vendor management data VD1, VD2 can be designed to comprise the vendor identification information, software management information, software configuration information, message process method specification information, customer information, and fault history information. As a result, the fourth process unit SP can be unified for software libraries SL1, SL2, . . . , and each vendor can easily and properly define various settings for each software library.

When a message process method is specified using vendor management data VD1, VD2, vendors V1, V2, . . . can specify a method of the process as a procedure for each function performed by the fourth process unit SP. As a result, the fourth process unit SP can be unified for vendors, and each vendor can easily and properly define various settings for each process method and for each software library.

When a message process method is specified using vendor management data VD1, VD2, a user confirmation procedure can be specified. As a result, the fourth process unit SP can be unified for vendors, and each vendor can easily and properly define various settings of a user confirmation process method for each software library.

Users U1, U2, . . . can simultaneously obtain and use a plurality of versions of each object software. As a result, a user can use the software of an old version which can be easily manipulated with good stability as well as the software of a new version having new functions, thereby improving the utility of the software.

Function of the Processing Method

The distribution and maintenance of object software is managed over the communications network 12 to which a number of users U1, U2, . . . who actually use plural sets of object software S1, S2, . . . to be distributed, managed, and maintained and a number of software vendors V1, V2, . . . who supply the users with the above listed object software are connected. The software distribution/maintenance system comprises, in each user computer 11, object software SU1, SU2, . . . to be used by users U1, U2, . . . , and a third process unit CP for managing plural sets of object software SU1, SU2, . . . ; in each software vendor computer 13, vendor software libraries SL1, SL2, and a fourth process unit SP for providing services related to the software libraries SL1, SL2, . . . ; and a network 12 for connecting each user computer 11 and vendor computer 13. This system performs processes (a) through (e). Thus, a number of software vendors and users can distribute, maintain and use desired software, and various software developed and updated by software vendors can be distributed to and maintained at users quickly and appropriately.

When any object software managed by the third process unit CP in the user computer 11 abnormally terminates during its operation, the third process unit CP detects and analyzes the abnormal condition, and then sends the fault report message to the vendor Vk of the software over the network 12. The fourth process unit SP of vendor Vk receives the fault report message over the network 12, and informs the vendor Vk of the fault. As a result, the software vendor immediately detects the occurrence of the fault of the software and can take an immediate action against the software fault.

Function of Management Data and Processing in a User Computer

Each user computer 11 can be designed to store user management data UD1, UD2, . . . for each of users U1, U2, . . . or each user group, and the data can be set for each object software. The third process unit CP refers to user management data UD1, UD2, . . . to manage one or more sets of object software SU1, SU2, . . . . As a result, the third process unit CP can be unified among users, and various settings can easily and properly be defined for respective users.

User management data UD1, UD2, . . . can be designed to comprise at least user identification information of users U1, U2, . . . or each user group, software management information of each object software used by the user, software configuration information, and message process method specification information. The third process unit CP refers to user management data UD1, UD2, . . . As a result, the third process unit CP can be unified among users, and various settings can easily and properly be defined for respective users.

In referring to a method of processing a message according to user management data UD1, UD2, . . . , users U1, U2, . . . can specify and use a process method as a procedure for each function performed by the third process unit CP. As a result, the third process unit CP can be unified among users, and an appropriate process method can easily and properly be defined for each user.

In referring to the message processing methods in user management data UD1, UD2, . . . , a user defined vendor confirmation procedure can be used so that the message received by the third process unit CP can be recognized as a correct message from the predetermined vender Vk. As a result, the third process unit CP can be unified among users, and a method of confirming the vendor can easily and properly be defined for each user and for each software.

When users U1, U2, . . . activate the third process unit CP in the user computer 11 by inputting a command, the third process unit CP obtains a user name, a command name, and an object software name to generate an interactive screen displaying messages according to the input command, promotes the generation of a message in response to the command from user Uj by referring to user management data UDj of user Uj and object software Si or by invoking a user-defined process procedure, sends the generated message to the fourth process unit SP of the computer of vendors Vk of object software Si, and returns to a standby state after recording the transmission of the message. As a result, users can easily generate a message in an interactive mode, thereby allowing unskilled users to easily utilize software.

If the third process unit CP is activated in the user computer 11 by an input command from a user program or through an abnormal termination of the object software managed by the third process unit CP, the third process unit CP obtains a user name, a command name, and an object software name, promotes the generation of a response message by referring to user management data UDj and object software Si or by invoking a user-defined process procedure, sends the generated message to the fourth process unit SP of the computer of the vendor Vk of object software Si, and returns to a standby state after recording the transmission of the message. As a result, the third process unit CP can be activated when a user activates object software, when the object software abnormally terminates, or when a demon program sends a command, etc. If an update inquiry is issued whenever the object software is activated, the user can always use an updated object software. If update inquiries of object software are made through the demon program, at night, in an early morning, etc., then the inquiries can be answered without a wait at, for example, the activation of the object software. Furthermore, activating the third process unit CP at, for example, an abnormal termination allows the software vendor to immediately detect bugs of the supplied software, thereby performing a quick maintenance process.

If the third process unit CP is activated in the user computer 11 by a message received from the network 12, then the third process unit CP obtains from the header of the received message a destination user name, a command name, and an object software name, uses user management data UDj for the specified user Uj and object software Si, then obtains a sender name from the header of the received message, confirms that the sender is a right vendor Vk of object software Si, also confirms that the third process unit CP is in an answer-wait state, refers to user management data UDj or invokes the user-defined process procedure depending on the command in the received message, analyzes or stores the message data or stores or installs the software specified by the message, returns, in response to a specific message which requires acknowledgement, the acknowledgement to the fourth process unit SP over the network 12, and then returns to a standby state after recording the transmission of the message. As a result, when the third process unit CP receives a message, it confirms the vendor, analyzes the message, installs the software according to the message based on user management data UD1, UD2, . . . and a user-defined process procedure.

The third process unit CP performs the processes depending on the cause of the activation of the third process unit CP. As a result, the third process unit CP can be activated at an appropriate timing.

Each time the third process unit CP is activated, a new process is generated.to allow plural processes to be performed in parallel on the processes other than the process relating to a specific object software of a specific user. As a result, a plurality of processes such as purchase requests, update inquiries, etc. from a plurality of users can be concurrently performed.

Function of Management Data and Processing in a Vendor Computer

When the fourth process unit; SP in the vendor computer 13 offers services using software libraries SL1, SL2, . . . , vendor management data VDi, which is stored for each software library SLi, is referrence. As a result, the fourth process unit SP can be unified for software libraries SL1, SL2, . . . , and vendors can easily and properly define various settings for each software library.

When the fourth process unit SP refers to vendor management data VDi for a software library SLi, it refers to at least the vendor identification information, software management information, software configuration information, message process method specification information, customer information, update history information, and fault history information. As a result, the fourth process unit SP can be unified for software libraries SL1, SL2, . . . and vendors can easily and properly define various settings for each software library.

When a message process method in the vendor management data VDi is referred to, vendor Vk can invoke the process method as a procedure for each function performed by the fourth process unit SP. As a result, the fourth process unit SP can be unified among vendors, and each vendor can easily and properly define various settings for a process method.

When a message process method in the vendor management data VDi is referred to, a user confirmation procedure can be invoked to confirm the identity of user Uj who is a sender of the message, determine the qualification of the user, and return appropriate answer to the user. As a result, a method of confirming and qualifying a user can be defined for each vendor, and the present invention can De used in distributing various types of software.

In the user confirmation procedure as a part of the vendor management data VDi, the qualification of a user can be determined on the basis of commercial relations such as contracts relating to the object software, payments relating to the object software, payments relating to new services for the object software, etc. As a result, the present invention can be used in distributing various types of software, including commercial product software.

In the user confirmation procedure as a part of the vendor management data VDi, the object software can be provided and distributed only to specified users U1, U2, . . . by referring to their identification information such as the organizations to which they belong, their titles, personal names, etc. As a result, the present invention can be used in distributing various types of software, including contract-base software and intra-office software.

In the user confirmation procedure as a part of vendor management data VDi, users U1, U2, . . . can be identified by passwords. As a result, software can be protected from being distributed to an unqualified user. This makes the present invention applicable to distribute various types of software, including product software and intra-of fice software.

The user computer 11 and the vendor computer 13 need to be connected to the network 12 only when it sends or receives messages to or from each other. As a result, even a computer not constantly connected to the network can supply/obtain desired software, in a way similar to the communication by mails and telephones. This feature makes the present way of software distribution to be cost-effective and widely applicable.

The header of a message transmitted over the network 12 specifies the destination and the source of the message. Additionally, the title column of the message specifies the name of a software distribution/maintenance system, the name of a software distribution/maintenance process type, and the name of the object system. As a result, the destination, sender, system name, etc. can be easily informed of.

The fourth process unit SP in the vendor computer 13 performs the processes (a)–(g). As a result, when the fourth process unit SP receives a message, it determines the access qualification of a user, analyzes the message, and generates an answer message according to the received message.

Each time the fourth process unit SP is activated, a new process is generated to allow a plurality of processes to be concurrently performed on the processes other than the process relating to the same object software and the same user. As a result, a plurality of processes can be concurrently performed on the messages received from a number of users over a network.

Function of Distribution and Maintenance Processes

When users U1, U2, . . . obtain the summary information of the object software not yet used by them, the processes (a)–(f) are performed. As a result, summary information required by qualified users U1, U2, . . . can be provided quickly and appropriately.

When users U1, U2, . . . newly obtain an object software not yet used by them, the processes (a)—(j) are performed. As a result, a newly served object software required by qualified users U1, U2, . . . can be provided quickly and appropriately. Since the new version can also be installed, an unskilled user can easily utilize an obtained object software.

When users U1, U2, . . . add or switch to a new service of an object software already used by them, the processes (a)–(j) are performed. As a result, a newly served object software required by qualified users U1, U2, . . . can be provided quickly and appropriately. Since the new service of the supplied software can also be installed, an unskilled user can easily utilize an obtained object software.

When users U1, U2, . . . inquire the update state of an object software already used by them of vendors V1, V2, . . . and request to send an updated software, the processes (a)–(m) are performed after entering a new service request command and activating the third process unit CP in the user computer 11. As a result, qualified users U1, U2, . . . can be, at any time, quickly informed of whether or not update information exists. If the object software has been updated, then the updated object software can be obtained immediately. Furthermore, since the updated software can also be installed, an unskilled user can readily utilize the object software obtained.

When the third process unit CP is activated by update inquiry command issued from the user's program, processes (a)–(m) are performed. As a result, qualified users U1, U2, . . . can automatically update object software at night or in an early morning, for example, if update information exists. Thus, a user can constantly utilize updated object software. Furthermore, since the updated software can also be installed, an unskilled user can readily utilize the object software obtained.

If the third process unit CP receives a message from vendors V1, V2, . . . and stores or installs in the user computer 11 new software, newly served software, or updated software received from vendor Vk, then the third process unit CP monitors the result of these processes and sends to the fourth process unit SP of vendors V1, V2, . . . over the network 12 a process result confirmation message informing whether the process has terminated normally or abnormally. As a result, the vendor can recognize a process result in the user computer 11.

Explanation of the Preferred Embodiments

Explanation of the First Preferred Embodiment (1) System Configuration

Figure 3:
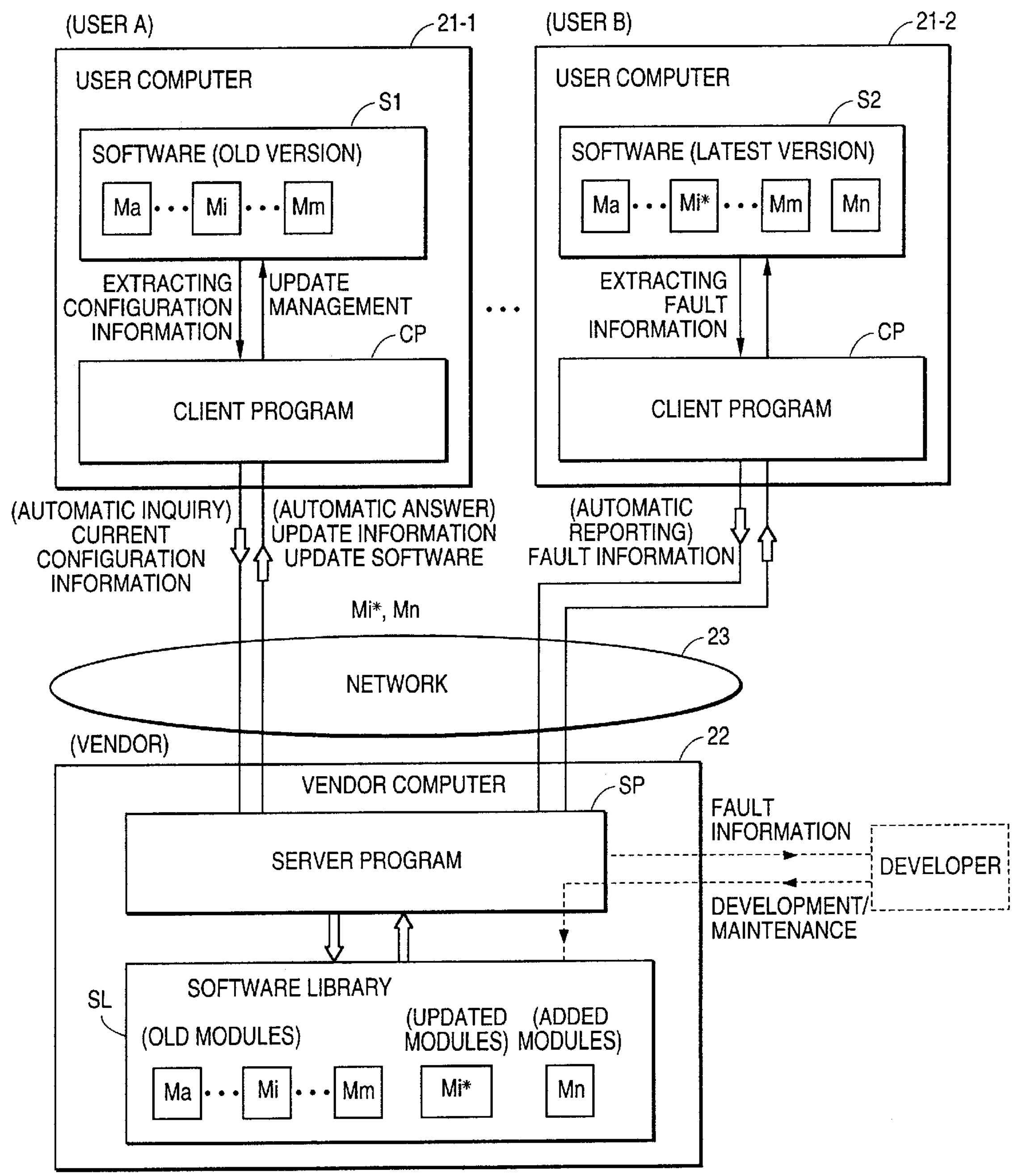
FIG. 3 shows the system configuration according to the first embodiment.

FIG. 3 shows the configuration of the system according to the first embodiment. In FIG. 3, computers 21-1 and 21-2 respectively belong to users A and B. Each of the computers 21-1 and 21-2 is equipped with a client program CP for automatically updating the software in the user computer and sending fault information.

The computer of user A stores; software Si of an old configuration, and the computer of user B stores the same software Si of the latest version. The software is managed by the client program CP. As described above, software is identified as Si.V.1 in the full notation, but in the first embodiment, the software of a certain type can simply be represented as Si.1.

A computer 22 belongs to a vendor and comprises a server program SP used to automatically update software in a user computer; and a software library SL (of one type) managed by the server program SP.

A communications network 23 connects the user computers 21-1 and 21-2 to the vendor computer 22, and the client program CP and the server program SP exchange information over the network 23. The network 23 can be either a private line or a common line, establishes connections through the client program CP or the server program SP, and only has to be used during the transmission of the information.

The server program SP in the vendor computer 22 manages (specifically manages the version number and the configuration of software) the object software library SL which is obtained through development/maintenance processes performed by a vendor. If the server program SP receives from the client program CP in the user computers 21-1 and 21-2 the information of a user's current software configuration, then it compares the information with the corresponding software library SL, and automatically returns to the client program CP the update instruction information for updating user software S1 and S2 together with updated software modules.

The software library SL in the vendor computer 22 comprises a plurality of modules Ma, . . . , Mn, stores information about bug correction, update, added functions, added modules, etc. of each module, and maintains the version numbers and configurations of each module. For the sake of simplicity of explanation, simple representation is assigned to a module using symbols and numbers.

In the software library SL shown in FIG. 3, while the conventional version comprises the modules Ma, . . . , Mi, . . . , Mm, module Mi is updated into Mi* and new module Mn is added. Thus, the latest version comprises modules Ma, . . . , Mi*, . . . , Mm, Mn.

The client program CP in the user computers 21-1 and 21-2 manages the configuration of the object software. If an object software is activated, the client program CP extracts the information of the configuration of the current software (current version information) before the execution of the software, sends the information to the server program SP through the network 23, and inquires whether or not the information refers to the latest version.

Upon receipt of an answer from the server program SP, the client program CP updates the object software in the user computer if necessary according to the instruction in the answer. Then, it activates the updated software according to the user-activated instruction.

In FIG. 3, the software Si in the computer 21-1 of user A comprises modules Ma, . . . , Mi, . . . , Mm of the old configuration, while the one in the computer 21-2 of user B comprises modules Ma, . . . , Mi*, . . . Mm, Mn of the latest configuration. These modules are managed by the client program CP.

In FIG. 3, when user A tries to activate software Si in the user computer 21-1, the client program CP detects it and inquires the server program SP in the vendor computer 22 over the network 23 by sending the information about the current version. According to the example shown in FIG. 3, software Si of the user computer 21-1 comprises modules Ma, . . . , Mi, . . . , Mm, and the configuration information is sent to the server program SP over the network 23 for inquiry.

Upon receipt of the information, the server program SP compares the information with the configuration of the software library SL, and returns the instruction information for updating software Si of user A together with the updated software. In this example, returned is the instruction informing that module Mi is updated into Mi* and module Mn is added and the body of the updated module Mi* and added module Mn.

The client program CP of user A automatically updates software Si into the latest version using the information. According to the example, software Si in the user computer 21-1 is updated into modules Ma, . . . , Mi*, . . . , Mm, Mn. As a result, software Si of user A is updated to the latest version, just like the software Si of the computer of user B. Then, the client program CP activates the latest software according to the instruction of user A.

(2) Automatic Update of User Software

Described below is the automatic update process performed when a user activates the object software in the user computer.

(i) Process in User Computer

Figure 4:
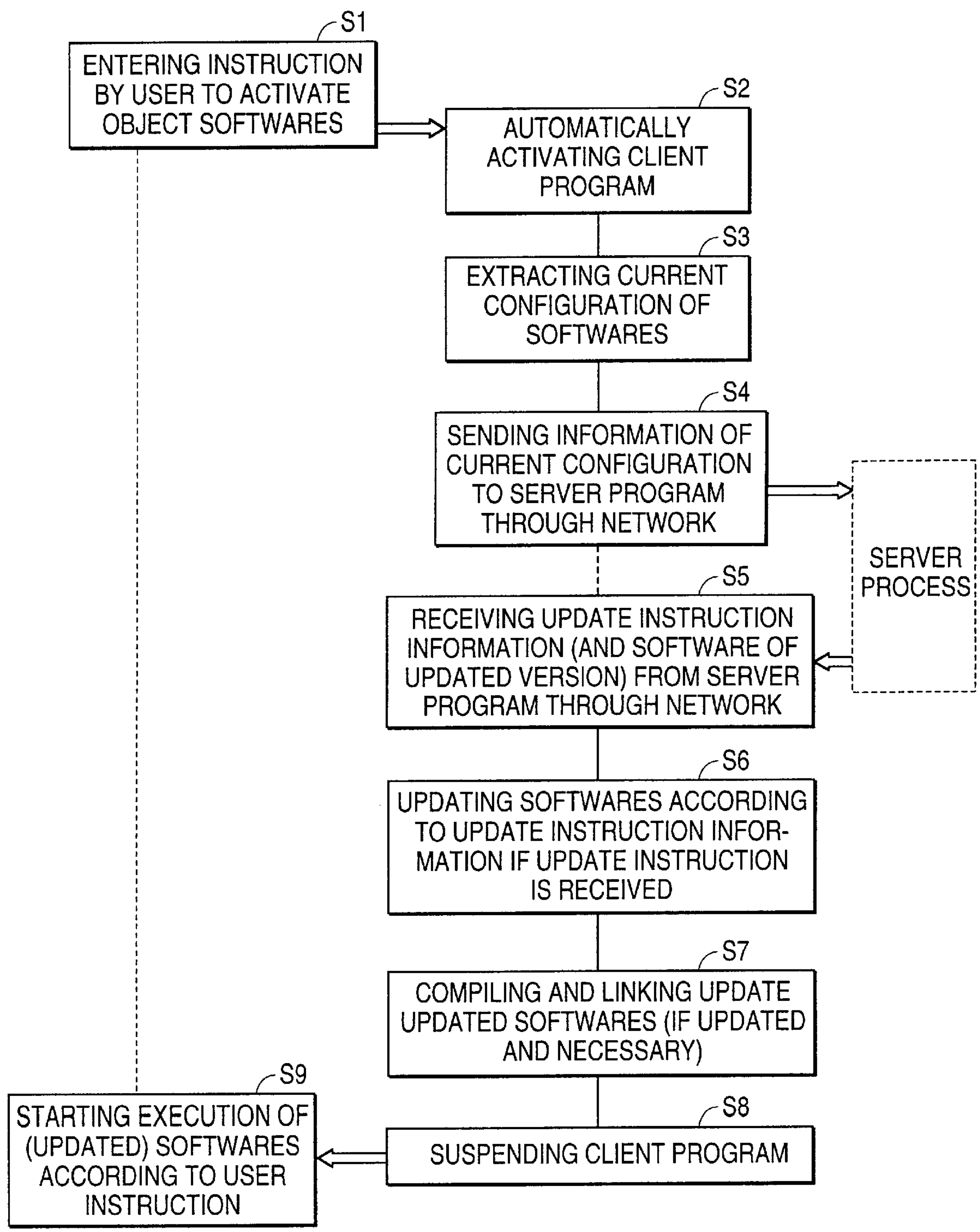
FIG. 4 shows the process performed by a user computer according to the first embodiment.

FIG. 4 is a flowchart showing the process in which a program stored in a user computer is automatically managed and updated in the system shown in FIG. 3. The process of a client program is described below by referring to FIG. 4.

If a user activates the object software in step S1, the client program CP managing the object software is automatically activated in step S2.

In step S3, the client program CP extracts the version information of the current object software. For example, in the case of user A shown in FIG. 3, the configuration information of modules Ma, . . . , Mi, . . . , Mm is extracted. Then, in step S4, the client program CP sends the current version information to the server program SP over the network 23.

In step S5, the client program CP receives from the server program SP the update instruction information of the object software and the updated software.

If the software has not been updated, then the update instruction information informs of no need of update. If the information tells no need of update or deletion of modules only, then no updated software is transmitted. If the software should be updated, then updated software is received, but received is only the modules to be updated into.

In the example of user A shown in FIG. 3, the instruction to delete Mi and add Mi* and insert Mn is received as the update instruction information as described above. The software of module Mi* and Mn are received as updated software.

In step S6, necessary processes are performed according to the update information. That is, if update instruction information indicates the update of modules, then specified modules are deleted from the object software and updated modules are added to the original modules. If the update instruction information tells no need of update, then no actions are taken.

Thus, the object software in the user computer matches the software library SL of the vendor.

In the example shown in FIG. 3, the object software in the computer of user A is updated into modules Ma, . . . , Mi*, . . . , Mm, Mn as described above. If the object software in the user computer is updated as described above, it is compiled and linked before the execution, if necessary, in step S7. In step S8, the client program CP is suspended after terminating its process.

In step S9, the object software is activated to start its execution according to a user's activation instruction. At this time, according to the above described steps S2–S8, it is guaranteed that the object software is the latest version of the software provided by the vendor.

(ii) Process Performed by Vendor Computers

FIG. 5 shows the process performed by a vendor computer. The process performed by the server program SP in the vendor computer 22 is described below.

In step S11, the server program is activated in the vendor computer 22 and set in a standby state.

In step S12, the server program receives an update inquiry from a client program in any user computer over the network 23, and receives the configuration information of the object software's current version. In the example shown in FIG. 3, the information received in an inquiry from user A indicates the module configuration of Ma, . . . , Mi, . . . , Mm.

In step S13, the server program SP compares the configuration with that of the object software in the software library SL managed by the server program SP, and generates update instruction information used to update the object software of the inquiring user. If the configuration of the user's current version matches the configuration in the software library SL, then the update instruction information tells "no need of update".

In the example of user A shown in FIG. 3, the update instruction information tells "delete Mi and add Mi* and Mn".

In step S14, the server program SP answers the inquiring client program CP with the update instruction information and the updated software required to update the user software.

As described above, the entire updated software is not sent, but only the updated or added modules are sent to the client program. In the example of user A in FIG. 3, the above described update instruction information and the software modules Mi* and Mn are returned.

In step S15, the server program SP is returned to a standby state, and control is returned to step S12 upon receipt of an inquiry. These processes are repeatedly performed.

(3) Periodical Automatic Update and User-Defined Update of User Object Software

Some users do not like to be kept waiting in updating the software to be processed according to the above embodiment of the activation of update inquiry at the time of user's activation of the object software.

In such cases, the object software can be automatically inquired for update and then automatically updated.

To attain this, a demon program can activate for the user the client program CP in the above described embodiment.

Figure 6:
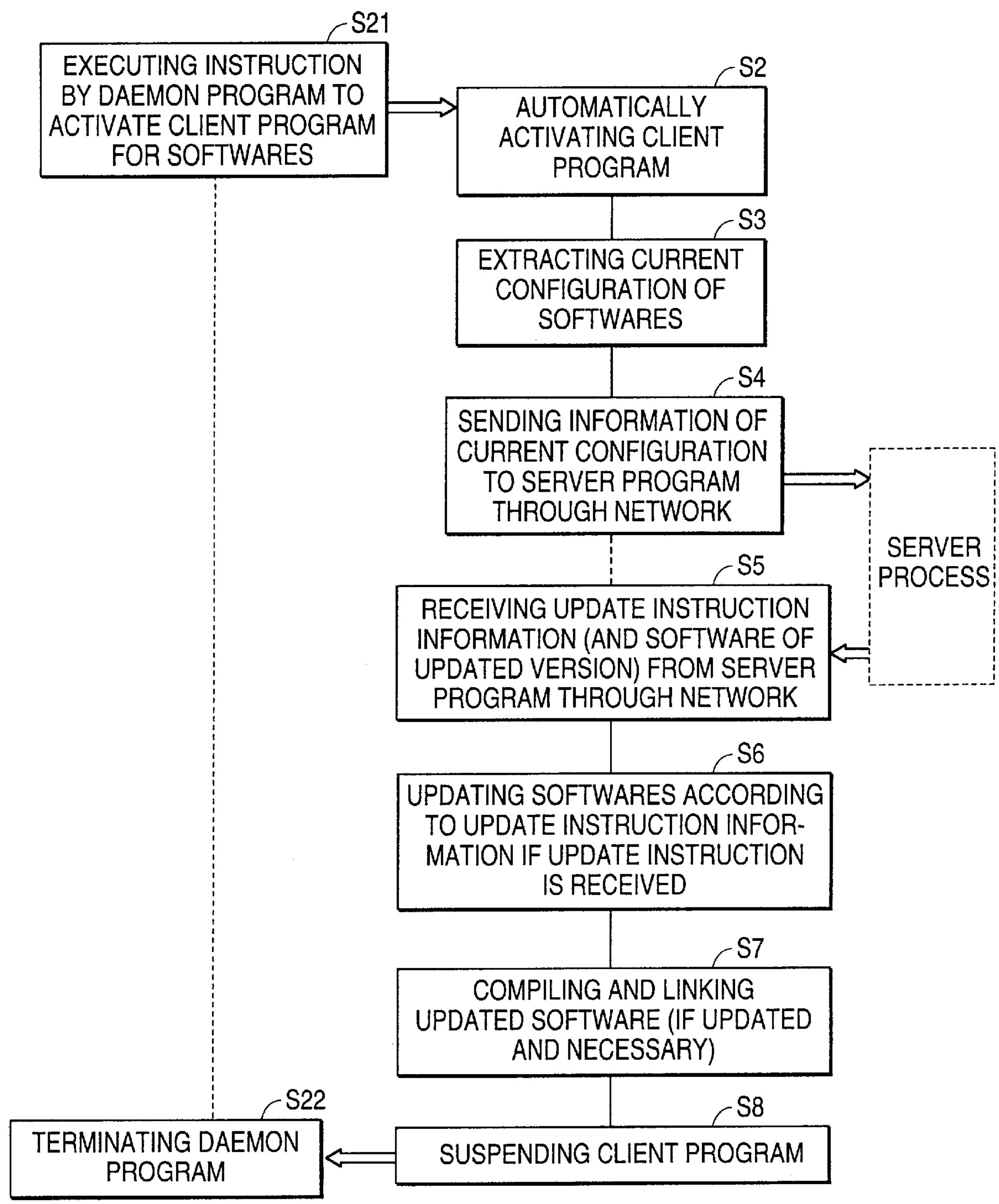
FIG. 6 shows the process for periodical update in a user computer according to the first embodiment.

FIG. 6 shows the activation of the client program through the above described demon program. FIG. 6 differs in steps S1 and S9 from the processes shown in FIG. 4, and remains the same in steps S2 through S8.

In FIG. 6, if the demon program is activated at predetermined intervals, e.g. at night, it executes an instruction to activate the client program on the object software in step S21. Then the client program is activated in step S2, and the above described processes are performed in steps S2–S8.

If the client program is suspended in step S8, the demon program terminates in step S22.

Instead of activating a client program with a demon program, a user can directly enter a command, to activate the client program. Thus, the object software can be automatically activated whenever necessary.

(4) Automatic Transmission of Software Fault Information

The client program CP shown in the present embodiment automatically transmits to the vendor computer 22 the object software fault/bug information detected in the user computers 21-1 and 21-2 so that the information is transmitted to the developer of the software.

That is, while the object software is executed in the user computers 21-1 and 21-2, the object software may work in an unexpected manner and terminate abnormally. This is caused by a fault/bug in the object software or in the software used by the object software.

In this case, the client program CP collects the information of conditions of the abnormal termination, such as an instruction which directly caused the abnormal termination, the state of the abnormal termination, a sequence of higher-level instructions which invoked the instruction, etc.

The above described information is immediately transmitted to the server program in the vendor computer 22 or the mail box of the developer of the software through the network 23.

The fault/bug information is received by the server program SP in the vendor computer 22, and the developer or the maintainer of the object software refers to the information for correcting the software or for developing a new feature of the software.

If a developer of the software enters a correction in a module in the software library SL stored in the vendor computer 22, then the object software in the user computers 21-1 and 21-2 can be automatically updated when the client program CP issues an update inquiry of the object software.

The fault/bug information can be transmitted through an electronic mail over the network 23.

The user computer 21-2 of user 13 according to the embodiment shown in FIG. 3 indicates the state of automatically sending the fault information. The automatically transmitted fault information received by the server program in the vendor computer 22, and the fault is reported to the developer of the software.

(5) Other Functions

The following configuration can be designed in the system according to the first embodiment.

(i) Network Connection

In the above mentioned embodiment, it is essential that a user computer and a vendor computer are connected to each other over a network. However, the connection is not required continuously. That is, a user computer only has to be connected by a client program and a server program (or transmission mail-box programs in the network which relay an inquiry from the client program or an answer from the server program) over a network from time to time just to transmit the messages in steps S4 and S5 shown in FIG. 4.

(ii) Initial Installation

If a user wants to purchase and install software provided with the above mentioned automatic update function, the software should be obtained and installed in any of the above listed methods (a), (b), and (c) of the prior art technologies.

If a network is available, the easiest method is to obtain and install a client program for software to be obtained through method (c), for example.

Activating the update inquiry of software to be obtained as if the object software were stored already in the user computer allows the client program to issue an inquiry to the vendor computer and to receive the entire module of the latest version from the vendor computer over the network. The received module can be installed and executed in the user computer.

(iii) Distribution of Non-execution Information and Automatic Update

The software to be processed according to the present embodiment can be information of the software such as explanation of new services, user handbooks, examples, etc. as well as an executable program. The information can be processed as if it were a module.

Thus, the information of the latest version can be always provided for a user by a vendor.

(6) Practical Embodiment of the Present Invention

Figure 7:
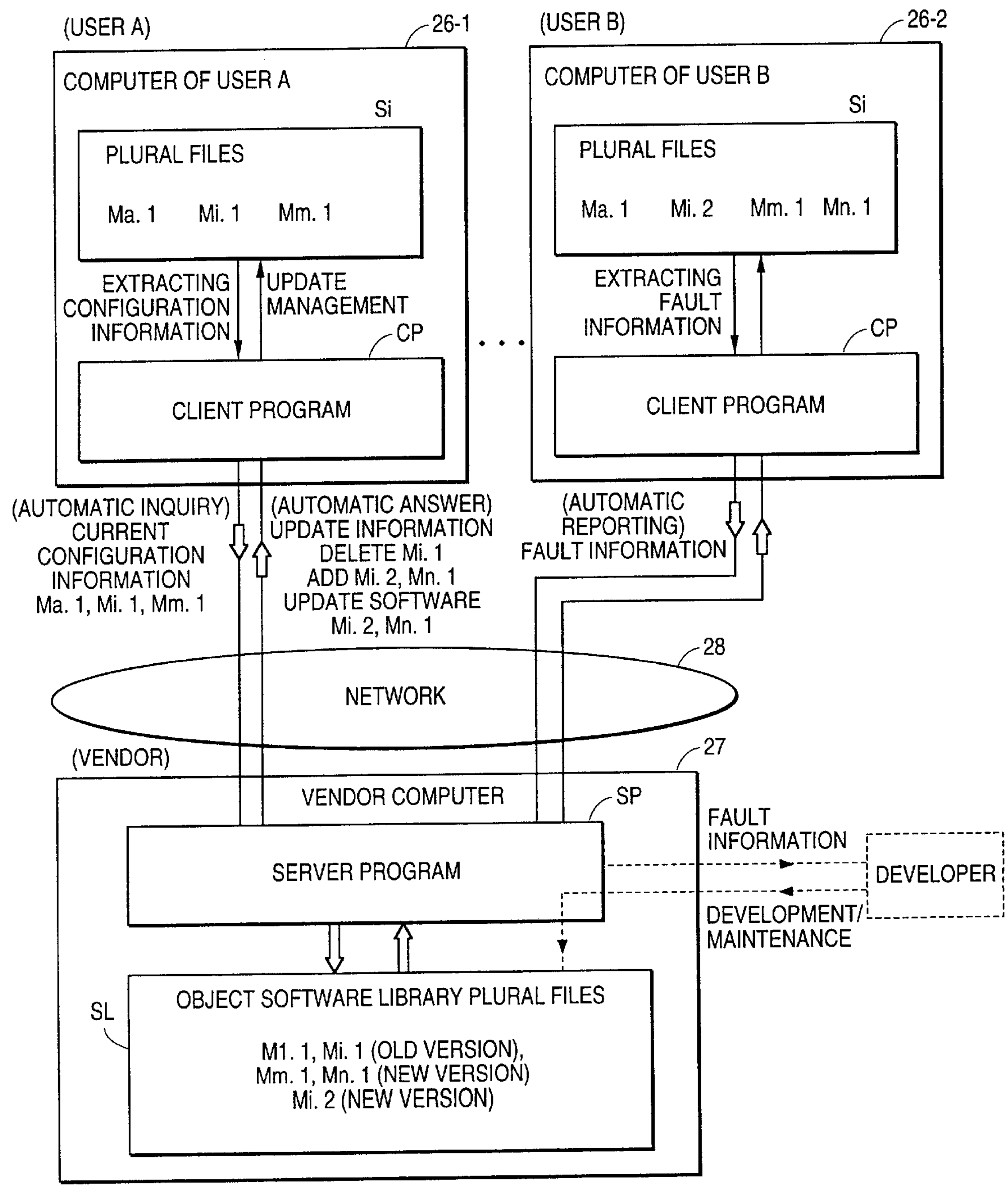
FIG. 7 shows a practical example of the first embodiment.

The system shown in FIG. 7 is designed using a UNIX network connecting a computer to work stations based on the client/server system in an X window system which is a typical multiwindow system.

The system configuration and the processes performed by the client program and the server program are the same as those shown in FIG. 3.

As for a software library SL in a vendor computer 27, a directory in the UNIX file system is used as a library of the modules of the object software. Each module is used as a UNIX source file, and a file name is a unique module identification name followed by a version number as an extension.

That is, in FIG. 7, Ma.1 and Mi.2 are generated by adding the numbers 0.1 and 0.2 to the end of the module identification names Ma and Mi respectively. The software in user computers 26-1 and 26-2 is entered in a UNIX directory.

The client program CP is stored in the user computers 26-1 and 26-2 and manages the extraction of library information, update of the software, and communications to the server program SP over a network 28.

When a user activates the object software, the client program CP generates a list of file names in a directory managed by the client program CP, and transmits it to the server program SP of the vendor computer 27. The client program CP receives an answer from the server program SP of the vendor computer 27, and deletes unnecessary files and enters received files (or modules) according to an instruction of the server program SP.

The vendor computer 27 stores the server program SP which manages a library of the object software and the versions of all modules based on the development and update of the software developer.

When module configuration information of the user computer is transmitted from the client program CP, the server program SP receives the information and determines which module is required, unnecessary, or an old version in the software configuration of the client. Then, the server program SP specifies the names of the modules to be deleted and installed to generate update information as an answer to the client program CP. The update information and the modules to be installed are provided for the client program over the network 28.

The example in FIG. 7 shows that modules Ma.1, Mi.1, and Mm.1 are transmitted as the object software of the current version from the user computer 26-1.

The server program SP in the vendor computer 27 receives the information, compares the received current version information with the files in the object software library SL to determine which module is required, unnecessary, or an old version. Then, the server program SP of the vendor computer 27 generates "delete Mi.1, add Mi.2 and Mn.1" as update instruction information, and sends the update instruction information and the updated software Mi.2 and Mn.1 for update to the user computer 26-1. When the user computer 26-1 of user A receives the information, the client program CP updates the object software based on the received information.

In the example, the client program CP is provided with the function of automatically analyzing and transmitting the fault/bug information described in (4) above.

That is, if the object software in the user computers 26-1 and 26-2 abnormally terminates during the execution, it locates the direct cause of the abnormal termination and the source of the related instruction, and lists the instruction sequence associated with the related instruction. The information is described as fault/bug information.

The fault information is transmitted to the server program SP over a network. In this example, the information is transmitted by electronic mail. In the example shown in FIG. 7, the user computer 26-2 of user B automatically transmits the fault information to the vendor computer 27.

In the present embodiment, the object software actually generated and operated is multifunction and multimedia information retrieval software which is similar to a hyper text, and is described in tcl/tk language, that is, a kind of script language.

An example of fault/bug information automatically transmitted by an electronic mail from a client program of a user computer is shown.

Date; Thu. 28 Oct 93 16:36:12 JST
From; userA@ling.flab.fujitsu.co.jp(User NameA)
To; yuji@iias.flab.fujitsu.co.jp(Yuji takada)
Subject; ISISinfo bug!
Message:
couldn't find "/bin/play" to execute
ErrorInfo:
couldn't find "/bin/play" to execute while executing
"exec /bin/play - V 20 yuji10488/yuji.au"("eval" body line 1) invoked from within
"eval exec /bin/play - V 20 yuji10488/yuji.au"invoked from within
".bw View.bw1048.media.voice invoke"
. . . "tk-butUp.bwView.bw10488.media.voice"(command bound to event)

Data 1 describe the date, sender, destination, and occurrence of abnormal termination; data 2 describe the instruction which caused the abnormal termination, and the cause of the abnormal termination (in this example, the message tells that "/bin/play/" cannot be found); and data 3 describe higher-level instruction sequence which invoked the instruction that caused the abnormal termination.

According to the first embodiment, the functions and descriptive language of the software is not limited to the above described example, but can be optionally selected in the range of the first embodiment.

Effects of the First Embodiment

According to the first embodiment, as described above, a user computer stores a client program for managing the configuration and the execution of the object software, and a vendor computer, which is connected to the user computer over a network, stores a software library and a server program for managing a software library and automatically updates and remotely manages the software of the user computer. Therefore, problems (1)–(10) of the prior art can be successfully solved. The effects of the first embodiments can be listed corresponding to the respective problems as follows.

The effects from the viewpoint of a vendor are that:

(1) A vendor can automatically recognize the current configurations of the software in the computers of a number of users.

This facility forms the basis of software maintenance services and allows the software maintenance services to be realized efficiently and smoothly.

(2) If the vendor detects a bug and corrects the software library of the vendor, then the user who executes the object software in the user computer can automatically execute the updated software, thereby allowing the user to be immediately given the bug correction service from the vendor.

(3) If the vendor enters new services such as extended functions, new versions, etc. in the software library, then they can be immediately provided for a number of users who actually use the software.

(4) The vendor can automatically recognize who the users actually use the software are, and automatically provide them the latest software and the latest related information.

(5) Since the system of the present invention can automatically install (re-install) the software in the user computers, the vendor does not have to visit the users to install the software, but makes all services available to the users.

On the other hand, the effects from the viewpoint of a user are that:

(6) The system according to the present invention automatically installs the software and manages updated versions of the software. Therefore, the user are not required of special skills and efforts. Even a beginner or an unskilled user can be sufficiently provided with the latest services of the software.

(7) When the software in the user computer becomes faulty, the management system automatically reports the exact information of the fault to the vendor. In response to the report, the vendor removes the fault and corrects the software library. Then, the user can immediately use and execute the corrected software.

Since all the above listed processes are performed automatically except the correction process by the vendor, users are not loaded with additional work.

(8) If the vendor enters newly added functions and versions in the software library, they are automatically available to the users in the user computers when the users first use the software immediately after the entry. Thus, the users are free of extra time or jobs.

(9) The uses are not required to know the information of correcting bugs, adding functions, starting a new version, etc. When these services are issued, they are automatically available to the users, thereby preventing the users from being kept using the software as an old inconvenient version.

(10) The users are free of frequent information from the vendor or a troublesome installation process pertaining to the correction of bugs and addition of functions. The users can automatically access all new services.

Summing up the above listed effects of the present invention, the users can be automatically provided with new services of a new version of the software which replaces its old version in the user computer immediately after the vendor enters in the vender computer the correction of bugs, addition of functions, and generation of new versions for the software.

Additionally, considering that a large number of users (as many as thousands or even millions of users) use the software at various locations in the world, the effects of automatic distribution and update of the software using the software distribution/maintenance system over a network can be greatly evaluated by the vendors and users.

Explanation of the Second Preferred Embodiment

Described below in detail is the second embodiment of the present invention.

(1) System Configuration

Figure 8:
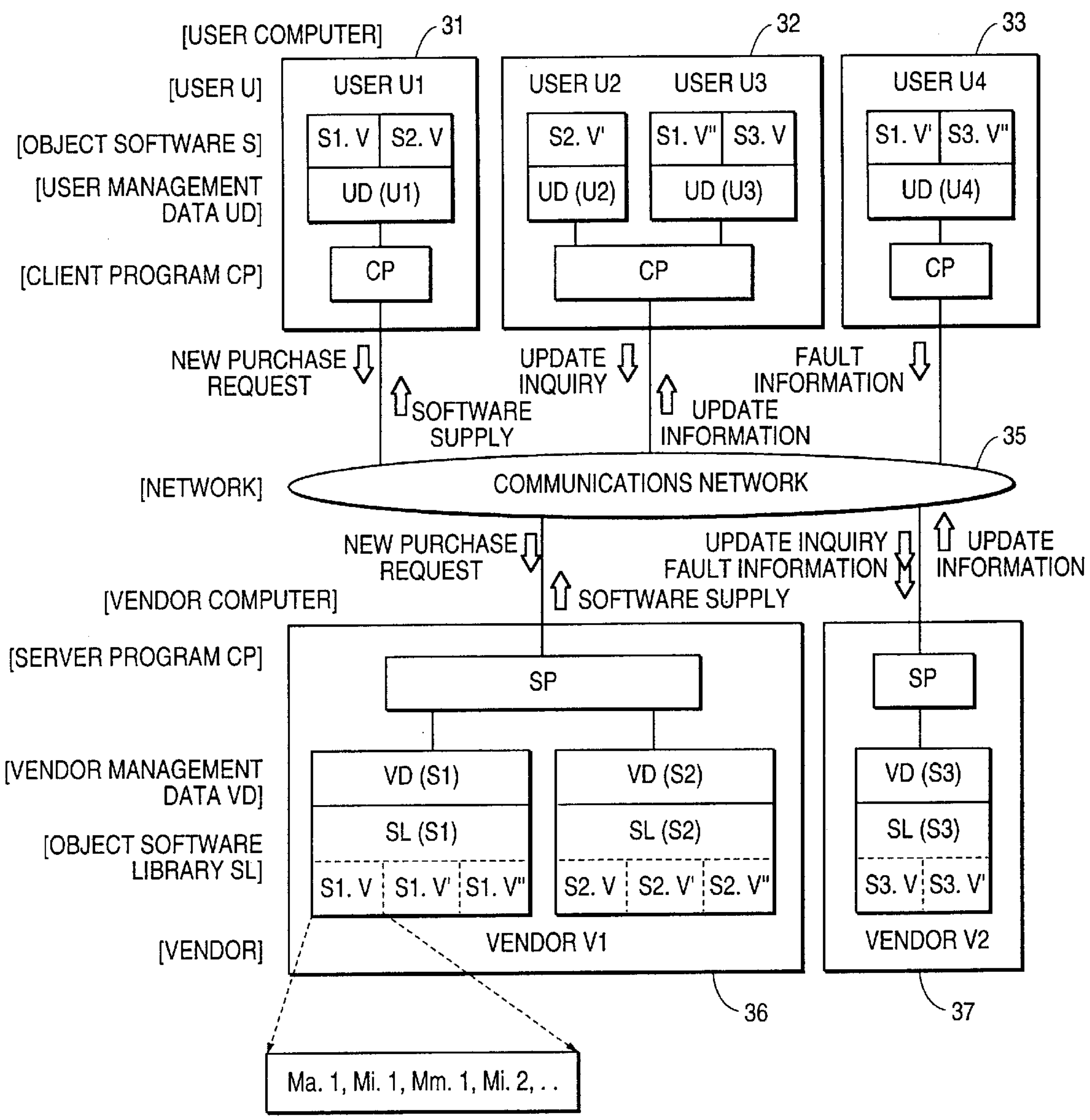
FIG. 8 shows the system configuration according to the second embodiment.

FIG. 8 shows the system configuration according to the embodiment of the present invention. In FIG. 8, 31, 32, and 33 are user computers.

In FIG. 8, the user computer 31 stores S1.V, S2.V; the user computer 32 stores software S2.V' for user U2 and software S1.v", S3.V for user U3; and the user computers 33 stores software S1.V', S3.V". The user computer 31 is used by user U1; the user computer 32 is used by users U2 and U3; and the user computer 33 is used by user U4. The software is managed by the system according to the present invention. The software managed by the present system is referred to as object software Si, and i identifies the type of object software A communications network 35 connects the client programs of the user computers 31, 32, and 33 to the server programs of vendor computers 36 and 37.

Two vendor computers 36 and 37 are shown in FIG. 8, and the vendor computers 36 and 37 of vendors V1 and V2 are used to provide the object software of the user computers 31, 32, and 33, and to update the object software.

FIG. 8 shows a user computer and a vendor computer separately. However, a computer can be a user computer and a vendor computer simultaneously.

Figure 9:
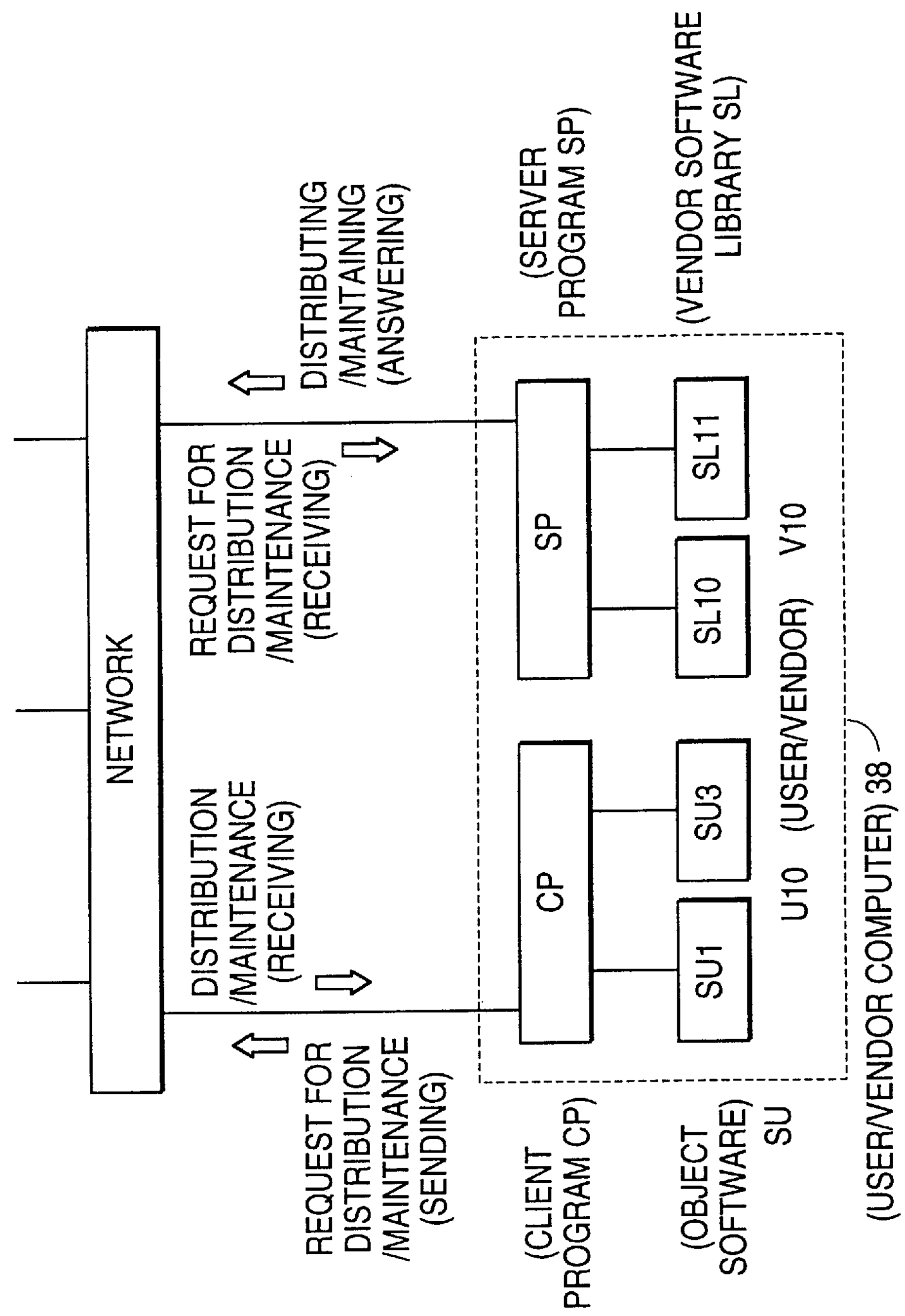
FIG. 9 shows the computer as a vendor-and-user computer according to the second embodiment.

For example, computer A provides a specific object software for another computer B, and updates and maintains the object software. Additionally, computer A can use the object software provided by same other computer C. FIG. 9 shows a computer 38 as an example of the above described computer.

In FIG. 8, the software distribution/maintenance system according to the second embodiment comprises the following components.

(i) Server Program SP

The server program SP is stored in the vendor computers 36 and 37 to provide necessary information and software required by user Uj at his or her inquiries and requests.

According to the present embodiment, the same server programs SP is stored in the vendor computers 36 and 37.

The server program SP generates a new process each time it is activated, and a plurality of server program processes can be performed in parallel unless the processes relate to the same object software of the same user. Therefore, the server program SP can simultaneously process messages for users unless the messages relate to the same object software of the same user.

(ii) Vendor Management Data VD (Si)

The vendor management data VD refer to data including vendor identification information, software configuration information, customer management information, etc. to be stored in each software library managed by the server program, and data including information (for example, procedures) to be used by the server program SP to regulate an answering method in an answering process.

Thus, vendor management data are provided for each software library, and the server program SP uses the vendor management data to set a software-library-dependent process as a procedure, thereby allowing the server program SP to be unified.

According to the second embodiment, the follow ing information is stored in each object software Si in the vendor computers 36 and 37 of each vendor Vk (V1 and V2 in the embodiment).

Vendor Identification Information: vendor name Vk, vendor network address, etc.

Software Management Information: software name Si, location of software library SL (Si), version type and name, etc.

Software Configuration Information: module configuration for each version, etc.

Processing Method Information: user check method, password instruction method, version classification method using user management information, configuration method of install instruction information Customer Information: user identification information, password, contract state, supplied software version, supplied history of each customer user Uj, etc.

Update History Information: development process history information, fault report information, etc.

Fault Information: fault information history, classified fault information, fault correction history, etc.

(iii) Vendor Software Library SL (Si)

A software library is managed by a vendor and stores each software Si comprising various versions Si.V.

As described above, Si indicates the type of software in each object software in a software library. For example, Si is a different software from S2. Si.V, Si.V', and Si.V" represent the version types of the same software. For example, Si.V is developed for UNIX; Si.V' for DOS-V; and Si.V" for MSDOS, etc.

Although not shown in FIG. 8, each of the object software Si.V, Si.V', and Si.V" is assigned a version number (for example, Si.V.1) indicating update information. The version number is incremented each time the software is updated, for example, Si.V.1, Si.V.2, . . . .

The object software Si.V comprises a number of modules Mm.1 and the module configuration of each version is set as the software configuration information in the vendor management data VD (Si). Each time a module is updated, the version number of module Mm.1 is incremented.

For example, as shown in FIG. 8, object software S1.V comprises module Ma.1, Mi.1, Mm.1, and Mi.2, and module Mi.2 indicates the updated version of module Mi.1.

The above described vendor management data VD (Si) is provided for each software type (for example, for each of software S1, S2, . . .) as shown in FIG. 8, and the server program SP refers to the vendor management data VD (Si) for each type of software to read necessary information and perform an answering process.

(iv) Client Program CP

The client program CP is stored in each user computer to send various messages from a user to a vendor, for example, a software purchase request, an update inquiry, a fault report, etc., receive an answer from the vendor, and update user software, etc.

The second embodiment shows an example of the same client program CP provided for each of the user 0computers 31, 32, and 33.

The client program CP as well as the server program SP generates a new process each time it is activated, and a plurality of client program processes can be performed in parallel unless the processes relate to the same object software of the same user. Therefore, the client program CP can simultaneously process requests and inquires for users unless the messages relate to the same object software of the same user.

(v) User Management Data UD (Uj)

The user management data UD are provided for each of users U1, U2, U3, and U4 managed by the client program CP, and contain user identification information, software management/configuration information, and information (procedure) regulating an installation method, etc. The user management data UD (Uj) is used to update user software when the client program CP sends various messages such as a software purchase request, update inquiry, fault report, etc. Thus, as in the case of the server program, the user management data provided for each user allow the client program CP to be unified.

According to the second embodiment, the following information is set for each user Uj.

User Identification Information: user name Uj, user network address, password, computer model, present OS, user category, etc.

Software Listing Information: list of software version names (Si.V).

The following information is provided for each version of software.

Software Management Information: software name Si, vendor identification information, version specification, software version name Si.V, contract state, etc.

Software Configuration Information: version module configuration information, etc.

Process Method Information: sending method, receiving method, sender check method, etc.

Installation process information: procedure of installation process, etc.

(vi) Object Software Si to be Used by Each User

The object software Si is stored in the user computers 31, 32, and 33, and each user uses a specific version of each software. For example, in FIG. 6, the object software used by user U1 is object software S1.V and S2.V. The object software used by user U2 is object software S2.V' different in version type from the above listed object software S2.V. Likewise, object software S1.V" and S3.V, and object software S1.V' and S3.V" are listed for users U3 and U4 respectively.

Typically, each version Si.V may be installed in one directory in a user computer, and each module Mm.1 may be handled as a file.

A user can own and use a plurality of versions of each object software. Thus, the user uses the object software of an old version to be used with good stability and the object software of a new version having new functions.

(vii) Network 35

The network 35 is a common UNIX network and based on an electronic mail protocol. For example, it has the message configuration.

To: VendorK@vendor.co.jp
From: Userj@flab.fujitsu.co.jp
Subject: SDMP: CheckUpdate Software Distribution System Message:
User: (User-Name:Toru Nakagawa)
Net-Address: User@flab.fujitsu.co.jp),
Software: (Name: Software Distribution System,
Version-Type: Standard,
Current-Version:SOS.S1.2.2.
Current-Modules: (Ma.1, Mb.3, Mc.2, Md.1, Ref.1))

The user computers 31, 32, and 33, and the vendor computers 36 and 37 do not always have to be connected to the network. That is, either one or both of the user computer and the vendor computer have to be connected to the network when a message transmitted.

That is, a message can be transmitted with both the user computer and the vendor computer connected to the network. On the other hand, as in the case of a mail system, a user sends a message to a switching station connected to a network, and a vendor periodically checks for a message and detects the arrival of the message.

(2) Functions of Software Distribution/Maintenance System

Described below is each function of the system according to the present embodiment.

(i) Initial Purchase and Installation of Software

If a user activates an purchase inquiry instruction of the client program CP described later by specifying the network address of the vendor Vk, then the client program CP sends an purchase inquiry message to the software vendor Vk. The message is automatically assigned user identification information.

The server program SP of the vendor Vk receives the message, checks the qualification of the user, automatically processes the message according to the settings of the vendor management data VD (Si), and returns it to the user. The answering process depends on each case.

For example, the server program SP returns only summary information, demonstration program, and a payment method, returns the software with an indication clarifying the copyright, or returns the software after confirming the user using a public password.

The client program CP receives the answer and sends it to the user. If the software itself is returned, the client program CP stores the software Si.V according to the update instruction information in the answer. Then, the client program CP refers to user management data UD (Uj), compiles and links programs according to the settings in the data, and automatically installs the software at a predetermined area.

(ii) Update Inquiry and Update of Software

The client program CP inquires of the software vendor whether or not the software currently used by the user has been updated or improved. If yes, the new version is automatically purchased easily as follows.

The user Uj specifies the software name Si to be inquired for update and activates the client program CP. The client program CP refers to user management data UD (Uj) to extract the configuration of the software Si.V currently used by the user, adds user identification information to the configuration, and sends an automatic update inquiry message to the vendor.

Upon receipt of the message, the server program SP checks the qualification of the user by referring to the user identification information based on the settings in the vendor management data VD (Si), and returns software update information to the user. The following answering process is performed for a qualified user.

1. If the software has not been updated, a non-update message is returned to the user. 2. If the software has been updated, then the server program SP returns an updating method applied at a user site and the software required (minimal) for update. 3. If the software is updated or improved on a large scale, the software of a new version is recommended to the user.

These answering processes can be set in the vendor management data VD (Si) by the vendor.

On receiving the answer message from the server program SP, the client program CP performs an appropriate process according to the settings in the user management data (Uj).

For example, when an updated software is returned, then the software (and added information) Si.V is temporarily stored at an area specified by the user management data UD (Uj), then the old version Si.V is replaced with the updated software according to the update instruction information in the answer message and the instruction in the user management data UD. The programs are compiled or linked if necessary to execute the new version.

The user can set the user management data UD (Uj) so that, for example, an old version can be temporarily stored as a backup version, and can be deleted after confirming that a new version works successfully.

Provided is the function of automatically reporting from the client program CP to the server program SP as to whether or not the software is normally stored and updated by the client program CP.

An update inquiry can be explicitly activated by a user, automatically activated when the software is invoked by a user , or activated at a specified time (for example, every dawn, every week, every month, etc.) by a demon program.

The explicit activation by a user is to activate an update inquiry by entering an update inquiry command. For example, a user specifies the software to be updated in an interactive operation, edits an update inquiry message, and inquires the update of the object software. The procedure of an update inquiry sending process can be set in the above described user management data UD (Uj).

According to this method, a user can update the object software at any time.

The activation of an update inquiry at the call of the software by a user is to automatically activate an update inquiry before the execution of the above described object software when the user performs a necessary process using the object software. The procedure of an update inquiry sending process is also set in the above described user management data UD (Uj). According to this method, a user can constantly use the software of the latest version.

The system can be designed such that an update inquiry can be activated when the object software terminates abnormally due to a fault/bug, etc. Thus, even if a bug is detected in the object software, a corrected object software can be automatically provided and executed if a corrected and updated version is stored in the software library SL (Si) of the vendor computer.

The activation of an update inquiry through a demon program is to periodically activate an update inquiry as a background job at night, etc. by a user at optional intervals. According to this method, unlike in the activation at the call of the software, a user is free of being kept waiting when the user issues an update inquiry.

(iii) Automatic Report of Fault Information at the Abnormal Termination of Software When the software Si managed by the client program CP abnormally terminates during its operation, the client program CP is activated immediately. The client program detects the cause and condition of the abnormal termination (for example, higher-level instruction sequence which invoked the abnormally-causing instruction), adds the user management data UD (Uj) (only a selected portion), and automatically sends a fault report message to the vendor Vk.

The server program SP of a vendor records the fault report message after classifying it into software Si.V, and reports fault information to the software developer. Then, it returns to the user an acknowledgement message.

Bugs can be manually corrected by a software developer. If the software developer corrects a fault/bug, enters it in the object software library of a vendor, and sets version management information in the vendor management data Vd (Si), then the updated version is provided as the latest version for a user. The settings can be made such that the latest version can be published only to specified or desired users and can be provided experimentally.

(3) Communications between Client Program and Server Program, and Message Configurations and Types The communications between the client program CP and the server program SP can be made over a network by a method similar to electronic mail and electronic data exchange EDI.

(i) Up Message: A Message Transmitted from the Client Program CP to the Server Program SP The configuration of an up message is as follows: Addressee: a vendor name Vk at the network address of the vendor Sender: user name Uj at the network address of the user Subject: present software distribution/maintenance system name, command name, software name Si Contents: user identification information, vendor identification information, software identification information, other necessary information depending on a command, options, etc.

(ii) Down Message: A Message Transmitted from the Server Program SP to the Client Program CP The configuration of a down message is as follows:

Addressee: user name Uj at the network address of the user

Sender: a vendor name Vk at the network address of the vendor

Subject: present software distribution/maintenance system name, command name, software name Si Message to be returned: an up message identification information to be returned Contents: user identification information, vendor identification information, software identification information, other necessary information depending on a command, options, etc.

(iii) Important Message Types and Functions

Important types of request/inquiry up-messages and important down-messages answering the up-messages are shown below.

| <UP MESSAGE> | <DOWN MESSAGE> |
| --- | --- |
| SUMMARY INQUIRY | SUMMARY INFORMATION |
| NEW PURCHASE REQUEST | INITIAL SUPPLY |
| NEW SERVICE ACQUISITION REQUEST | SUPPLY OF NEW SERVICE |
| UPDATE INQUIRY | UPDATE INFORMATION<br>NO UPDATE |
| COMMENT | ANSWERING |
| FAULT REPORT | RECEIVING FAULT REPORT<br>IMPORTANT INFORMATION TO USER<br>WARNING TO USER |
| REGULAR INSTALLATION REPORT | |
| ABNORMAL INSTALLATION REPORT | |
| TERMINATION OF USE SOFTWARE | TERMINATION, CLEARING |

The types of these messages can be specified in a command name entered in the subject column of a message.

(iv) Practical Example of a Process Command in the System According to the Second Embodiment According to the second embodiment, a process command shown in Table 1 is used as a message described above.

TABLE 1

| CLASS COMMANMD NAME | FUNCTION OF COMMAND |
| --- | --- |
| UP MESSAGE | |
| Inform: | INQUIRY OF SUMMARY INFORMATION, NEW SERVICE, PURCHASE METHOD, ETC. |
| WantNew: | REQUEST FOR NEW PURCHASE |
| Wantrenew: | REQUEST FOR ACQUISITION (ADDITION) OF NEW SERVICE |
| CheckUpdate: | INQUIRY OF UPDATE AND REQUEST FOR SENDING INFORMATION OF UPDATED SOFTWARE |
| BugReport: | AUTOMATIC REPORT OF RUNTIME FAULT INFORMATION |
| Comment: | MESSAGE FROM USER SUCH AS COMMENTS, COMPLAINTS, OPINIONS, INQUIRIES, ETC. |
| InstallAck: | MESSAGE OF REGULAR SOFTWARE PURCHASE AND INSTALLATION |
| InstallTrouble: | INFORMATION OF TROUBLE AT INSTALLATION OF PURCHASED SOFTWARE |
| FinishUse: | INFORMATION OF TERMINATION OF USE |
| DOWN MESSAGE | |
| ReplyInfo: | ANSWER TO INQUIRY OF SUMMARY INFORMATION, NEW SERVICE, PURCHASE METHOD, ETC. |
| NewInstall: | NEW SUPPLY OF SOFTWARE |
| Renew: | SUPPLY (ADDITION) OF NEW SOFTWARE SERVICE |
| NoUpdate: | NO UPDATE ANSWER |
| Update: | INFORMATION OF UPDATED SOFTWARE |
| Answer: | ANSWER TO USER'S COMMENTS, COMPLAINTS, OPINIONS, AND INQUIRIES |
| BugAck: | ACKNOWLEDGEMENT OF AUTOMATIC REPORT OF FAULT INFORMATION |
| Notice: | IMPORTANT INFORMATION TO USER |
| Warning: | WARNING TO USER |
| Erase: | INFORMATION OF CLEARING USER OBJECT SOFTWARE PROGRAM AT TERMINATION OF USE |

In the system according to the present invention, an inquiry (up) message from a user is normally answered by an answer (down) message according to a corresponding important command. Furthermore, there are an exception process answer message and an purchase acknowledgement message received from a user as an acknowledgement of software.

Table 2 shows the correspondence of important commands.

TABLE 2

| INQUIRY (UP) | | ANSER (DOWN) [/:EXCEPTION] | | ACKNOWLEDGE (UP) [/:EXCEPTION] |
| --- | --- | --- | --- | --- |
| Inform | (SUMMARY INQUIRY | ReplyInfo | (SUMMARY INFORMATION) | |
| WantNew | (NEW INSTALLATION REQUEST) | NewInstall /Notice | (NEW INSTALLATION) | InstallAck /Install-Trouble |
| WantRenew | (NEW SERVICE REQUEST | Renew /Notice | (ADDITION) | InstallAck /Install-Trouble |

As shown in Table 2, the commands are normally executed as inquiries (up messages), answers (down messages), and acknowledgements (up messages).

In Table 2, a command preceded by the character / indicates an exception process A vendor exceptionally starts sending information to a user In this case, the information is normally limited to a short message only. Applicable messages are warning messages and notice messages. These messages are normally used as a warning answer and a notice answer as an exception process in response to an inquiry from a user.

Described below in detail are the contents of the above described up messages and down messages, and associated user management data in user computers and vendor management data in vendor computers.

(a)–(c) respectively show the user identification information, the vendor identification information, and the software identification information as the contents of a message. In these figures, 0 indicates indispensable information; a indicates information normally required but not indispensable; and A indicates information required sometimes (this is also applicable in the subsequent figures).

(a) User Identification Information Section:

0 user name (name within network) required 0 user network address required

□ user full name

□ location of user (organization such as company, university, etc. or intra-office section)

Δ location address of user

Δ access to user location (telephone number, facsimile number, etc.)

Δ position of user

□ user entry name (contract number, member number, etc.)

□ user password (password, private key, etc.)

Δ state of user contract (contract type, starting date of contract, expiry date, etc.)

Δ use type of user (beginner,. common user, expert, etc.)

□ user computer (manufacturer, type, model, etc.)

Δ user software environment (type of OS, version of OS, other software)

(b) Vendor Identification Information Section:

0 vendor name (name within network) required 0 vendor network address required

□ vendor full name

Δ location of user (organization such as company, university, etc.)

Δ location address of vendor

Δ access to vendor (telephone number, facsimile number, etc.)

Δ section and person in charge

Δ vendor entry name (contract name, name of party etc.)

Δ vendor password (password, private key, etc.)

Δ state of contract for user (contract type, starting date of contract, expiry date, etc.)

(c) Software Identification Section:

0 software name

□ software version type name

□ software version number

□ software version configuration date

Δ software application object type name

Δ software application object OS name

Δ type and conditions of software application environment

Δ distribution range of software

Δ distribution rules of software (1)–(19) respectively show the contents of other information (as messages) required for each command.

(1) Inform (Summary Inquiry) Command

Δ message: request for and inquiry of purchase

Δ message; transmitting user information for selecting version (2) ReplyInfo (Summary Information) Command □ message: summary of functions, usages, effects of software □ message: descriptions of applicable computer type, OS, environment, etc. for software □ message: specification of distribution rules and contract method for software □ message: request for user information required to select proper version (3) WantNew (New Purchase Request) Command □ message: descriptions of completion of purchase procedure and notes for process □ message: transmission of user information required to select proper version (4) NewInstall (New Supply) Command 0 detailed vendor identification information □ password, etc. in user identification information 0 detailed software information □ specification of software application condition (applicable computer type, OS, environment, etc.)

0 installation instruction information of software 0 software configuration information 0 body of software □ document, manual, etc. of software □ distribution rules of software Δ standard user procedure (invoked by CP) generated by vendor (procedure for installing, updating, and fault-reporting software)

(5) WantRenew (New Service Request) Command

□ message: descriptions of completion of purchase procedure and notes for process 0 specification of new service acquisition request □ user identification information required to select proper version □ application for handling current software (6) Renew (Additional Supply) Command Δ modified portions in detailed vendor identification information Δ password for user identification information (only when modifications are made)

0 detailed information of newly-served software (version type, number, etc.)

□ specification of application condition of newly-served software 0 installation instruction information of newly-served software 0 configuration information of newly-served software 0 body of newly-served software □ document, manual, etc. of newly-served software Δ distribution rules of newly-served software □ instruction and request for handling the old version of software □ instruction information (procedure) for handling old version of software (7) CheckUpdate (Update Inquiry) Command □ user identification information (computer type, OS, environment, etc)

0 detailed current software identification information (version type, version number, configuration date, etc.)

(8) Update (Update) Command

□ explanation of software update (purpose of update, improved functions, newly solved problems, etc.)

□ specification of application conditions of updated software 0 detailed software identification information of updated software (version type, number, etc.)

0 update instruction information of updated software 0 configuration information of updated software 0 body of updated software (newly added and updated portions only)

□ document, manual, etc. of updated software (updated portions)

0 instruction information of processing old version of software (9) NoUpdate (No Update) Command Δ software identification information at the latest update (version type, number, date)

(10) InstallAck (Acknowledgement of Installation) Command 0 identification information of received vendor message (vendor transmission time, etc.)

Δ installation/update instruction information of installed software 0 process type: only when automatic installation/update is successfully performed or temporarily stored

(11) InstallTrouble (Unsuccessful Installation) Command 0 identification information of received vendor message (vendor transmission time, etc.)

Δ installation/update instruction information of installed software 0 information of fault causing process Δ information as to whether or not temporary storage is performed successfully

(12) Comment (Comment) Command

□ message: comments, complaints, inquiries, etc.

(13) Answer (Answer) Command

□ message: answer to comments, complaints, inquiries, etc.

(14) BugReport (Fault Report) Command

□ detailed user identification information (applicable computer type, OS, environment, etc.)

0 software identification information (version type, number, date)

Δ software configuration information 0 direct phenomenon and instruction relating to abnormal termination □ instruction strings containing the instruction which caused abnormal termination

(15) BugAck (Reception of Fault Report) Command

Δ direct phenomenon and instruction relating to abnormal termination

(16) Notice (Notice) Command (a) Transmitted as Answer to WantNew or WantRenew Command □ message: descriptions and notes relating to purchase procedure and qualification restrictions □ message: descriptions and notes relating to software application restrictions Δ message: information of new services of software (b) Transmitted as Answer to CheckUpdate Command □ message: information of new services of software Δ message: information relating to term and renewal procedure for software □ message: information relating to counteraction against specific troubles of software

(17) Warning (Warning) Command

□ message: warning against illegal qualification restrictions, illegal acquisition of software, etc.

□ message: information of legal acquisition of qualification, acquisition procedure, etc.

Δ message: notes and warnings against specific (problem causing) usage

(18) FinishUse (Termination of Use) Command 0 information of software version to be terminated □ information of process after termination of software

(19) Erase (Clear After Termination) Command 0 detailed object software identification information to be terminated (version type, number)

0 clear instruction information of object software to be terminated

□ specification of termination date of object software to be terminated

Figure 10:
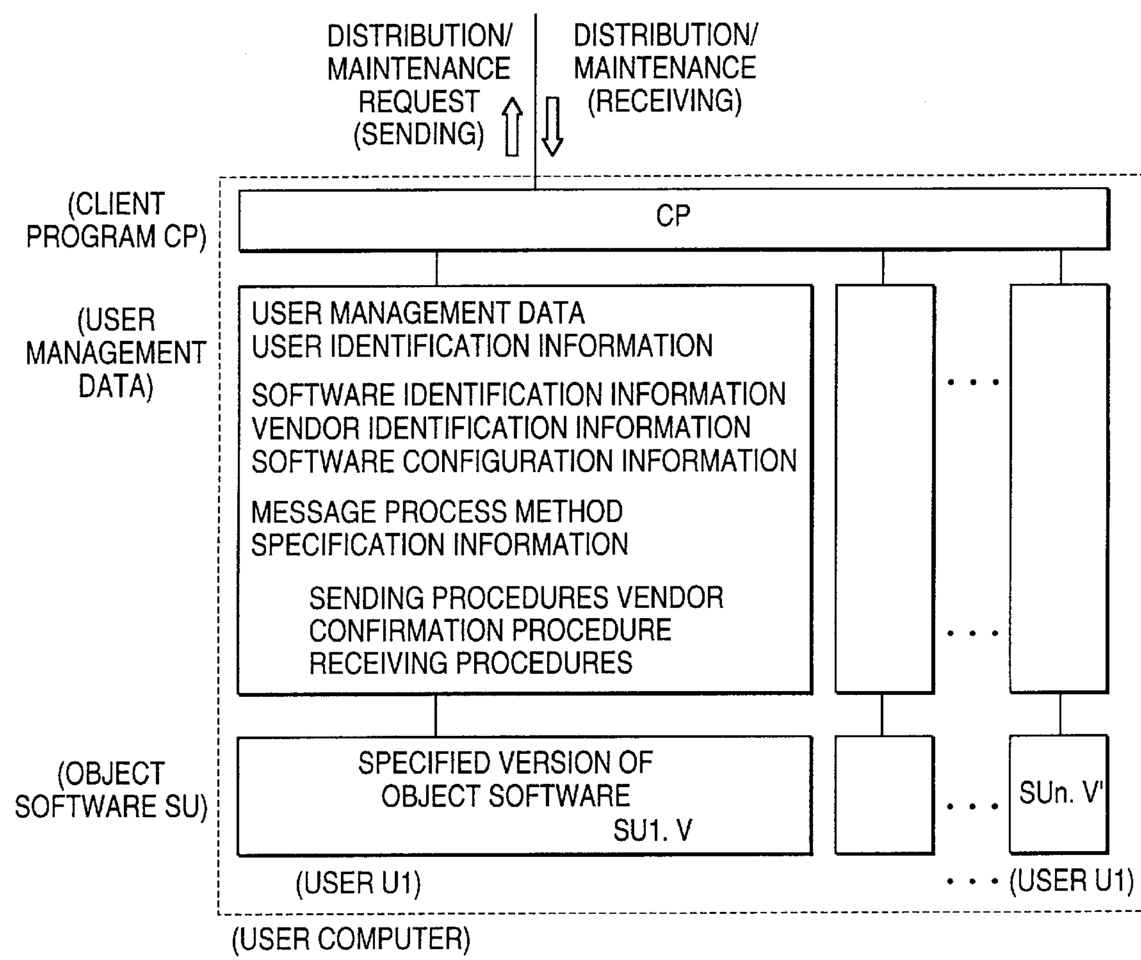
FIG. 10 shows the contents of user management data in a user computer according to the second embodiment.

FIG. 10 shows the contents of user management data in a user computer. The user management data are provided for each user. There is a single piece of user identification information in a set of management data, but the software management information and the subsequent data are provided for each software. Although not shown in FIG. 10, the user management data contain a list of the names of object software and the version names.

(a)–(d) respectively show the contents of the user identification information, the software management information, the vendor identification information, and the software configuration information respectively in the user management data.

(a)User Identification Information 0 user name (name within network) required 0 user network address required 0 user full name 0 location of user (organization such as company, university, etc. or intra-office section)

□ location address of user

□ access to user location (telephone number, facsimile number, etc.)

□ position of user

0 * user entry name (contract number, member number, etc.)

□ * user password (password, private key, etc.)

□ * state of user contract (contract type, starting date of contract, expiry date, etc.)

Δ * use type of user (beginner, common user, expert, etc.)

0 * user computer (manufacturer, type, model, etc.)

0 * user software environment (type of OS, version of OS, other software, etc.)

(b) Software Identification Information 0 software name required 0 software version type name 0 software version number □ software version configuration date □ software application object type name □ software application object OS name □ type and conditions of software application environment □ distribution range of software Δ distribution rules of software (c) Vendor Identification Information 0 vendor name (name within network) required 0 vendor network address required □ vendor full name Δ location of user (organization such as company, university, etc.)

Δ address of vendor

Δ access to vendor (telephone number, facsimile number, etc.)

Δ section and person in charge

Δ vendor entry name (contract name, name of party, etc.)

□ vendor password (password, private key, etc.)

Δ state of contract for user (contract type, starting date of contract, expiry date, etc.)

(d) Software Configuration Information 0 path indicating directory storing object software □ path indicating directory storing source program □ module configuration in directory storing source program □ path indicating directory storing object program □ module configuration in directory storing object program □ path indicating directory storing program document □ module configuration in directory storing program document Table 3 shows the user call procedures (user processes) which can be called by the client program CP for sending a command to a server program SP or for receiving a command from a server program SP. The user management data contain a list of the names of user call procedures and their locations which the user actually provided among the above listed procedures.

TABLE 3

| Command type | Automatic Process | Interactive Proces |
|---|---|---|
| summary inquiry command (sending) | Inform-SA | Inform-SB |
| new purchase request command (sending) | WantNew-SA | WantNew-SB |
| new service supply request (sending) | WantRenew-SA | WantRenew-SB |
| update inquiry command (sending) | CheckUpdate-SA | CheckUpdate-SB |
| comment command (sending) | Comment-SA | Comment-SB |
| fault report command (sending) | BugReport-SA | BugReport-SB |
| use termination command (sending) | FinishUse-SA | FinishUse-SB |
| vendor confirmation procedure | CheckVendor-A | CheckVendor-B |
| summary information command (receiving) | ReplyInfo-RA | ReplyInfo-RB |
| new supply command (receiving) | NewInstall-RA | NewInstall-RB |
| additional supply command (receiving) | Renew-RA | Renew-RB |
| update command (receiving) | Update-RA | Update-RB |
| no-update command (receiving) | NoUpdate-RA | NoUpdate-RB |
| acknowledge command (sending) | InstallAck-SA | InstallAck-SB |
| installation trouble command (sending) | InstallTrouble-SA | InstallTrouble-SB |

TABLE 3-continued

| Command type | Automatic Process | Interactive Proces |
|---|---|---|
| answer command (receiving) | Answer-RA | Answer-RB |
| fault report reception command (receiving) | BugAck-RA | BugAck-RB |
| notice command (receiving) | Notice-RA | Notice-RB |
| warning command (receiving) | Warning-RA | Warning-RB |
| clear after termination command (receiving) | Erase-RA | Erase-RB |

Figure 11:
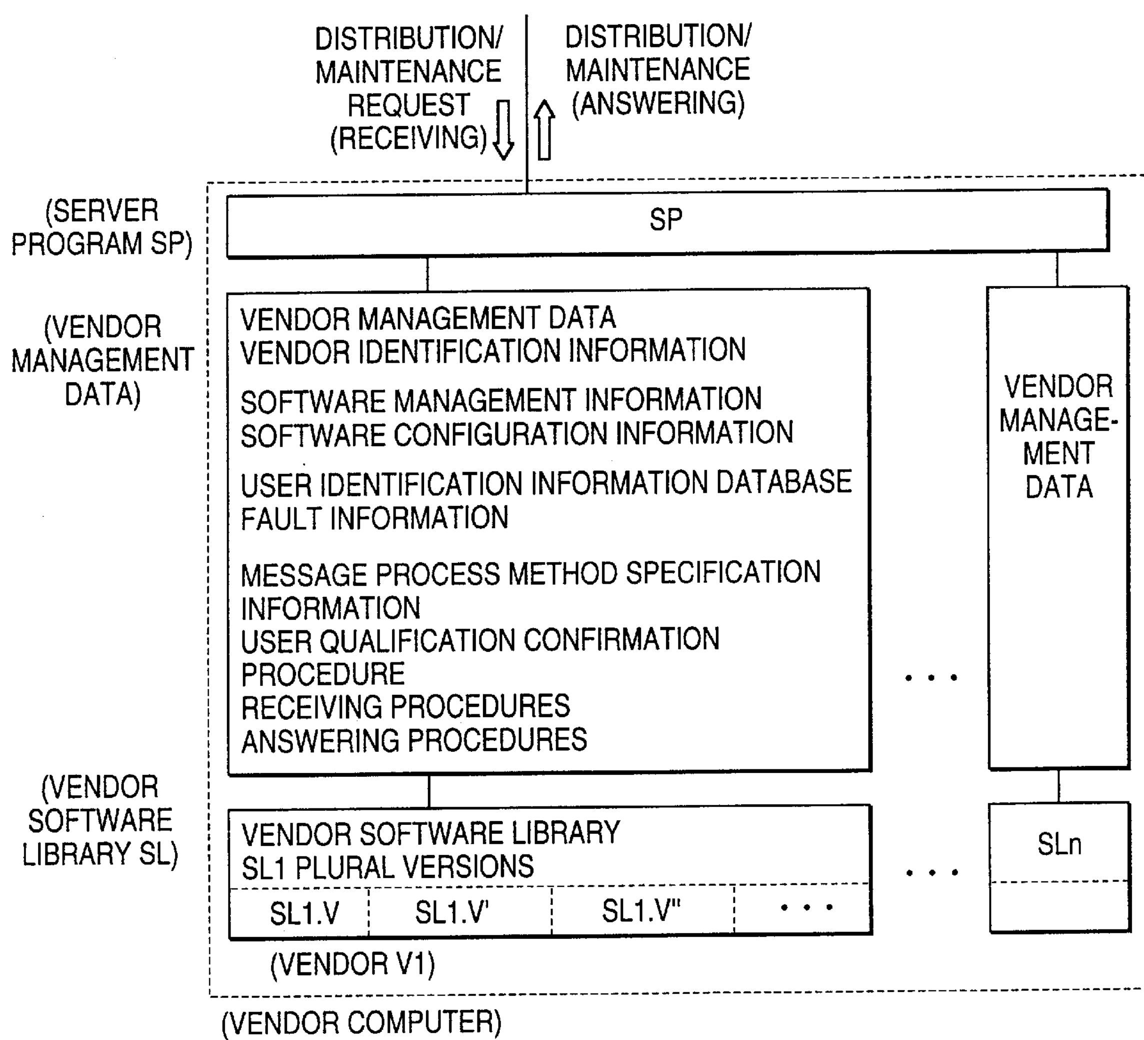
FIG. 11 shows the contents of the vendor management data in a vendor computer according to the second embodiment.

FIG. 11 shows the contents of the vendor management data in a vendor computer. Like the user management data, the software management information and the subsequent data are provided for each item on the list of the object software to be provided.

(a)–(d) respectively show the vendor identification information, the software management information, the software configuration information, and the user identification information data base, in the vendor management data. The user identification information data base refers to the information about all users provided with the object software.

(a) Vendor Identification Information 0 vendor name (name within network) required 0 vendor network address required 0 vendor full name 0 location of vendor (organization such as company, university, etc.)

0 address of vendor

0 * access to vendor (telephone number, facsimile number, etc.)

□ * section and person in charge

0 * vendor entry name (contract name, name of party etc.)

0 * vendor password (password, private key, etc.)

0 * states of contract for user (contract type, starting date of contract, expiry date, etc.)

NOTE: * indicates that different information can be used about the same vendor for each object software. Thus, such information is stored for each object software.

(b) Software Management Information 0 software name required 0 software version type name list 0 software version number list (for each version type)

0 software version configuration date (for each version number)

0 software application object type name 0 software application object OS name 0 type and conditions of software application environment 0 distribution range of software (conditions and procedures for qualified user)

□ distribution rules of software (conditions of users)

NOTE: Version numbers are systematically assigned for respective software version types. The version provided for each user can be identified by the version number.

(c) Software Configuration Information 0 path indicating location of object software library to be provided 0 path indicating directory storing source program 0 list of module configuration of source program of each version 0 path indicating directory storing object program 0 list of module configuration of object program of each version 0 path indicating directory storing program document 0 module configuration of program document of each version (d) Client Information in User Identification Information Database 0 user name (name within network) required 0 user network address required 0 user full name 0 location of user (organization such as company, university, etc. or intra-office section)

□ location address of user

□ access to user location (telephone number, facsimile number, etc.)

□ position of user 0 user entry name (contract number, member number, etc.)

0 user password (password, private key, etc.)

0 state of user contract (contract type, starting date of contract, expiry date, etc.)

Δ use type of user (beginner, common user, expert, etc.)

□ user computer (manufacturer, type, model, etc.)

□ user software environment (type of OS, version of OS, other software)

0 latest version type, number, and date provided for user

Δ supply history to user (access date, command type, provided version, reception result at destination, record of fault report, etc.)

Table 4 shows the vendor call procedures (vendor processes) which can be called by the server program SP for receiving a command from a client program and for answering a command to the client program. The vendor management data contain a list of the names and their locations of vendor call procedures which the vendor actually provided among the above listed procedures. Vendors may have to perform different processes in a procedure for the same object software depending on the version type or version number. These differences can be properly processed by a proper logic in each procedure by performing individual processes in respective cases.

TABLE 4

| Command Type | Automatic Process | Interactive Process |
|---|---|---|
| customer qualification confirmation procedure | CheckUser-A | Check User-B |
| unqualified user process procedure | NonauthUser-A | NonauthUser-B |
| summary inquiry command (receiving) | Inform-RA | Inform-RB |
| summary information command (answering) | ReplyInfo-SA | ReplyInfo-SB |
| new purchase request command (receiving) | WantNew-RA | WantNew-RB |
| new supply command (answering) | NewInstall-SA | NewInstall-SB |
| new service supply request (receiving) | WantRenew-RA | WantRenew-RB |
| additional supply command (answering) | Renew-SA | Renew-SB |
| update inquiry command (receiving) | CheckUpdate-RA | CheckUpdate-RB |

TABLE 4-continued

| Command Type | Automatic Process | Interactive Process |
|---|---|---|
| update command (answering) | Update-SA | Update-SB |
| no-update command (answering) | NoUpdate-SA | NoUpdate-SB |
| notice command (answering) | Notice-SA | Notice-SB |
| warning command (answering) | Warning-SA | Warning-SB |
| acknowledge command (receiving) | InstallAck-RA | InstallAck-RB |
| installation trouble command (receiving) | InstallTrouble-RA | InstallTrouble-RB |
| comment command (receiving) | Comment-RA | Comment-RB |
| answer command (answering) | Answer-SA | Answer-SB |
| fault report command (receiving) | BugReport-RA | BugReport-RB |
| fault report reception (answering) | BugAck-SA | BugAck-SB |
| use termination command (receiving) | FinishUse-RA | FinishUse-RB |
| clear after termination command (answering) | Erase-SA | Erase-SB |

Described briefly below are the contents of the vendor software library shown in FIG. 11. The software library is used by a vendor in the software development and maintenance, and normally has a sophisticated configuration.

(a) shows an object software library; and (b) shows the contents of the object software development history/fault history data base provided for each object software library.

(a) Object Software Library 0 source program library of object software (including various version types and version numbers)

0 object program library of object software (including various version types and version numbers)

0 document library of object software (including various version types and version numbers)

(b) Contents of Object Software Development History/Fault History Database 0 development history information of object software (development date, version configuration, developed items, etc.)

0 fault history summary database of object software (initial report date, versions and modules in problem, fault phenomenon, cause of fault, correction date, corrected item, etc.)

□ fault report database of object software (record of date, user name, version, fault phenomenon, fault causing instruction sequence of fault report from user)

(4) Inquiry Message Sending Process in a User Computer

Described below is an embodiment of an inquiry message sending process in a user computer.

(i) Entire Configuration of a Client Program Process in a User Computer

The client program CP is stored in a user computer and manages the distribution and update of plural sets of object software used by one or more users. In response to a user's new purchase request, update inquiry, etc., the client program CP edits an up message, sends it through a network, receives an answer from the server program SP, and performs an appropriate process such as an installing operation.

FIGS. 12 and 13 shows the entire configuration of the above described processes. The process of a client program is described by referring to FIGS. 12 and 13.

In FIG. 12, the processes according to a client program are shown on the left, while the user process procedure is shown on the right. The user process procedure is set in the user management data UD (Uj) set for each user. Storing the user process procedure in the user management data UD (Uj) and invoking the user process procedure in a client program unify the client program CP of each user.

In FIG. 12, the client program CP is initialized in a user computer and set in a ready standby state (step S31 shown in FIG. 12).

The client program is activated when it receives an input command from a user or user software, or a message from the server program SP over a network (step S32).

When the client program CP is activated, then the client program CP analyzes data in a command column (or a subject column) to obtain a user name Uj, a command name, and an object software name Si (step S33). The succeeding processes, specifically the user management data (Uj) and the user process procedure UP, are performed for each user and object software.

Then, the activator of the present client program CP is identified (step S34). If it is activated by a user, control is passed to step S35. If it is activated by user software, control is passed to step S36. If it is activated over a network, control is passed to step S39.

If the client program CP is activated directly by a user, then a message edit screen is displayed in response to an input command and the user can edit the contents of the message in an interactive operation by invoking a sending procedure P1 (step S35).

In each sending procedure, retrieved is information required for each message such as a summary inquiry, new purchase request, new service supply request, update inquiry, fault report, etc. to generate a message using the information of the user management data UD (Uj).

If the user software is automatically activated, then a message is automatically edited by invoking sending procedure P1 in response to an input command (step S36).

User software is automatically activated through the above described demon program, through an instruction to start execution of object software, through an abnormal termination of object software, etc.

If an inquiry message is generated in the processes in step S35 and S36, then the client program CP sends a message to the server program SP in a vendor computer over a network (step S37).

Then, the client program CP stores the transmission of the message and returns to the standby state (step S38).

If a client program is activated after receiving a message from the network, then control is passed to step S39 shown in FIG. 13, the client program refers to the message transmission record (recorded in step S38) relating the user's software, confirms the standby state, invokes the vendor confirmation procedure P2, and confirms the message sender (in this case, the vendor).

The vendor confirmation procedure P2 is one of the user process procedures and confirms a vendor using a password, etc. from the vendor for the security of the user software.

Then, in response to the command of the received message, a user process procedure P3 of each answering process is invoked (step S40).

In each answering procedure, the software transmitted with an answer message is newly installed and updated by referring to the install instruction information in the answer message and the information in the user management data UD (Uj). If the answer message is a warning or a notice, the message is stored and displayed.

When the received message is processed, a process confirmation message is generated according to the result of the processes in the answering procedure P3 if the process result is to be automatically reported, for example, in the cases when a new supply command, an additional supply command and, or an update command is received. The generated message is sent to the server program SP of the vendor (step S41).

Then, the client program CP stores the received answer message, its process result, and a process result confirming message, and then the client program CP returns to a standby state in step S31 (step S42).

(ii) New Purchase Request Message Sending Process

Four inquiry messages actively sent by a user are Inform (summary inquiry), WantNew (new purchase request), WantRenew (new service acquisition request), and Comment (comment).

The processes of the client program CP performed when these messages are sent are performed through steps 31–35, the sending procedure P1, and step S37. Described below by referring to FIG. 12 is the process of a new purchase request, (WantNew).

When a user enters a WantNew command with a new software name Si, then a client program is activated (step S32).

The client program CP reserves an area for the software name Si in the user management data UD (Uj) of the user Uj (if a summary inquiry has already been made, the area has been reserved already) so that the subsequent processes are performed using the user management data (step S33).

The client program CP displays a message edit screen for a new purchase request, invokes the new purchase request sending procedure P1, and helps the user entering and editing necessary message portions (step S35).

Set in the new purchase request sending procedure P1 are the user identification information (user name, network address, password, etc.), software information (specification of software name, version type, etc.), vendor identification information (vendor name, vendor network address, etc.), and post-purchase process information (directory name to be stored, installing method, etc.). If the information has already been stored in the user management data UD (Uj) when the summary inquiry is made, then no re-entry is required. New information is stored in the user management data UD (Uj).

The client program CP sends to the vendor through the network a new purchase request message (WantNew message) generated by the new purchase request sending procedure P1 (step S37).

Then, the client program CP records the transmission of the message, and returns to a standby state (step S38).

(iii) Update Inquiry Message Sending Process

The CheckUpdate message for an update inquiry is sent in steps 31–37 shown in FIG. 12 by the procedure P1 in the processes shown in FIGS. 12 and 13.

The update inquiry message sending method is explained by referring to FIG. 12.

If a CheckUpdate command is entered with an update object software name specified, the client program CP activates the preparation for the update inquiry (step S32).

The CheckUpdate command can be actively entered by user as described above, and can be automatically entered at the activation of the object software and at a timing predetermined by a demon program (for example, every dawn, every week, every month, etc.).

The client program CP performs the following processes using the user name UJ and software name Si as keys in appropriate user management data UD (Uj) (step S33).

The activator of the present client program CP is identified in step S34. If it is activated by a user, control is passed to step S35. If it is activated by a user software, then control is passed to step S36.

If the client program CP is activated directly by a user, an update inquiry message edit screen is displayed and an update inquiry sending procedure P1 is invoked to retrieve and display information required to edit the message. At this time, the user can amend a part of the information, for example, the amendment of a version type, amendment of installation information, etc. (step S35).

The update inquiry sending procedure refers to the user management data UD (Uj), extracts the user identification information (user name, network address, password, etc.), vendor identification information (vendor name, vendor network address. etc.), software management information (version type, current version name, current module configuration, etc.), and installation Information (stored directory name, backup instruction, etc.) to prepare for the generation of a CheckUpdate message.

If the CheckUpdate command is automatically activated through software, then the client program CP invokes the update inquiry sending procedure P1 and automatically sets a CheckUpdate message (step S36).

When the CheckUpdate message is generated in the processes in steps S35 and S36, the client program CP automatically sends a message to the server program SP in a vendor computer through the network (step S37).

Then, the transmission of the message is stored and the client program CP returns to a standby state (step S38).

(iv) Fault Report Message Automatic Sending Process

This process is performed in steps S31–S34, step S36, procedure P1, and steps S37 and S38 in the processes shown in FIGS. 12 and 13.

The fault report message automatic sending process is described below by referring to FIG. 12.

If the object software version Si.V managed by the client program CP abnormally terminates during its operation, a BugReport command is immediately transmitted to the client program CP (step S32).

The client program CP detects the user name and the software name which caused the abnormal termination of the software, and the following processes are performed using corresponding user management data UD (Uj) (step S33).

Since the client program CP is automatically activated, control is passed from step S34 to step S36, and the fault report sending procedure P1 is invoked to generate a fault report message.

The fault report sending procedure P1 analyzes the instruction and the state which directly caused the abnormal termination and the instruction string which invoked the instruction which directly caused the abnormal termination. The fault report sending procedure P1 extracts from the user management data UD (Uj) the user identification information, vendor information, and software identification information to generate a fault report (BugReport) message.

When a fault report (BugReport) message is generated in step S36, the client program CP automatically sends the message to the server program SP in the vendor computer through the network (step S37).

Then, the transmission of the message is stored and the client program CP returns to the standby state (step S38).

(5) Process in a Vendor Computer

Next, an embodiment of a process performed in a vendor computer is described below.

(i) Entire Configuration of a Process of a Server Program

Figure 14:
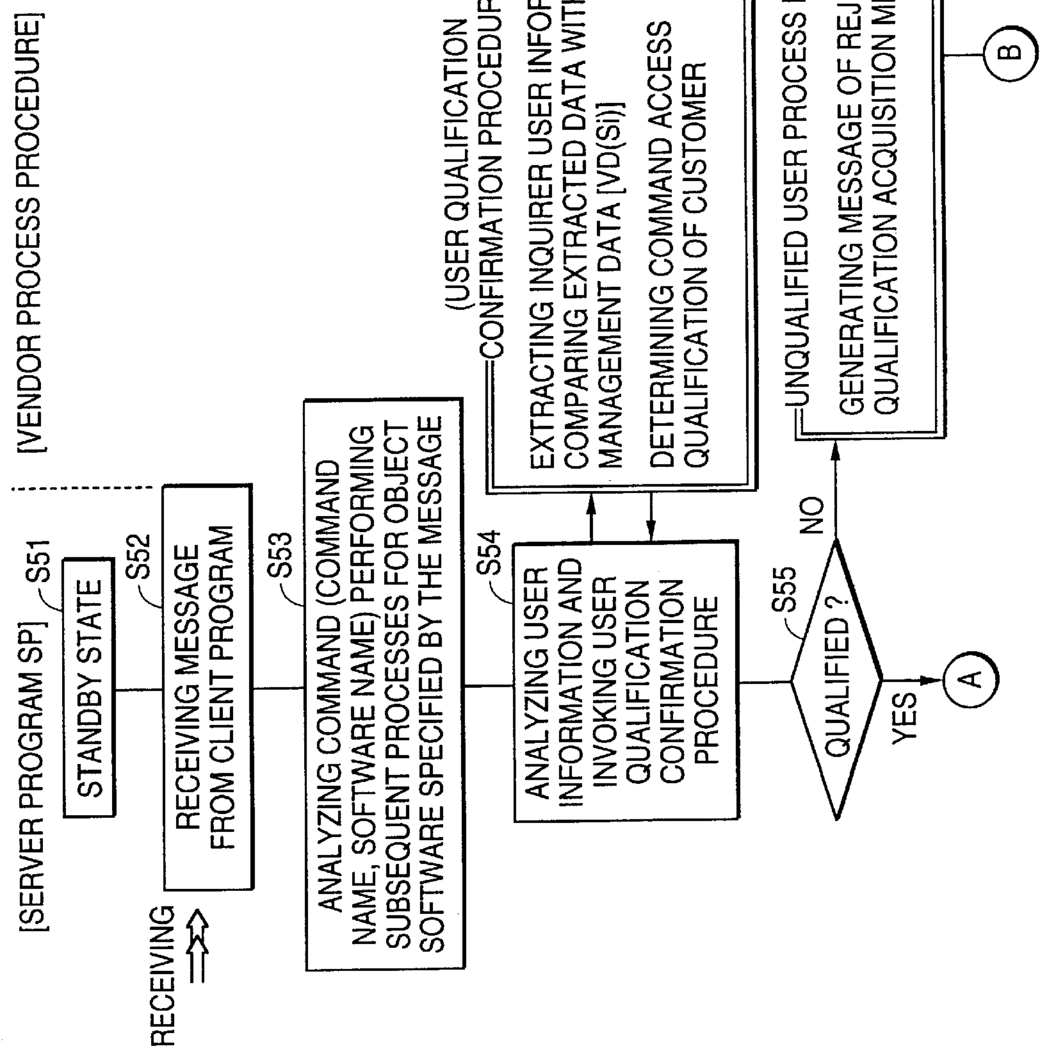
FIG. 14 shows the entire configuration of the process performed by a server program according to the second embodiment.
Figure 15:
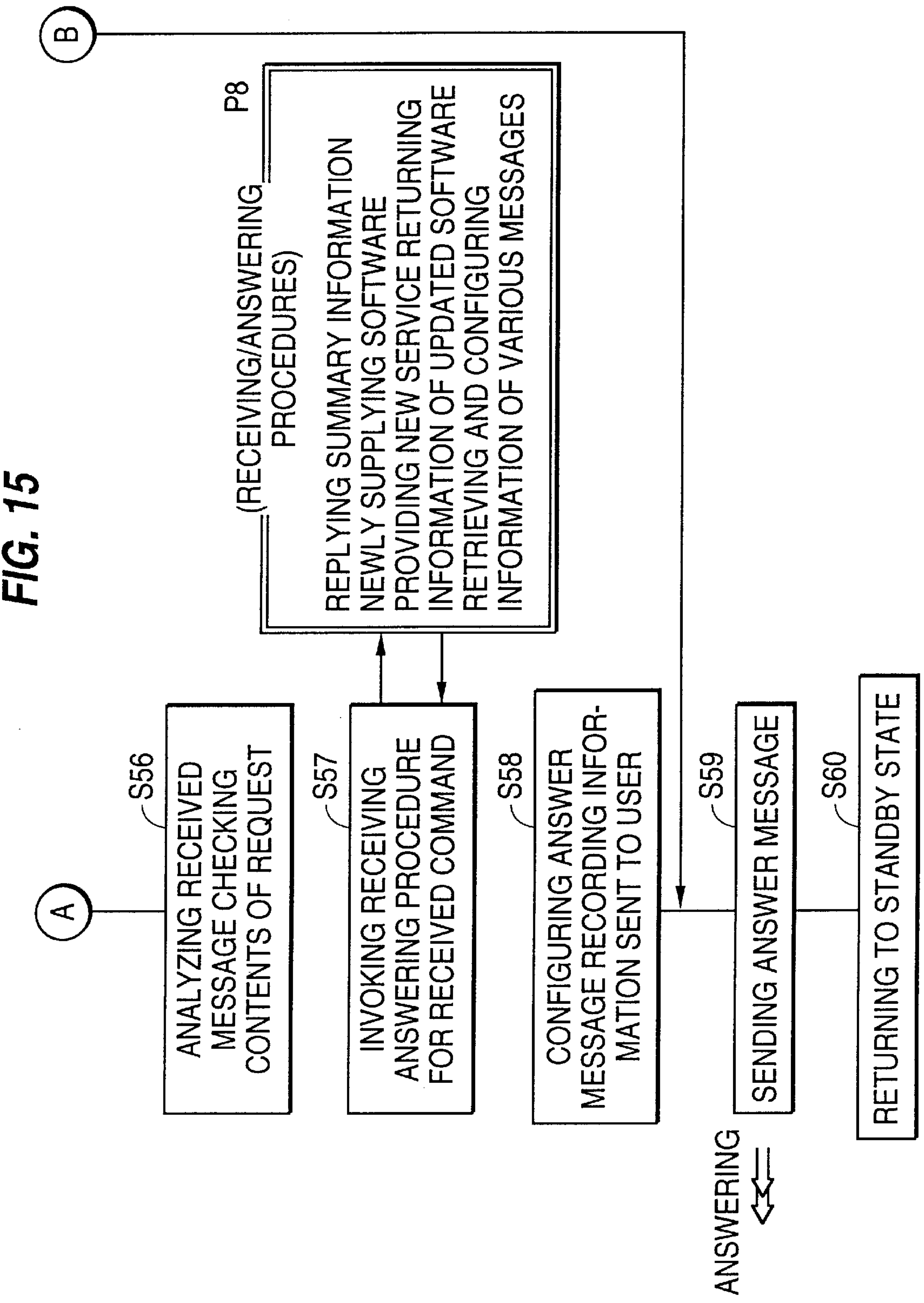
FIG. 15 shows the entire configuration (continued) of the process performed by a server program according to the second embodiment.
Figure 20:
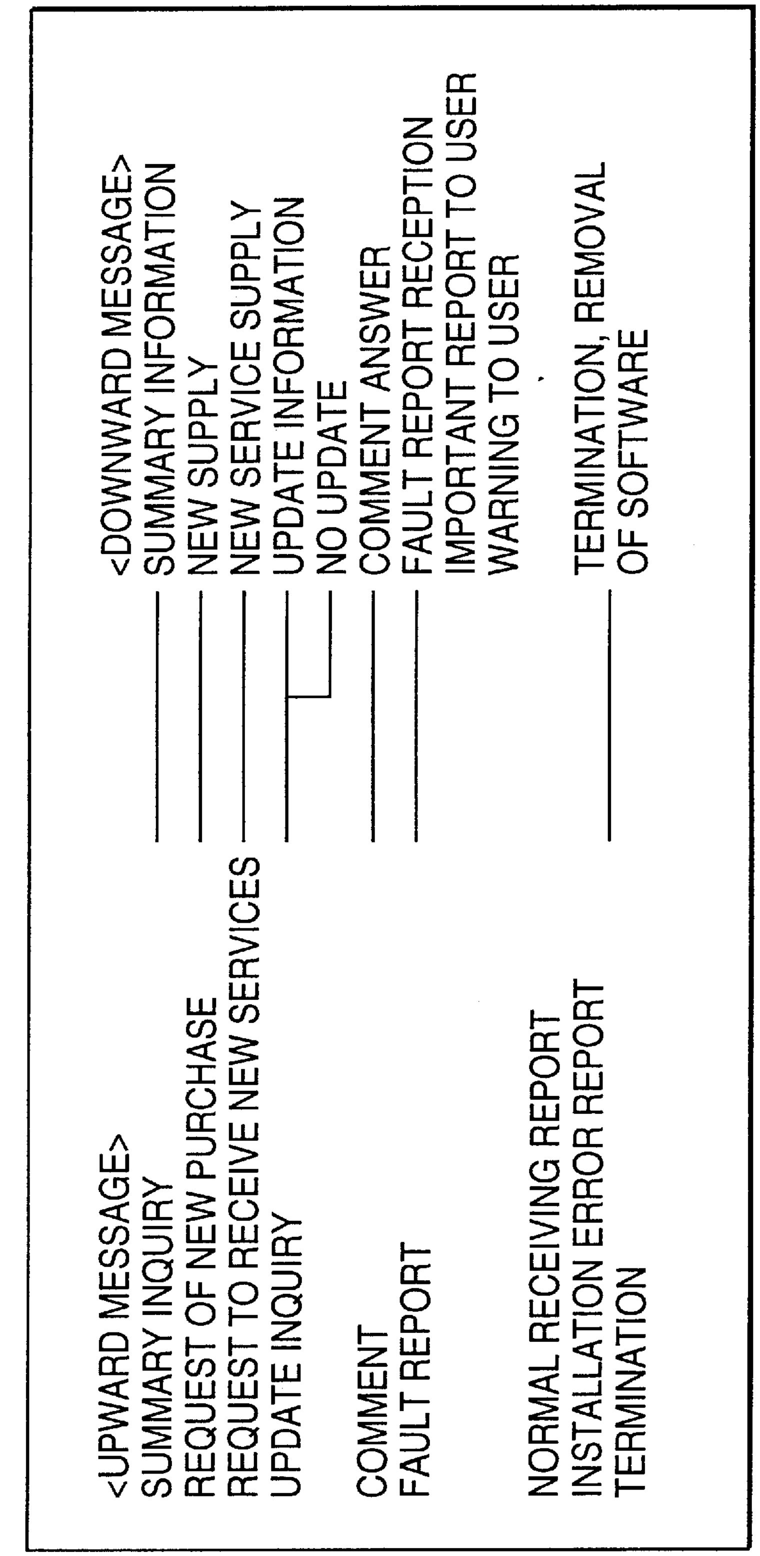
FIG. 20 designates an upward message and a downward message according to the third embodiment.

FIGS. 14 and 15 show the entire configuration of a process of a server program. The entire configuration of a process performed in a vendor computer is explained by referring to FIGS. 14 and 15 as follows.

In FIGS. 14 and 15, processes performed by the server program are listed on the left and processes performed by vendor process procedures are written on the right. As described above, the vendor process procedure is set in the vendor management data VD (Si) for each software library. Setting the vendor process procedure in the vendor management data VD (Si) and invoking it in the server program allow the server program SP to be successfully unified.

In FIGS. 14 and 15, the server program SP in the vendor computer is constantly activated and stands by to receive various inquiry messages to be transmitted from the client programs CP of a number of users through the network (step S51 in FIG. 14).

If the server program SP receives a message from a client program CP over the network (step S52), then the server program SP checks the data in the subject column of the message to read a command name and a software name. The subsequent processes are performed for the object software thus specified (step S53).

The user name and user information are extracted from the header of the message, and the vendor management data VD (Si) of the object software are referred to in order to invoke the customer confirmation procedure specified therein (step S54).

A customer qualification confirmation procedure P6 compares the inquiring user information with the user information of the vendor management data VD (Si) and determines whether the inquiring user is a registered customer or a new customer. If the inquiring user is a registered customer, then the customer information is accessed to check the qualification of the inquiring customer.

If the inquiring user is a new customer, the user is entered as a customer and assigned, for example, a summary information access qualification, as an initial qualification for a new customer. Then, it is determined whether or not the customer is qualified for a command in the received message (step S55).

If the inquiring user is an unqualified user, then a unqualified user process procedure P7 is invoked and the specification in the vendor management data VD (Si) is referred to in order to generate an appropriate answer message indicating rejection, warning, information how to acquire qualifications, etc.

If the inquiring user is a qualified customer, the received message is analyzed and the inquiry is read (step S56).

Then, an answer procedure P8 depending on the command in the received message is invoked according to the specification of the vendor management data VD (Si) (step S57).

In response to the received command, the answer procedure P8 retrieves necessary information to return a proper answer, and obtains information required to generate an answer message. These processes include returning summary information, newly providing software, supplying new services, returning updated software information, generating other messages.

Then, an answer message is generated using above described information, and information items sent to users are stored in the user history, etc. in the vendor management data VD (Si) (step 358).

The answer message generated in step S58 is returned to the inquiry user through the network (step S59). Then, the server program returns to a standby state (step S60).

(ii) Answering Process in Response to New Purchase Request

The processes of the server program SP in the answering process in response to a new purchase request normally conform to the processes shown in FIGS. 14 and 15. In these processes, the features of a new purchase request are explained as follows.

In the customer qualification confirmation procedure P6 shown in FIG. 14, the inquiring user is determined to be a qualified user only when he or she is a user who follows a regular purchase procedure.

In the unqualified user process procedure P7, a method of following a regular procedure to make a new purchase is generated as a notice message to be returned.

In the answer procedure P8, the settings in the vendor management data VD (Si) are referred to using the user identification information in the inquiry message to determine the version type Si.V to be supplied. Then, obtained is a set of module Mm.1 forming the latest version Si.V.1 in the version type, and generated is the instruction information indicating how to perform an installation process in a user computer.

In step S58, a NewInstall message is generated as an answer message using the information in the answer procedure P8.

(iii) Answering Process in Response to Update Inquiry

Normally, this process conforms to the processes shown in FIGS. 14 and 15. In this process, the features of an update inquiry are described as follows.

In the customer qualification confirmation procedure P6 shown in FIG. 14, the inquiring user is determined to be a qualified user only when he or she is legally provided with the software and the condition of using the software (for example, the term) is still valid.

The following processes are performed in the unqualified user process procedure P7.

(a) When an inquirer is not provided with the software itself;

the procedure of newly purchasing the software is informed of with a Notice message.

(b) When the inquirer was legally provided with the software, but is not qualified after the expiration;

the procedure for the renewal of the qualification is informed of with a Notice message.

(c) When the inquirer is not legally provided with the software, that is, using it illegally;

a Warning message is returned.

In the answer procedure P8 followed in response to an update inquiry, determined are the version type Si.V' and its latest version number Si.V'.1" by comparing the user identification information in the request message with the settings in the vendor management data VD (Si).

(a) If the determined version type and number match the user's current version Si.V.1, then a NoUpdate message is returned informing that no update is required.

(b) If the user's current version is to be updated into the latest version number, then a module delete/add instruction information is transmitted to instruct that the user's current version Si.V.1 should be replaced with the latest version Si.V.1', and the required modules Mm.1' are retrieved and sent to the user.

(c) If the vendor determines that the user's current version type Si.V should be replaced with the version type Si.V' including a new service, then the information of the new version is given to the user in a Notice message.

In step S58, an answer message is generated and the information about the version which is being sent to the user is stored in the user individual information in the vendor management data VD (Si).

(iv) Fault Report Message Receiving Process

Normally, the process conforms to the processes shown in FIGS. 14 and 15. In this process, the features of the fault report message receiving process are described as follows.

In the answer procedure P8 followed in response to a fault report, the contents of the fault report are properly classified, analyzed, stored in a fault report data base based on the vendor management data VD (Si), and then are transmitted to the developer of the software as a summary. The fault reporting user receives a BugAck message acknowledging the fault report.

In FIGS. 14 and 15, the command analysis in step S54 is always followed by the generation of a new process, and the processes performed before the transmission of an answer message in step S59 are executed by the new process. Thus, like the client program, the server program concurrently performs a plurality of processes.

(6) Answer Message Process in a User Computer

FIGS. 12 and 13 show the entire configuration of the process of the client program CP in the user computer.

If the client program CP sends various inquiry messages (refer to (4)(ii)–(iv)), the server program SP performs an answering process (refer to (5)(i)–(iv)) and returns an answer message. The client program CP receives the answer messages in the processes in steps S31–S34 shown in FIG. 12, in steps S39–S41 in FIG. 13, and in the procedures P2 and P3, and installs the purchased software, updates the user object software, updates the user object software, displays and stores Warning/Notice messages, etc.

(i) Newly Purchased Software Installation Process

Described below are the processes to be performed to receive and install a newly provided software according to the processes shown in FIGS. 12 and 13. In step S32 shown in FIG. 12, the client program CP receives a NewInstall message from the server program SP through the network.

The client program CP reads a user name Uj from the destination and a software name in the Subject column in a message, and then performs the following processes using the corresponding user management data UD (Uj) (step S33).

Since the message is received over the network in this case, control is passed to step S39 (step S34).

In step S39, the message transmission record relating to the user and the software is checked, and it is checked that a standby state is entered after the transmission of a new purchase request (WantNew) message. Then, the vendor confirmation procedure P2 is invoked to confirm that the message has been received from the right vendor. That is, in the vendor confirmation procedure P2, it is confirmed that the answer message is sent by a legal vendor Vk recorded in the user management data UD (Uj) using a password, etc.

Then, the answering procedure P3 is invoked for a NewInstall command by referring to the user management data UD (Uj) (step S40).

The procedure of installing a newly purchased software in the answering procedure P3 installs the software in the user computer using the specification in the user management data UD (Uj) and the install instruction information from the vendor. If the message is determined to be rejected, then the contents of the answer message is stored as data only, and the software is not installed. The process result is monitored to check whether it terminates normally or abnormally.

In step S41, the client program CP immediately sends the confirmation message of an installation process to the server program SP. If the installation process is normally performed, or at least if the software is stored, the client program CP sends an InstallAck message. If the installation process abnormally terminates, the client program CP sends an InstallTrouble message.

In step S42, the client program CP records the received answer message and the transmitted confirmation message, and then returns to the standby state S31.

If a Notice message, instead of a NewInstall message is returned after issuing a new purchase request, then the client program CP performs the process described later in (iii).

(ii) Update Software Installation Process

If update software information is received and the software is installed, then the above described process (i) is performed except the following operations.

In step S32 in FIG. 12, the client program CP receives an Update message over the network.

In step S39, the message transmission record is checked to confirm that the system is in a standby state after the transmission of the update inquiry (CheckUpdate) message and the message is received from the right vendor.

The answering procedure P3 invokes an updating procedure.

The updating procedure deletes unnecessary modules in the user computer using the specification in the user management data UD (Uj) and the update instruction information from the vendor, and then stores added modules according to the received message. According to the specification of the user management data, the unnecessary modules can be actually kept undeleted, but be stored as backup data to enable both new version and old version to be used in parallel.

The software is installed in preparation of actual execution. If it is determined that the installation should not be done automatically, the software is not installed. The result of the updated version replacement process and the installation process is monitored as to whether the processes terminated normally or abnormally.

In step S41, a result confirmation message of the updated version replacement process and the installation process is immediately sent to the server program SP. If the processes terminate normally, or at least if the software is successfully stored, then an InstallAck message is returned. An InstallTrouble message is returned if the processes abnormally terminates.

If a NoUpdate message is returned in response to an update inquiry message, then no processes are performed in step S40, procedure P3, and Step S41, but answer information only is stored in step S42.

(iii) Notice Message Process

A Notice message (as information only) from a vendor is returned as an exception process in response to various inquiries from a user (new purchase request, new service acquisition request, update inquiry, comment, fault report, etc.). In this case, the client program CP responds as follows.

In step S32, the client program CP receives a Notice command through the network.

In step S33, a user name, software name, and inquiry message are read from the message destination, Subject column, and In-Reply-to column.

Control is passed from step S34 to step S39 to refer to the record of the transmission message and confirm that the answer message is received from the right vendor.

In step S40, the type of the inquiry message is explicitly indicated and the answering procedure P3 for the Notice message is invoked.

The answering procedure P3 displays the contents of the Notice message to the user, copies them to the user's mail box or stores them in the mail box.

The contents of the Notice message is interpreted to take an appropriate action in response to the standby inquiry message. For example, an answer-wait state is released for a WantNew message and a WantRenew message.

No confirmation messages are required in steps S41 and S42. The answer is recorded and the system enters the standby state.

FIG. 16 is a simplified flowchart showing the entire process of the software distribution/maintenance method according to the second embodiment. Specifically, FIG. 16 is a flowchart showing the process of the software distribution/maintenance method used in the software distribution/maintenance system according to the second embodiment. The operation is similar to the above described system operation, and can be briefly explained as follows. A client program in a user computer is activated by a user input command in step S61 or through a user program. Then, a software distribution/maintenance request message is generated in step S62 and sent to the server program of a vendor computer.

The server program receives the distribution/maintenance request message in step S63, and refers to the vendor software library in step S64 to generate and send to the client program an answer message in response to the distribution/maintenance request message sent from the client program.

The client program receives the answer message in step S65, distributes or maintains the software in step S66, and returns to the process in step S61 after the completion of the process in step S66.

FIG. 17 is a flowchart showing the entire process of the software distribution/maintenance method using user management data and vendor management data. As compared with the flowchart shown in FIG. 17, it is different in that a distribution/maintenance request message is generated by referring to the user management data in step S67, and that an answer message is generated by referring to the vendor management data in step S68.

(7) Operation of Software Distribution/Maintenance System

The software distribution/maintenance system according to the present embodiment can be applied to various ways of software distribution and maintenance. Described below are various ways of operation of the software distribution/maintenance system based on the present embodiment.

(i) Operation for Application Software Products

When the software distribution/maintenance system described above as an embodiment is applied to distribute and maintain commercial application software products, the following operation types (in consideration of vendor management data VD (Si) and user management data UD (Uj)) are introduced.

(a) The vendor determines the qualifications of users as follows.

Summary inquiry: All users can access summary information and purchase procedure. That is, every user can be informed of a contract procedure for purchasing and using software (including payment).

New purchase request: On completion of the purchase procedure, a user is assigned a unique and authorized password, and the software can be provided for a user having the authorized password.

New service acquisition request: New services can be provided for users who are assigned authorized passwords and completed new service acquisition procedure.

Update Inquiry: Accessible by a regular customer. Other users are given a Warning message.

(b) The vendor determines the types of versions as follows.

Dependency on user models: User identification information should contain the model and capacity of the user computer so that the user can be provided with software of a proper version type.

Dependency on software environment: Users are informed of the dependency on the type of operation system, language, etc. so that they can select proper version types.

(c) The standard settings in the installation process in a user computer are listed below.

The software is installed according to the installation instruction information of the vendor.

An old version can be used as backup and used with a new updated version in parallel.

(ii) Operation for the Operating System of a Large-scale Computer

When the above described software distribution/ maintenance system is adopted to distribute and maintain the operating system of a large-scale computer, the following operations are introduced.

(a) The vendor determines the qualifications of users as follows.

Summary inquiry: All users are informed of summary information and required to follow the purchase contract procedure.

Other inquiries: Only customers who are assigned authorized passwords can be answered.

(b) A version type is determined between the vendor and the user under contract.

(c) Described below are the standard installation processes in a user computer.

The software transmitted with the vendor's message is stored in a secondary storage, and does not automatically activate an installation process. The installation process is performed by a user according to the sufficient instruction of the vendor.

(iii) Operation for Shareware

When the above described software distribution/ maintenance system is adopted to distribute and maintain software as shareware, the following operations are introduced.

(a) The vendor determines the qualifications of users as follows.

Summary inquiry: All users are informed of the summary information and the purchase procedure. The summary information clearly mentions that the object software is shareware and demands that a regular user should pay the fund to support the development and improvement of the software.

New purchase request: Every user is sent the object software as shareware on the response of thes new purchase request, and the above described fund is demanded of the user to pay after the user's satisfaction of the software.

New service acquisition request and update inquiry: Every entered user is informed of a new service acquisition request and an update inquiry. When a user issues the update inquiry certain times, the above described support fund is demanded of the user.

(b) Refer to (7) (i) above for a version type.

(c) Refer to (7) (i) above for the installation process in a user computer.

(iv) Operation for Freeware

When the above described software distribution/ maintenance system is adopted to distribute and maintain software as shareware, the following operations are introduced.

(a) The vendor determines the qualifications of users as follows.

Summary inquiry: All users are informed of the summary information and the purchase procedure. The summary information clearly mentions that the object software is freeware and should be provided for other users without deleting the indication of the copyright.

New purchase request: Every user is informed of a new purchase request, and the above description of the copyright handling is accompanied.

New service acquisition request and update inquiry: Every entered user is informed of a new service acquisition request and an update inquiry. The request and inquiry.

(b) Refer to (7) (i) above for a version type.

(c) Refer to (7) (i) above for the installation process in a user computer.

(v) Operation for Scientific Prototype Software

When the above described software distribution/ maintenance system is adopted to distribute and maintain scientific prototype software, the following operations are introduced.

(a) The vendor determines the qualifications of users as follows.

Summary inquiry: All users are informed of the summary information and the purchase procedure. The summary information clearly mentions that the object software is scientific software and should be widely provided for other users with the copyright greatly respected.

New purchase request: Every user is informed of a new purchase request, and is informed that the copyright should be respected, its commercial use is prohibited, a trial use report should be presented, etc.

New service acquisition request and update inquiry: Every entered user is informed of a new service acquisition request and an update inquiry.

(b) Refer to (7) (i) above for a version type.

(c) Refer to (7) (i) above for the installation process in a user computer.

(vi) Operation for Intra-office Developed Software

When the software distribution/maintenance system is adopted to distribute and maintain intra-office-developed software, the following operations are introduced.

(a) The vendor determined the qualifications of users as follows.

Summary inquiry: Every entered member of a specified organization can be informed of the acquisition method. The information clearly mentions that other users than the members of the organization are not allowed to be provided with, use, or be presented the information. An unentered but authorizable user of the specified organization is informed of the entry method. Any user not authorizable or not of the specified organization is rejected with a warning message.

New acquisition request: Every entered member of a specified organization can be informed of the new acquisition request with the above described warning of no disclosure of the information to other users than internal members.

New service acquisition request and update inquiry: Every entered user can be informed of the new service acquisition request and the update inquiry.

(b) Refer to (7)(i) for the version type.

(c) Refer to (7)(i) for the settings in the installation process in a user computer.

It is an important nature of the software distribution/ maintenance system according to the present invention that the different ways of operation for various types of software are compatible and simultaneously applicable in one system. Such operation methods are implemented in the vendor management data by the vendors independently so as to reflect their physics of software distribution.

Described below further in detail is the configuration and the process of a client program. Described first are the entire components in a user computer related to the client program.

The components are: units forming the execution environment of the client program such as an operation system, network access units, etc.; the body of the client program; standard (default) procedures to be invoked by the client program; the user management data; the user call procedures in the user management data; the data area managed by the client program; the object software storage area, etc.

1–15 respectively show the summary of the process performed by the client program. 1–15 are almost the same as the combination of FIGS. 12 and 13.

1 standby state 2 activating by user or object software, or by receiving message through the network 3 analyzing the command (user name, command name, and software name) and performing subsequent processes for the specified user and software 4 jumping according to the activator passing control to 5 when user activated CP passing control to 7 when user software activated CP passing control to 10 when message was received through network 5 editing a message in interactive mode for the specified command invoking and using 6, then passing control to 8

6 (each sending procedure)

retrieving and configuring information such summary inquiry, new purchase request, new service supply request, update inquiry, fault report, etc.

7 automatic editing message for each command invoking and using 6, then passing control to 8

8 sending the inquiry message after recording it 9 returning to the standby state 1

10 confirming answer-wait state, and calling and using sender (vendor) confirmation procedure 11

11 (vendor confirmation procedure) vendor confirmation process 12 invoking answering procedure for each received command, and invoking and using 13

13 (each answering procedure)

installing newly purchased software and updated software displaying and storing warning message and notes 14 generating and sending (only required) answer result confirmation message 15 recording answer and returning to standby state 1 software An example of the process performed by the client program is described by referring to the summary of the process. The following explanation items 1–15 correspond to items 1–15 described above.

1 The OS, network capabilities, etc. are initialized in a user computer. Simultaneously, the present client program (CP) is initialized and set in a ready standby state. Also initialized are the data managed by the client program (CP).

2 The client program (CP) is activated in the following 3 cases.

(a) A user enters a command of the software distribution/maintenance system.

(b) The client program (CP) is activated by use's software or by invoking object software.

(c) A message is received from the network to the software distribution/maintenance system.

These processes are provided for the CP through the OS capabilities or the network capabilities.

3 The summary of the activation is recognized through command analysis.

Obtained by the analysis are the user name, the command name, and the software name.

(a) If a user inputs the command, the user specifies the command name and the object software name. The OS can supplement the user name.

(b) If user's software or object software is activated, then the command name and the object software name are specified in the activation instruction. The user name is supplemented by the OS.

(c) If a message is received through the network, then the user name is obtained from the destination of the message, and the command name and the object software name are obtained from the Subject column of the message.

As a result of the analysis, the user management data (including the user-specified procedure) for the object software of the user are referred to in the subsequent processes.

4 Jumping according to the activation

In a sequential execution of the client program CP processes, a jump is made to 5 by a user activation; 7 by a user software activation; and 10 by the message from the network.

In a parallel execution of the CP processes, the result of the command analysis is recorded in the CP operation history list and a child process is generated and executed concurrently with the parent CP program. If another child process is being performed for the same user and the same object software, the new-born child process is kept waiting until the preceding child process completes.

5 When a user inputted the command;

The client program (CP) (or the child process of the client program in the parallel execution) invokes an interactive inquiry editing procedure 6 for the command. If the procedure is specified in the user management data, the user-specified procedure is used. If not, the default is the standard procedure. By use of the procedure, the user edits and generates a transmission message for the specified command in an interactive mode. Then, the control jumps to 8.

7 When the client program was activated by software or a message;

The client program (CP)(or the child process of the client program in the parallel execution) invokes an automatic inquiry editing procedure for the command. If the procedure is specified in the user management data, the user-specified procedure is used. Otherwise, the default is the standard procedure. The procedure refers to the user management data and automatically edits and generates an inquiry message for the specified command.

8 The message generated in 5 or 7 above is recorded and then sent to the vendor's computer through the network.

9 The client program (CP) returns to the standby state 1.

The client program (CP)(or the child process of the client program in the parallel execution) records the transmission on the CP process history list. In the parallel execution of processes, the child process terminates its job and is deleted. The client program (CP) returns to the standby state 1.

10 When the message was received through the network;

The client program (CP)(or the child process of the client program in the parallel execution) refers to the CP process history list and confirms that the user sent a message relating to the object software and that the received message can be expected as an answer.

To confirm that the sender of the received message is the right vendor, the client program (CP) or its child process invokes the vendor confirmation procedure 11. If the procedure is specified in the user management data, then the user-specified procedure is used. Otherwise, the default is the standard procedure.

If the received message is rejected by the confirmation, then the client program (CP) terminates without performing the subsequent processes and returns to the standby state 1.

12 Answer receiving procedure in response to a right answer

The client program (CP)(or the child process of the client program in the parallel execution) invokes answer receiving procedure 13 for the command. At this time, either interactive or automatic answer receiving procedure is selected depending on whether the corresponding inquiry message was processed interactively or automatically. If the answering procedure is specified in the user management data, then the user-specified answer receiving procedure is used. Otherwise, the default is the standard procedure.

14 If the command requests the confirmation of the result of the answer receiving process (that is, either NewInstall, Renew, or Update command), then the client program (CP)(or its child process in the parallel execution) automatically monitors the result of the answer receiving process in 13. If the answer receiving process in 13 (storing and installing the software) has been successfully performed, then an acknowledgement (InstllAck) message is generated (by the user-specified or the default automatic editing procedure) and sent to the vendor through the network. If the answer receiving process 13 abnormally terminates, an InstallTrouble message is generated (by the user-specified or the default automatic editing procedure) and sent to the vendor through the network.

15 The answering process is recorded and the program returns to the standby state 1.

The client program (CP) (or its child process in the parallel execution) records the answer receiving process (and the transmission of the acknowledgement trouble message in the case of 14 above) on the CP process history list. In the parallel execution of processes, the child process terminates its job and is deleted. The client program (CP) returns to the standby state 1.

(a)–(h) explain 6, that is, explains the processes in various inquiry editing procedures. The configurations of the messages generated by these procedures are described above.

Common Process (1) obtaining and setting user identification information by referring to user management data (2) obtaining and setting vendor identification information by referring to user management data (3) obtaining and setting software identification information by referring to user management data (4) generating header of a transmission message (destination, source, and subject columns)

(b) Inform-SA/SB (sending summary inquiry) (done in the common process)

(c) WantNew-SA/SB (sending new purchase request) (done in the common process)

(d) WantRenew-SA/SB (sending new service request) specifying new service supply request (e) CheckUpdate-SA/SB (sending update inquiry)

Detailed current software identification information (version type, version number, configuration date, etc.) is extracted and specified by referring to user management data (or the current object software if necessary).

(f) Comment-SA/SB (sending comments) writing any comment (g) BugReport-SA/SB (sending fault report)

Software identification information (version type, number, date) is extracted, and the cause and instruction directly involved in an abnormal termination is extracted and analyzed.

(h) FinishUse-SA/SB (sending termination of use message) The version information of terminated software is extracted.

(a)–(h) explain only the main processes to be done in the procedures. In the automatic editing procedures, the minimal essence of a message is prepared, while more detailed portion can be specified in the interactive editing procedures.

(a)–(j) explain the processes performed by various answering process procedures.

a) ReplyInfo-RA/RB (Receiving Summary Information)

The contents of summary information are stored in a predetermined directory.

(b) Newlnstall-RA/RB (Receiving Newly Supplied Software)

Detailed vendor identification information, a password in user identification information, detailed software identification information (version type, number, date, etc.) are stored in user management data.

The following received data of software is temporarily stored in a predetermined directory:

specified software application condition (applicable computer type,

OS, environment, etc.); software installation instruction information; software configuration information; body of software; software document and manual; software distribution rules; standard user procedure (to be invoked by CP) generated by vendor.

After checking various application conditions specified by vendor, the body of software is installed according to the installation instruction information.

The results of the storage and installation as to whether the processes are successfully performed or abnormally terminate should be monitored.

(c) Renew-RA/RB (Receiving Additional Services)

The newly served software is processed as in the case of the above described NewInstall-RA/RB. The old version of the software should also be properly handled (i.e. either deleted or kept).

(d) Update-RA/RB (Receiving Update)

The following software update information is stored in a predetermined directory:

software identification information (version type, number, date);

explanation of software update (purpose of update, improved functions, newly solved problems, etc.);

specification of application conditions of updated software; detailed software identification information of updated software (version type, number, etc.);

update instruction information of updated software; configuration information of updated software; body of updated software (only updated and added portions); documents, manuals, etc. of updated software (updated portions); and instruction information for processing an old version of software.

The above listed information is checked, and the current object software is updated based on the update information according to the update instruction information specified by the vendor.

Monitored is the storage and update processes as to whether the processes are successfully performed or abnormally terminate.

(e) NoUpdate-RA/RB (Receiving No Update Message)

No action is taken. .

(f) Notice-RA/RB (Receiving Notice Message)

The contents of the received message are temporarily stored in the directory and displayed.

(g) Warning-RA/RB (Receiving Warning Message)

The contents of the answer is temporarily stored in the directory and displayed immediately.

(h) Answer-RA/RB (Receiving Answer)

The contents of the answer is temporarily stored in the directory and displayed.

(i) BugAck-RA/RB (Receiving Fault Report)

The contents of the answer is temporarily stored in the directory and displayed.

(j) Erase-RA/RB (Receiving Terminate And Erase Message)

The contents of the answer is temporarily stored in the directory to be checked, and the information of the object software is cleared according to the clear instruction information.

(a) and (b) respectively explain 14, that is, explains the processes performed in the acknowledgement message sending procedure as a result of the answering process.

a) InstallAck-SA/SB (Sending Acknowledgement)

The identification information of a received vendor message (vendor transmission time, etc.) is extracted, and a message is generated according to the result of monitoring the installation and updating the software to inform that a temporary storage or process has been successfully performed.

(b) InstallTrouble-SA/SB (sending installation Trouble message)

The identification information of the received vendor message (vendor transmission time, etc.) is extracted, and a message is generated according to the result of monitoring the installation and updating the software to inform of the occurrence process of the fault and a process to be performed.

Then, the configuration and the processes of the server program are described as follows. In a vendor computer, there are following components related to the server program: the execution environment of the server program including the operation system; the body of the server program; (default) procedures to be invoked by the server program; the vendor management data; the vendor call procedure in the vendor management data; the data area managed by the server program; the object software storage area, etc.

1–14 respectively show the summary of the process performed by the server program. The summary of the process is similar to the configuration of the process for the server program explained in FIGS. 14 and 15.

1 standby state 2 receiving a message from client program over network 3 analyzing the command of the message (user name, command name, and object software name)

and performing subsequent processes for specified object software 4 interpreting and storing the received message and invoking procedure 5 to confirm user information and user qualification 5 performing customer qualification confirmation procedure as follows;

extracting inquirer user information, comparing extracted data with vendor management data, confirming customer information for authorized customer and entering a new customer with assigning initial qualification, determining command access qualification of the customer 6 in case the user is invoking unqualified user process procedure 7

7 generating a message of rejection, warning, qualification obtaining method, etc. and passing control to 13

8 in case the user is qualified, invoking a receiving procedure 9 for the specified command, analyzing the received message, and determining a command to be returned 10 invoking an answering procedure for the command to be returned 11 performing the answering procedure, for the preparation for returning summary information, newly providing software, providing new service, returning update software information, returning other messages, etc.

12 configuring the answer message and recording it 13 sending the answer message 14 returning to the standby state 1.

An example of the process performed by the server program is explained below. The following items 1–14 correspond to 1–14 shown above. In this example, a process of receiving a message from the client program is separate from a process of returning an answer message in response to the received message, so as to invoke the receiving procedure 9 and the answering procedure 11 respectively. But obviously, a receiving/answering procedure can be designed to perform these processes in series.

1 The operating system and the network capabilities are initialized in a server computer. Simultaneously, the server program (SP) is initialized. After the data managed by the server program (SP) are initialized, the program is set in a ready standby state.

2 When a message to the software distribution/maintenance system is received through the network, it is transmitted to the SP through the OS capabilities or the network capabilities, thereby activating the SP.

3 The header of the message is analyzed to obtain the user name from the message source, and the command name and the object software name from the subject column. Used in the subsequent processes are the vendor management data (including the vendor-specified procedures) for the object software specified by this command analysis.

In the parallel execution of SP processes, the command analysis result is recorded on the SP process history list. Then, a new child process is generated and executed concurrently with the parent SP program. If another child process is being performed for the same object software and for the same user, the new-born child process is kept waiting until the preceding child process completes.

4 The server program (SP) (or a child process of the server program in the parallel execution of SP processes) first reads the entire received message, interprets the message, and temporarily stores it in a storage area of the server program (SP) (or the child process). The contents of the message can be user identification information, vendor identification information, software identification information, and various information required or optional for each inquiry/request command. Then, using the information, the customer qualification confirmation procedure is invoked to confirm the qualification of the user. If the procedure is specified in the vendor management data, then the vendor-specified procedure is used. Otherwise, the default is the standard procedure.

5 In the customer qualification confirmation procedure, the user identification information in the received message is compared with the user identification information data base in the vendor management data to determine the access qualification of the user. The methods of comparing and determining the related data are set by the vendors according to their distribution policy, as described later. If the user is a new customer, the range of the software to be provided for the user and the conditions of the access to the provided software should be clearly defined. If the user is an authorized user, his or her password and access right to each command should be confirmed.

6 The vendor-defined (or default) unqualified-user processing procedure 7 is invoked to handle auser who has been determined to be unqualified in the previous step. A message informing rejection, warning, instruction to acquire the qualification, etc. is returned to the unqualified user according to the vendor-defined rules. After returning the message, control is passed to 13.

8 In response to the message received from the qualified user, the program analyzes the received message and interprets the contents of the inquiry from the user. To attain this, the vendor-defined (or default) receiving procedure 9 is used for each command of the received message. In the receiving procedure, the contents of the received message are interpreted and determined by referring to the vendor management data to select the type (normally a single type, but possibly plural types) of the command to be returned.

10 In response to the above described determination, the vendor-defined (or default) answering procedure is invoked to answer the command.

11 In the answering procedure, an answer message is generated by referring to the contents of the received message, the vendor management data, and the vendor object software library. An answer message contains, for example, in case of an Update message, the update instruction information to update the software and the updated portion of the software.

12 The answer message is completed with headers etc. and recorded in the SP process history list.

13 The answer message is sent to the inquiring lient program through the network.

14 (The child process is deleted here in the parallel execution of processes.) The server program (SP) returns to the standby state 1. The customer qualification confirmation procedure 5 and the unqualified user process procedure 7 are used to practically realize various vendor-defined software providing policy. The access qualifications of customers are regulated at four levels, that is, (0)–(3) as shown in Table 5. Access by a user to certain object software is limited to the inquiry/request commands shown in Table 5 depending on the four levels. There is a choice by the vendor, as usual for any commercial sales policy, between the pay-first supply-later or the supply-first pay-later policies in setting the customer qualification confirmation rules at level (2) for a new software request and a new service request command.

| Access Qualification Level | Inquiry/Request Command Allowed |
|---|---|
| (0) no access permitted | none |
| (1) accessible to summary information only | summary inquiry (Inform) |
| (2) accessible to request for new software and new service | new purchase request (WantNew)<br>new service request (WantRenew) |
| (3) access qualification of current version | update inquiry (CheckUpdate)<br>comment (Comment)<br>fault report (BugReport)<br>termination of use (FinishUse) |

The information required for the determination of the access qualifications includes in addition to the basis ones like user identification information and software identification information, some information depending on each command, such as information about a payment process and rules, information about version selection, etc.

The software supply rules as the contents of the customer qualification confirmation procedure 5 and the unqualified user processing procedure 7 depend on vendor's operational policy in distributing the software. Five operation methods (a)–(e) are described below as examples.

(a) Operation Method for an OS in a Large-scale Computer

Services are normally provided for the limited range of authorized users.

Summary inquiries (level (1)) are answered in a wide range.

Services of levels (2) and (3) are available for a limited number of users who made individual agreements. Therefore, the vendor enters authorized users after agreements to process the users' messages based on a strict password system.

(b) Operation Method for Commercial Application Software Products

All users are positively answered when they send summary inquiries (level (1)). All accessing users are entered in the customer data base of the vendor; the summary information is arranged and returned in a format suitable for each user; and purchase and payment methods are specified.

Relating to a new purchase request at level (2), answered are those who have promised to pay for the software (for example, by specifying their bank account number credit card number in an official format) or who have completed the payment for the software. Other users are answered with a description of payment method without providing the software. New service acquisition requests are answered likewise.

For an inquiry at level (3), the user identification information such as the user name, entry number, password, computer model number, etc. is required and compared with the data in the vendor management data in order to identify the user as an authorized user who completed the payment. A user who is determined to be unqualified is so recorded and his or her request is rejected with a warning message. (The vendor can analyze the warning records later and legally prove that a specific user illegally obtains and uses the software of the vendor for a long period.)

(c) Operation Method for Shareware

All users who send inquiries at level (1) are positively answered with summary information, message which clearly mentions with the purchase method and the charge as shareware.

For a new purchase request, the requester is entered as a user, immediately provided with the software, and requested to pay the charge later.

For an inquiry at level (3), the inquirer is checked for his or her user entry (an unentered user is newly entered) and positively answered. If the vendor finds that the inquirer has not paid the charge even after certain times of update inquiries for a certain period, then the inquirer can be urged to pay the charge for the software as shareware (by use of a Notice message, etc.).

(d) Operation Method for Scientific Software

A message at level (1) is answered in a wide range (mostly for scientific users). An inquirer is answered with summary information of the scientific prototype software and its distribution policy such as the respect of copyright, prohibition of commercial use of the software, and a request for a trial use report.

For a request at level (2), the requester is entered as a user, provided with the software, and required to accept the distribution rules. Normally, the software is provided free of charge.

For an inquiry at level (3), the entry of the inquirer is checked (an unentered user is newly entered) and answered positively. After the confirmation of a number of his or her inquiries and requests, the inquirer can be requested to present a trial use report.

(e) Operation Method for Intra-office Software

A strict check is made for an inquiry at level (1). Any access is immediately checked as to whether or not the user is a regular member of the organization, and the access may be limited to some range of members according to his or her position, department, and name. An unqualified inquirer is rejected and answered with a warning message.

For a message or inquiry at level (2) or (3), an authorized user at level (1) is positively answered in most cases. The department and name of the user are confirmed and the user is allowed to access using his or her password for security.

(a)–(t) respectively explain the receiving procedures 9 and the answering procedures 11. Each of the procedures for various types of received commands is primarily specified by the vendor. Normally, the processes are automatically performed, but difficult problems may be determined by the vendor in an interactive edit mode. Though the receiving procedures and the answering procedures are explained separately below, they can be designed to be processed in series as unified receiving/answering procedures.

(a) Common Process in Receiving Procedures

The contents of the received message have been read in step S4 in the server program (SP) and stored. Using the stored data, the basic portions of the received message, that is, user identification information, vendor identification information, and software identification information, are compared with the records in the vendor management data in order to complement the information required in the following processes and to update the record in the vendor management data.

(b) Inform-RA/RB (Receiving Summary Inquiry)

User identification information and software identification information are referred to, and the communication text in a received message, if any, is interpreted so that the answering process specifies a ReplyInfo command.

(c) ReplyInfo-SA/SB (summary information returning Process)

The following information of specified object software (for specified version type) is extracted from the vendor management data and the software library to edit in the format of communications text.

- □ summary of functions, usages, effects of the software
- □ descriptions of applicable computer type, OS, environment, etc. for the software
- □ specification of distribution policy and contract method for the software
- □ request for user information required to select proper version type of the software (d) WantNew-RA/RB (Receiving New Purchase Request)

User information is interpreted and the vendor management data is referred to in order to determine the optimum version type for the user, and to specify a NewInstall command in the answer message. A Notice command can be returned as an exception. For example, if there are no available versions in a user environment, the Notice command is returned to explain the current state. If the user requests an old version, then the Notice command is returned to recommend a new version.

(e) NewInstall-SA/SB (New Supply Answer)

The latest version of the specified version type of the software is newly supplied. The information in the vendor management data and especially the information in the vendor's software library are copied to be edited as an answer message.

- ○ detailed vendor identification information
- □ password, etc. in user identification information (assigned separately in a secured method)
- ○ detailed software information
- □ specification of software application condition (applicable computer type, OS, environment, etc.)
- ○ installation instruction information of the software
- ○ software configuration information
- ○ body of the software
- □ document, manual, etc. of the software
- □ distribution rules for the software
- Δ standard user procedures (to be used by the client program) generated by vendor (procedures for installing, updating, and fault-reporting for the newly supplied software)

(f) WantRenew-RA/RB (Receiving New Service Request)

Whether or not a newly served software is provided is determined in a way similar to process of receiving a WantNew command. At this time, the treatment of the old software stored in the user computer is determined (by referring to the vendor management data). If a new service is not applicable a Notice command is returned as a response.

(g) Renew-SA/SB (Additional Supply Answer)

By extracting from the vendor management data and particularly the vendor software library, the following information is edited as an answer to provide the specified software (new service).

- Δ modified items in detailed vendor identification information
- Δ password for user identification information (only when modifications are made)
- ○ detailed information of the newly-served software (version type, number, etc.)
- □ specification of application condition of the newly-served software
- ○ installation instruction information of the newly-served software
- ○ configuration information of the newly-served software
- ○ body of the newly-served software
- □ document, manual, etc. of the newly-served software
- Δ distribution rules of the newly-served software
- □ instruction and request for treating the old version of the software
- □ instruction information of processing the old version of the software (h) CheckUpdate-RA/RB (Receiving Update Inquiry)

The detailed information in the user's current software version (version type, version number, configuration date, etc.) is compared with the information in the latest version of the vendor management data, and it is determined whether or not the software needs to be updated. At this time, if the user identification information in the received message (computer type, OS, environment, etc.) is found, changed from the record in the vendor management data (changed at a user site), or if the criterion of the version selection is changed by the vendor, then an appropriate version type should be selected.

In a normal update process (including a small-scale change to another version type), an Update command is specified as the answer. If no update has been made, then, a NoUpdate command is chosen as the answer message. If a large-scale change in version type or a change into a new service is recommended, a Notice command (not an Update command) is chosen as the answer message.

(i) Update-SA/SB (Update Information Answer)

The following information is edited as an answer to update from user's current software version to the specified version.

□ explanation of updating software (purpose of update, improved functions, newly solved problems, fixed bugs, etc.)

□ specification of application conditions of the updated software

○ detailed software identification information of the updated software (version type, number, etc.)

○ update instruction information of the updated software

○ configuration information of the updated software

○ body of the updated software (newly added and updated portions only)

□ document, manual, etc. of the updated software (updated portions)

□ instruction information of processing the old version of the software (deletion through replacement, reserving for a predetermined period, etc.)

(j) NoUpdate-SA/SB (Answering Without Update)

A NoUpdate command is specified in an answer message.

Δ software identification information at the latest update (version type, number, date)

(k) Notice-SA/SB (Note Answer)

The following messages are edited (for each case) according to the results of the receiving process.

descriptions and notes relating to purchase procedure and qualification restrictions information relating to term and renewal procedure for software descriptions and notes relating to software application restrictions information relating to counteraction against specific troubles of the software information of new services of the software (l) Warning-SA/SB (Warning Answer)

A Warning message is issued from the unqualified user process procedures in most cases, but can also be issued as a warning by answering procedure as an exception in an emergency.

For example;

if a user uses the object software in an undesirable environment and a serious fault is expected unless proper correction is made.

if a renewal procedure is recommended because the expiry is closing down.

if a serious fault is detected in the vendor software and restrictions of use should be placed on the user.

An answer message is generated depending on the above listed conditions.

(m) Install-Ack-RA/RB (Receiving Acknowledgement)

The acknowledgement is recorded in the software supply history of the user in the vendor management data. No answering process is performed.

(n) InstallTrouble-RA/RB (Receiving Installation Trouble Message)

The message is recorded in the software supply history of the user in the vendor management data, and is shown to the vendor's engineer in charge.

(o) Comment-RA/RB (Receiving Comment)

The message is recorded in the software supply history of the user in the vendor management data, and displayed in an interactive mode to ask the vendor for an appropriate processing. An Answer command is used in the answering process.

(p) Answer-RA/RB (Answering Process)

In response to a user's Comment command, an answer message is generated in an interactive mode by the vendor to answer various questions and complaints.

(q) BugReport-RA/RB (Receiving Fault Report)

The contents of the received message are recorded in the fault report history database and transmitted to the vendor. Specifically, if similar fault reports are not stored in the fault report history database and the fault is determined to be a new type, then a warning message is given to the vendor's is engineer in charge. Normally, a BugAck command is used in the answer message.

(r) BugAck-RA/RB (Fault Report Receipt Answer)

A regular message just indicating the receipt of a fault report is edited automatically.

(s) FinishUse-RA/RB (Receiving use Termination)

The message is recorded in the software supply history of the user in the vendor management data. Commercial and technical procedures are determined for the use termination of the specified software version. If the termination is appropriate, then a terminate-and-clear answering procedure is specified.

(t) Erase-SA/SB (Terminate-and-clear Answer)

Clear instruction information is edited by specifying the identification information for the specified software version. An expiry date of the use of the object software to be cleared may be specified at this time.

Described finally are practical examples of using the software distribution and maintenance system according to the second embodiment of the present invention. The present system aims at being used widely as a general-purpose system and allows to be implemented with sophisticated technologies at vendor computers and user computers. Explained below, however, is the second embodiment realized with rather simple well-known element technologies. It is noticed that the present invention is not limited by such element technologies.

(a) Simple Practical Embodiment of Configuration of Software and Generation of Update Information (1)

First, an object software S1 comprises one version type VT1 containing a plurality of modules Ma, Mb, Mc, (a1) Configuration and Management of Software in Vendor Computer In a vendor computer, the software library S1 of the software (for example, in a UNIX system) is stored under a single directory named, for example, directory S1.VT1. The source program of each of modules Ma, Mb, Mc, . . . is put as a single file in the directory. Each module is represented by a module name (Ma, Mb, etc.) followed by its version number (1, 2, . . . ) as a complete file name (for example, Ma.1, Mb.3, etc.). The version number of each module is incremented by 1 each time it is amended or updated.

The easiest method of managing the versions of a software library is to always store a single set of the latest modules. If a module or a set of modules) is updated, the version number of the software is incremented by 1. According to this method, the software version and the internal configuration of the modules are as follows, for example.

| Software Version | Module Configuration | | | | | |
|---|---|---|---|---|---|---|
| S1.VT1.1 | Ma.1 | Mb.1 | Mc.1 | Md.1 | | |
| S1.VT1.2 | Ma.2 | Mb.1 | Mc.2 | Md.1 | | |
| S1.VT1.3 | Ma.2 | Mb.2 | Mc.3 | Md.1 | Me.1 | |
| S1.VT1.4 | Ma.3 | Mb.2 | | Md.1 | Me.2 | Mf.1 |

In the vendor management data managed by the software vendor according to this method, the information of the software configuration is as follows, for example.

| | |
|---|---|
| list of provided object software: | S1 |
| software name: | S1 |
| list of version type names of software: | VT1 |
| list of version number of software: | 1, 2, 3, 4 |
| date of version configuration of software: | 931005, 931108, 931227, 940131 |
| location of software library: | home/S1 |
| Home directory of source program: | home/S1/VT1 |
| list of module configuration of source program of each version: | S1.VT1.1 = (Ma.1, Mb.1, Mc.1, Md.1),<br>S1.VT1.2 = (Ma.2, Mb.1, Mc.2, Md.1),<br>S1.VT1.3 = (Ma.2, Mb.2, Mc.3, Md.1, Me.1),<br>S1.VT1.4 = (Ma.3, Mb.2, Md.1, Me.2, Mf.1) |

To manage an object code program as well as a source code program of software, a source code module name is followed by .s (for example, Ma.1.s) as an extension, and an object code module name is followed by .o (for example, Ma.1.o). The associated, document of the software is divided into modules appropriately, and managed in versions such that a set of documents can be referred to corresponding to each version of the software.

(a2) Management of Software in User Computer

When the above described object software is provided for a user, the easiest method of managing the object software is to store and use the latest version of the object software in the user computer. In the user management data of each user, the information of the configuration of the object software can comprise as follows.

| | |
|---|---|
| If a user keeps version 1; | |
| a list of object software names and version names: | S1 (S1.VT1.1), software of other vendors, etc. |
| software name: | S1 |
| software version type name: | VT1 |
| software version number: | 1 |
| software version configuration date: | 931005 |
| software location directory: | home/S1 |
| source program location directory: | home/S1 |
| source program module configuration: | Ma.1, Mb.1, Mc.1, Md.1 |
| If a user keeps version 3; | |
| a list of object software names and version names: | S1 (S1.VT1.3), software of other vendors, etc. |
| software name: | S1 |
| software version type name: | VT1 |
| software version number: | 3 |
| software version configuration date: | 931227 |
| software location directory: | home/S1 |
| source program location directory: | home/S1 |
| source program module configuration: | Ma.2, Mb.2, Mc.3, Md.1, Me.1 |

The body of the object software is stored in modules just as specified in the above described user management data. As shown in this example; if source-code programs are provided, they are compiled in the user computer into object-code modules and are stored together. If only object-code modules are provided, then the object-code modules are managed in a way similar to the source-code programs in the above example.

(a3) Update Inquiry and Update Instruction

With-these settings, the automatic update of the software can be realized as follows.

The easiest method is to indicate the version number of the software assigned by the vendor when the client program of a user computer issues an update inquiry (in a CheckUpdate message). In the example above, the version name consists of the software name, version type name, and version number (for example, S1.VT1.1, S1.VT1.3, etc.). In this case, the update inquiry message is composed as follows (detailed user identification information is omitted here)

To: Vendor-S1@Vendor.co.jp

From: User1@chem.sci.tokyo-u.ac.jp

Subject: sdmp: CheckUpdate S1

Message:

Software: (Current-Version: S1.VT1.1)

Upon receipt of the message, the vendor's server program (SP) recognizes that the user's current version name (S1.VT1.1) is different from the vendor's latest version name (S1.VT1.4), and edits the information for update. To attain this, the information of module configuration of the versions stored in the vendor management data are used to obtain the differences.

```
        S1.VT1.4 = (Ma.3, Mb.1, Mc.1)
    (–) S1.VT1.1 = (Ma.1, Mb.1, Mc.1, Md.1),
------------------------------------------------------------
S1.VT1.4 ← S1.VT1.1 = delete (Ma.1, Mb.1, Me.1)
                      add (Ma.3, Mb.2, Me.2, Mf.1)
```

Only modules requiring additional data are transmitted to the user together with the difference information as update instruction information. In this example, an update command to be returned is written as follows.

To: User1chem.sci.tokyo-u.ac.jp

From: Vendor-S1@Vendor.co.jp Subject: SDMP: Update S1

Message:

Software: (Current-Version: S1.VT1.1)

Updated-Software:

(Description: "A bug was fixed and two new functions are added."

Version-Type: VT1, Version-Number; 4, Version-Name: S1.VT1.4

Version-Date: 940131

Modules: (Ma.3, Mb.2, Md.1, Me.2, Mf.1)

Update-Direction: (Delete: (Ma.1, Mb.1, Mc.1), Add: (Ma.3, Mb.2, Me.2, Mf.1))

Number-of-Files-Attached: 4)

Treatment-of-Old-Software: Delete

Files-Attached:

source program file of module Ma.3 source program file of module Mb.2 source program file of module Me.2 source program file of module Mf.1

Upon receipt of the update message, the user's client program interprets the message, and by referring to the user management data, it updates the object software, and then updates the user management data itself As a result of the update, the new user management data of the user becomes as follows.

| | |
|---|---|
| a list of object software names and version names: | S1 (S1.VT1.4), software of other vendors, etc. |
| software name: | S1 |
| software version type name: | VT1 |
| software version number: | 4 |
| software version configuration date: | 940131 |
| software location directory: | home/S1 |
| source program location directory: | home/S1 |
| source program module configuration: | Ma.3, Mb.2, Md.1, Me.2, Mf.1 |

According to the update instruction information in the received message, the client program by invoking the update receiving procedure updates the modules of the software using received module files. That is in the above example, three modules Ma.1, Mb.1, and Mc.1 are deleted from the current modules and newly added are four modules Ma.3, mb.2, Me.2, and Mf.1.

In this case, the old version of the software is not stored.

(a4) Update Inquiry and Update Instruction (Another Method)

The method of (a3) is based on the vendor's storage of the module configuration information for all the versions, and users only have to enter the current version names. An alternative method is to send from a user to the vendor the current module configuration information independently of the version name (or as a complement of version name information).

Corresponding to the example above, an update inquiry message from a user can be composed as follows (detailed information such as user identification information is omitted).

To: Vendor-S1@Vendor.co.jp

From: User1@chem.sci.tokyo-u.ac.jp

Subject: SDMP: CheckUpdate S1

Message:

Software: (Current-Version: S1.VT1.1)

Current-Modules: (Ma.1, Mb.1, Mc.1, Md.1)

Upon receipt of the message, the vendor's server program (SP) compares the set of the user's current modules with the latest version set of vendor's modules to obtain the differences.

```
latest version = (Ma.3, Mb.2, Md.1, Me.2, Mf.1)
(−) user's version = (Ma.1, Mb.1, Mc.1, Md.1)
------------------------------------------------------------
latest − user's = delete (Ma.1, Mb.1, Mc.1),
                  add (Ma,3, Mb.2, Me.2, Mf.1)
```

Subsequently, an update instruction message is generated and sent by the vendor, and on receiving the message the software is updated by the user by the same method as (a3).

(b) Simple Practical Embodiment of Configuration of Software and Generation of Update Information (2)

An example of a little more complicated configuration of software is considered next. Object software S2 has two version types VTa and VTb, and each version type has a plurality of modules and shares a part of them with each other. To properly maintain and manage the software library, the vendor stores all the old versions of modules as well as the latest versions.

(b1) Configuration and Management of Software in Vendor Computer

In the vendor computer, the software library SL of the software S2 can be stored in a single directory (for example, S2.VTab) for the two version types together. Each module is identified by a module name and a module version number (for example, Ma.1, Mb.3, etc.) as in (a).

Corresponding to the two version types, two series of versions are generated, and the software library is required to store the version names and the module configurations of respective version types in a time series as follows.

| date of | version type VTa | | version type VTb | |
|---|---|---|---|---|
| configu-ration | version name | module configuration | version name | module configuration |
| 931005 | S2.VTa.1 | Ma.1 Mc.1 | S2.VTb.1 | Mb.1 Mc.1 |
| 931108 | S2.VTa.2 | Ma.2 Mc.2 | S2.VTb.2 | Mb.1 Mc.2 |
| 931227 | S2.VTa.2 | Ma.2 Mc.2 | S2.VTb.3 | Mb.2 Mc.3 Me.1 |
| 940131 | S2.VTa.3 | Ma.3 Me.2 | S2.VTb.4 | Mb.2 Me.2 Mf.1 |

The software library also stores the old version of modules for maintenance (normally the software library packs the entire data to store only the original version of each module and the difference data. Therefore, the entire stored modules (in a restorable packed format) are the following 11 modules.

Ma.1, Ma.2, Ma.3, Mb.1, Mb.2, Mc.1, Mc.2, Mc.3, Me.1, Me.2, and Mf.1

Modules are used either exclusively in a specific version type or commonly among a plurality of version types.

In the vendor management data, the information about the software configuration can be stored as follows.

| | |
|---|---|
| a list of object software name: | S2 |
| software name: | S2 |
| list of software version type names: | VTa, VTb |
| list of software version numbers: | (VTa:) 1, 2, 3<br>(VTb:) 1, 2, 3, 4 |
| software version configuration date: | (VTa:) 931005, 931108, 940131<br>(VTb:) 931005, 931008, 931227, 940131 |
| location of software library: | home/S2 |
| source program location directory: | (VTa:) home/S2/VTab<br>(VTb:) home/S2/VTab |
| list of source program module configurations of each version: | (VTa:)<br>S2.VTa.1 = (Ma.1, Mc.1),<br>S2.VTa.2 = (Ma.2, Mc.2),<br>S2.VTa.3 = (Ma.3, Me.2),<br>(VTb:)<br>S2.VTb.1 = (Mb.1, Mc.1),<br>S2.VTb.2 = (Mb.1, Mc.2),<br>S2.VTb.3 = (Mb.2, Mc.3, Me.1)<br>S2.VTb.4 = (Mb.2, Me.2, Mf.1) |

(b2) Dependency on Applicable Environment and Selection of Version Type

In a set of software, a plurality of version types are required (or appropriate) in the following cases.

different software functions in the same applicable environment (various functions)

a number of new function added to the original software in the same applicable environment different capacities of main storage in the same applicable computer model, OS, and software environment different applicable software environment (for example, input/output interface software, database interface, runtime library, etc.) in the same applicable computer model, OS, etc.

different OS (for example, due to level up) in the same applicable computer model hardware-dependency due to different applicable computer model in the same OS different applicable computer model and OS The software vendor provides a plurality of version types to properly adopt the software to these differences and is requested to select and provide an appropriate version type depending on the situations of each user. To attain this, the vendor clearly describes and informs the users of the applicable range of each version type, incorporates selection logic in the vendor management data and the vendor procedures and obtains from the users enough information enough to select appropriate version types. For example, the following vendor management data are set for the two version types for (b1).

applicable computer model for software:

(VTa:) A100, F3, H20, S1000

(VTb:) A200, F3, F4, S1000, S1500 applicable OS for software:

(VTa:) OS-A.1.3, OS-F3.2, OS-S.3.1

(VTb:) OS-A.1.4, OS-F3.2, OS-F3.3, OS-S.3.3 types and conditions of applicable environment for software:

(VTa:) Graphics-1, Memory ≧4 MB (VTb:) Graphics-1 or Graphics-2, Memory ≧8 MB

The vendor procedure refers to these data to determine an applicable or an appropriate version type for each user.

(b3) Software Management in User Computer

Normally, users only have to store the latest version of an appropriate version type for their environment. The configuration information object software in the user management data is almost the same as that in (a2). For example:

| if a user stores version 2 of version type VTa; | |
|---|---|
| a list of object software names and version names: | S2 (S2.VTa.2), software of other vendors, etc. |
| software name: | S2 |
| software version type name: | VTa |
| software version number: | 2 |
| software version configuration date: | 931108 |
| software location directory: | home/S2 |
| source program location directory: | home/S2 |
| source program module configuration: | Ma.2, Mc.2 |
| applicable computer: | A100 |
| main storage capacity: | 10 MB |
| OS: | OS-A.1.3 |
| environment software: | Graphics-1 |

-continued

| If another user stores version 4 of version type VTb; | |
|---|---|
| a list of object software names and version names: | S2 (S2.VTb.4), software of other vendors, etc. |
| software name: | S2 |
| software version type name: | VTb |
| software version number: | 4 |
| software version configuration date: | 940131 |
| software location directory: | home/S2 |
| source program location directory: | home/S2 |
| source program module configuration: | Mb.2, Me.2, Mf.1 |
| applicable computer: | F4 |
| main storage capacity: | 20 MB |
| OS: | OS-F.3.3 |
| environment software: | Graphics-1 |

(b4) Update Inquiry and Update Instruction of Software

The client program (CP) of a user has to perform almost the same processes as (a3) in an update inquiry for the software. For example, for the above described user who stores the version S2.VTa.2, the update inquiry message is generated as follows. (The user environment information is omitted in (a3), but is added below.)

To: Vendor-S2@Vendor.co.jp

From: UserA@docs.sci.tit.ac.jp

Subject: SDMP: CheckUpdate S2

Message:

Software: (Current-Version: S2.VTa.2)

User: (User-Machine: A100, Main-Memory: 10 MB, OS: OS-A.1.3, Software-Environment: Graphics-1)

Upon receipt of the message, the server program (SP) of the vendor checks the environment of the user to confirm that an appropriate version type is used by the user. Then, it is determined whether or not the version maintained by the user is the latest version of the version type. If not, the difference between the modules is obtained as in (a3) or (a4). latest version of type VTa S2.VTa.3 =(Ma.3, Me.2;

```
latest version of type VTa S2.VTa.3 = (Ma.3, Me.2)
(−) user's current version S2.VTa.2 = (Ma.2, Mc.2)
------------------------------------------------------------
S2.VTa.3 ← S2.VTa.2 = delete (Ma.2, Mc.2)
                      add (Ma.3, Me.2)
```

The server program (SP) returns an Update command message, providing the user with the above described difference information sent as update instruction information together with the body of modules to be added. The user client program (CP) receives the answer message and updates the software S2. All these methods are the same as in (a3).

(b5) Update Beyond Version Type

In (b4), software is updated within the same version type. Described below is the method of updating software beyond the version type boundary in the same object software. There are cases in which the software is updated beyond version type. For example:

The vendor starts providing the software of a new version type though the user environment remains unchanged (adding functions, developing a level-up version, releasing restrictions, etc.).

Software environment of the user is appropriately improved to solve new problems by using a better version type of the vendor software, though the user computer model and the applicable OS remain unchanged.

A new higher-level 05 is introduced in the user computer to obtain a necessary software environment and use a level-up version of the object software, while the user's computer model remains unchanged.

The user has introduced a higher-level computer model and OS, and requests an improved version of the object software.

For example, suppose that the two above mentioned users refer to the same user who switches his or her environment from that of version S2.VTa.2 to that of a new version S2.VTb.4. That is, the user's environment is switched as follows. The changes in the computer model and OS enable the conventional version type VTa to be upgraded into another higher-level version type VTb.

| | |
|---|---|
| computer model: | A100 → F4 |
| main storage capacity: | 10 MB → 20 MB |
| OS: | OS-A. 1.3 → OS-F3.3 |
| environment software: | Graphics-1 → Graphics-1 |

With the change in the computer model and OS, the user expects an updated and higher-level version of the software. Thus, the user enters an update inquiry command in the client program (CP) to edit his or her user identification information with the interactive editing function, and sends the following update inquiry message.

To: Vendor-S2@Vendor.co.jp
From: UserA@docs.sci.tit.ac.jp
Subject: SDMP: CheckUpdate S2
Message:
Software; (Current-Version: S2.VTa.2)
User: (User-Machine: F4, Main-Memory: 20 MB,
OS: OS-F3.3, Environment-Software: Graphics-1)

Upon receipt of the message, the server program (SP) of the vendor checks the environment of the user to confirm that the user environment has been changed from that recorded in the vendor management data, and then updates the contents of the vendor management data. In the new user environment, it is confirmed that a higher-level version type VTb is applicable. The switching of the version type is automatically performed as follows (assuming that the switching of the version type does not demand extra payment).

The server program (SP) obtains the difference from the user's current version to the latest version of the new version type VTb.

```
latest version of type VTb S2.VTb.4 = (Mb.2, Me.2, Mf.1.)
(−) user's current version S2.VTa.2 = (Ma.2, Mc.2.)
-------------------------------------------------------------
S2.VTb.4 ← S2.VTa.2 = delete (Ma.2, Mc.2)
                      add (Mb.2, Me.2, Mf.1)
```

The update message in return is sent as follows.

To: UserA@docs.sci.tit.ac.jp
From: Vendor-S2@Vendor.co.jp
Subject: SDMP: Update S2
Message:
Software: (Current-Version: S2.VTa.2)
Updated-Software:
(Description: "Due to your environment change, Version S2.VTb.4 is now installed.
New features are . . . "
Version-Type: VTb, Version-Number: 4,
Version-Name: S2.VTb.4
Version-Date: 940131
Modules: (Mb.2, Me.2, Mf.1)
Update-Direction: (Delete: (Ma.2, Mc.2),
Add: (Mb.2, Me.2, Mf.1))
Number-of-Files-Attached: 3
Treatment-of-Old-Software: Keep for one month
Files-Attached:
source program file of module Me.2
source program file of module Me.2
source program file of module mf.1

Upon receipt of the update message, the user's client program interprets the message, refers to the user management data, updates the user management data, and then updates the object software to generate a new version S2.VTb.4. Since the change in the object software is significant, the old version of the software (version S2.VTa.2) is not deleted completely, but is allowed to keep and use for a back-up purpose for one month as indicated by the update message. As a result of the update, the user management data of the user reads as follows.

| | |
|---|---|
| a list of object software names and version names: | S2 (S2.VTb.4, S2.VTa.2), software of other vendors, etc. |
| (for version S2.VTb.4:) | |
| software name: | S2 |
| software version type name: | VTb |
| software version number: | 4 |
| software version configuration date: | 940131 |
| software location directory: | home/S2 |
| source program location directory: | home/S2 |
| source program module configuration: | Mb.2, Me.2, Mf.1 |
| computer model: | F4 |
| main storage capacity: | 20 MB |
| OS: | OS-F.3.3 |
| environment software: | Graphics-1 |
| (for version S2.VTa.2:) | |
| software name: | S2 |
| software version type name: | VTa |
| software version number: | 2 |
| software version configuration date: | 931108 |
| software location directory: | home/S2/old |
| source program location directory: | home/S2/old |
| source program module configuration: | Ma.2, Mc.2 |
| computer model: | A100 |
| main storage capacity: | 10 MB |
| OS: | OS-A.1.3 |
| environment software: | Graphics-1 |

(Note: With the old version, the new computer will not work as is. If the data are stored in the shared file server of the user computer and the original computer model A100 can be connected when necessary, then the old version software can still be useful.)

(b6) Update Beyond Version Type (2) Providing New Services

The process in (b5) above refers to the update beyond version type, but is automatically performed under the situation that the update process does not impose extra charge on the user. On the other hand, there are cases when the update beyond version type refers to an upgrade to a new service which requires the user to pay extra charge. In this case, the server program returns a Notice message to prompt the user for his or her decision. If the user requests the purchase of the new service, then the user sends a WantRenew message. In this case, the user and the vendor communicate messages and perform the necessary processes as follows.

As in (b5), the user sends the CheckUpdate message with the change in the computer model and OS. The server program recognizes that the version type required for the model and OS is a newly served version imposing an extra charge on the user. Thus, it returns the following Notice message.

To: UserA@docs.sci.tit.ac.jp

From: Vendor-S2@Vendor.co.jp

Subject: SDMP: Notice S2

Message:

Software: (Current-version: S2.VTa.2)

Notice: "Due to your environment change, a new-service version S2.VTb.4 is to be used. Please follow the renewing procedure described in the attached file, and issue a 'WantRenew' message."

Number-of-Files-Attached: 1

Files-Attached:

Upgrading the software from version S2.VTa to version S2.VTb (A document file describing new functions, applicable environment, purchase procedure, and WantRenew command)

Upon receipt of the Notice command, the client program first stores the command and displays the message to the user. The user reads the contents of the message and document files. After following the procedures of the payment for the purchase, the following WantRenew command is issued.

To: Vendor-S2@Vendor.co.jp

From: UserA@docs.sci.tit.ac.jp

Subject: SDMP: WantRenew S2

Message:

Software: (Version-type: VTb,
Current-Version: S2.VTa.2)

User: (User-Machine: F4, Main-Memory: 20 MB,

OS: OS-F3.3, Environment-Software: Graphics-1)

(c) Practical Example of Fault Report System

An example of an automatic fault report was explained as the first embodiment by referring to FIG. 7.

The following description complements the explanation.

When the object software terminates abnormally, the operating system (OS) normally detects the abnormal termination and find out the cause of the abnormal termination (that is, no "/bin/play" command to be executed is found) and the source of the cause ("ISISinfo").

The system should be set such that the client program can be automatically by the OS activated and the above information is automatically informed of when an abnormal termination occurs.

To trace back the executed instructions from the one which directly causes an abnormal termination. It is a function of a debugger in a programming language and to locate the source codes of the sequence of the instructions.

There are not many language systems which provide this function in a form available to other programs, but Lisp and tcl/tk are the examples of having such a function. The example is obtained using the tracing function of the tcl/tk language for the object software written in tcl/tk.

A fault report message is generated in the format of normal electronic mail and sent to the server program through the network.

As described above, the software distribution/maintenance system according to the second embodiment of the present invention is a generalizing extension of the software distribution/maintenance system according to the first embodiment of the present invention.

In the first embodiment, a single set of object software is to be distributed and maintained. Thus, a user who uses a number of sets of software provided by different software vendors needs to be served by separate and different software vendors needs to be served by separate and different software distribution/maintenance systems. For improving this situation on the user side, the software distribution/maintenance system according to the second embodiment of the present invention is built to handle a plurality of sets of object software in a unified way by overcoming the problems of variations.

For the purpose of improving this situation on the user side, the software distribution/maintenance system according to the second embodiment of the present invention is built to handle a plurality of sets of object software in a unified way. Thus, from the viewpoint of a user, it can be regarded as a one-user * many-(one-software-one-vendor) system. By combining the viewpoints of users and vendors, the system can be regarded as a many-user *many-(one-software-one-vendor) system.

In a wider viewpoint, this system certainly accepts the situation that one set of object software having a number of version types are developed and distributed by a number of vendors and are used on various types of platforms. Thus, the software distribution/maintenance system according to the second embodiment of the present invention forms a unified system of a many-user * many-software * many-vendor * many-platform type.

Since the networks of computers are already built and operated in global scales, it is naturally expected that the software distribution/maintenance system according to the second embodiment of the present invention can serve as a unified infrastructure system for the distribution and maintenance of software in the world-wide scale, if its protocol is internationally standardized. Thus the system and method according to the present invention are expected to have innovative effects on the systems and methods of software distribution and maintenance, in a similar way that the electronic mail system and method had innovative effects on the mailing systems and methods.

As described above, the software distribution/maintenance system according to the second embodiment of the present invention is a generalizing extension of the software distribution/maintenance system according to the first embodiment of the present invention. In the first embodiment, a single set of object software is to be distributed and maintained. Thus, a user who uses a number of sets of software provided by different software vendors needs to be served by separate and different software distribution/maintenance systems. For improving this situation on the user side, the software distribution/maintenance system according to the second embodiment of the present invention is built to handle a plurality of sets of object software in a unified way by overcoming the problems of variations.

The effects of the second embodiment of the present invention are summarized below briefly:

Concerning to one set of software distributed and maintained by a vendor for a large number of users, the effects of the second embodiment of the present invention include all the effects of the first embodiment of the present invention. That is, for maintaining the object software in a user computer, an update inquiry message is automatically sent by the client program to the vendor on the simple activation either by the user's command input, by the activation of the Object software, or by the instruction of user 's software such as a daemon program; as the answer to it, an update instruction message is automatically composed and returned by the vendor's server program to the user; and then, on receiving the answer, the client program automatically updates the object software. A fault report is also automatically sent to the vendor on the occasions of abnormal user/vendor procedures for specific handling of different types of messages.

Such standardized structure of the server/client programs has an important effect to standardize the protocols for the software distribution/maintenance. (This point may be compared to the standardized structure of the electronic mail program, which can handle messages with standardized header and arbitrary contents.) The second embodiment of the present invention thus can form a basis of such standardized protocols.

In concert with the growth of networks in the global scales, the software distribution and maintenance system according to the second embodiment of the present invention is expected to make a worldwide infrastructure system for software distribution/maintenance. The effect of such a system gives innovative impacts on software industries, user industries, and whole range of users, organization and individual.

According to the technique of the second embodiment, a method to resolve the problems 1 through 4 is proposed. However, a new problem arises in the second embodiment, which also existed implicitly in the first embodiment.

As shown in FIG. 8, a client program is expected to handle a number of object software systems of one or more users in the second embodiment. For the client program, for example, it is required to design to handle a plurality of pieces of object software for a plurality of users. Therefore, it is complicated. Especially, an interface to call the user process procedure (UP), and handling of parallel processing when a user requests a plurality of processes are difficult. The similar problem may arise in the server program SP.

The object of the third embodiment is to distribute software on a worldwide scale, or build a standardized technical framework suitable for a form of software distribution without making the designs of the client program CP and the server program SP complicated. That is, the present invention is intended to provide software distribution and maintenance system and method, which uses a plurality of and a variety of pieces of software as objects and can be utilized by a plurality of and a variety of software users linked on a worldwide scale over a communications network between computers, and comprises a capability to rapidly and properly acquire and use software created and updated by software vendor.

FIG. 18 is a block diagram showing a principle of the present invention. In this figure, 81 through 83 are user computers, 84 and 85 are vendor computers, and 86 is a general-purpose network for connecting the user computers and the vendor computers.

The user computers 81 is used by a user U1. The user computer 82 is used by users U2 and U3. The user computer 83 is used by a user 4. The vendor computers 84 and 85 are generally each used by one software vendor, and are respectively used by the vendors V1 and V2. Generally, one or more object software applications (software applications as objects for distribution and maintenance, which generally correspond to one or more users) are installed in the user computers. Management data for user UD and the first process program CP, for example, are installed for each object software application.

On the user computer 82, for example, object software applications S2.b and S1.c are installed for the user U2, management data for user and the client program CP are installed for each object software, and object software S2.a, the management data for user U2, and the client program CP are installed for the user U3. S1 and S2, for example, distinguish object software applications, and a, b, and c indicate their versions or (version types).

The first process program, the client progran (CP), for example, handles only one piece of object software for one user. It uses dedicated management data for users UD and user process procedures (UPs), to be described later, to distribute and maintain the object software. That is, it sends various messages such as a software purchase request made by a user to a vendor, an update inquiry, a fault report, etc., made by a user to a vendor and performs processes such as an update of user software etc. after receiving an answer message from the vendor. When sending and receiving messages, the client program executes these processes based on standardized protocols of the software distribution/maintenance system.

The management data for user UD, consisting of user identification information, vendor identification information, software management information, etc., is used when processes such as sending messages, updating user software, etc. are performed by the client program CP.

The vendor computers 84 and 85 are each utilized by one vendor. Inside the vendor computer 4, for example, software libraries SL (S1) and SL (S2) are installed, and corresponding management data for vendor VD and the second process program, the server program SP, for example are installed for each library. The software library SL (S1) generally consists of a plurality of versions (or version types) of the object software S1. For example, the software library SL (S3) in the vendor computer 85 consists of two versions (or version types) S3.a and S3.b of the object software S3.

The management data for vendor VD, consisting of information such as vendor identification information, user management information, software management information, etc., is utilized by, for example, the server program SP.

The server program SP handles only one object software library for one vendor, similar to the client program CP installed on the user computer, and performs distribution/maintenance of the object software using the dedicated management data for vendor VD and vendor process procedures (VP), to be described later.

A network 86 is a general-purpose network, which allows message communications between the client program CP installed on the user computer and the server program SP installed on the vendor computer. By standardizing protocols, messages of the software distribution/maintenance system can be sent/received between the user and the vendor. The network 86 may be connected all the time, or connected depending on need similar to an electronic mail connection to send and receive messages.

In FIG. 18, the user computer and the vendor computer are generally different to each other. Some of the computers are, however, used by a user serving as both a user and a vendor. Therefore, one computer may sometimes include both the client program CP and the server program SP. In this case, the client program CP and the server program SP behave in exactly the same manner as they behave individually.

As described above, the vendor manages a number of versions of one piece of software to provide them to a number of users. The user takes advantage of one version of each software and a number of types of software (provided by different vendors) at the same time. Thus, the present invention is based on the assumption that a number of versions and types of the object software are provided by a number of vendors and used by a number of users.

Further explanation on the principle of the present invention is given below, referring to the FIG. 18. The software distribution and maintenance system using a network that a number of users U1, U2, . . . using a number of types of object software S1, S2, . . . to be distributed, managed, and maintained, and a number of software vendors supplying the above object software manage the distribution and maintenance of the above object software over a computer network, comprising:

(a) one or more first process programs, CPs, installed in each of user computers 81 through 83, that manage object software groups S1, S2, . . . to be used by the users U1, U2, . . . individually for every object software and for every user using the object software;

(b) one or more second process programs SPs, installed in either of software vendor computers 84 or 85, that gives services to vendor software libraries SL (S1), SL (S2), . . . for each of the software libraries;

(c) a network 6 that connects the first process program CP installed in the user computer to the second process Oprogram SP installed in the vendor computer, based on standardized communications protocols;

(d) a capability that performs distribution and/or maintenance for the above object software by sending a message that requests to distribute and/or maintain the object software for one piece of object software via the network 86, according to instructions given by the users U1, U2, . . . or a user-defined program, receiving an answer message from the second process program SP, and depending on the contents of the answer message and settings made by the user U1, U2, . . . ; and (e) the second process program SP that has a capability to reference the software libraries SL(S1), SL(S2), . . . managed by the vendors V1, V2, . . . depending on the contents of a received message and settings made by the vendor V1, V2, . . . for the object software specified with the message when receiving the above message from an arbitrary first process program CP, to generate an answer message to request distribution and/or maintenance of the above object software, and to send the answer message to the first process program CP of the sender of the corresponding message.

Next, the software distribution and maintenance method according to the present invention is explained below.

In FIG. 18, the users U1, U2, . . . specify desired software (object software) and its vendors V1, V2, . . . and invoke an acquisition inquiry instruction, the first process program CP then sends a purchase inquiry message to the software vendors V1, V2, . . . .

The second process program SP, corresponding to the object software library installed on the software vendor side, receives this message, verifies a qualification of the user, automatically performs an appropriate process depending on settings of the management data for vendor VD, and returns an answer message to the user.

The first process program CP that sends the purchase inquiry message receives the answer and advises the user. If the software itself is returned, the first process program CP stores it according to instructions included in the answer message.

Then, the first process program CP references the management data for user UD, and performs required compilation and linking, etc. based on settings of that data so that the software can automatically be installed in a pre-specified area.

Additionally, the first process program CP makes an inquiry about whether or not an update or improvement is made for software currently used by the users U1, U2, . . . If the software is updated, the users U1, U2, . . . specify a desired software name to be updated and requested, and invoke the first process program CP. After the first process program CP references the management data for user UD to extract a configuration of the software Si.v that the user is currently using, it sends an automatic update inquiry message with the user identification information appended to the vendors V1, V2, . . . .

When a corresponding second process program SP receives this message, it verifies a qualification of the user according to the settings of the management data for vendor VD, and returns update information about the software. To a qualified user, a message of "no update" is returned as update information such as when the software is not updated. If the software is updated, messages of "an update method for a user side" and "the software itself for an update" are returned.

When the above reply is received, the first process program CP firstly stores, for example, the updated Osoftware, according to the settings of the management data for the user, replaces a previous version with the updated version according to update instructions received, etc. It performs compilation and linking if needed, to allow execution of the updated version. As an invocation method for an update inquiry, an invocation by a user, an automatic invocation when the user calls a software, an invocation at a specified time (for example, the start of every day, every week, every month, etc) is made by a demon program.

If software installed on the user computer managed by the first process program CP abnormally terminates while running, the first process program detects a cause and a state of the fault and automatically sends a fault report to the vendor V1, V2, . . . .

A corresponding second process program SP registers this and reports it to a developer. In addition, it returns a message acknowledging a receipt of the message to the user.

After software bugs are manually fixed by the developer, the software is registered in an object software library of the vendor. After that, the update version is provided to the user as the latest version.

Further explanation on the software distribution and maintenance method implemented with the present invention is given below with reference to the FIG. 18.

The above software distribution and maintenance system performs the following processes:

(a) Each user U1, U2, . . . invokes a first process program CP corresponding to one piece of object software by entering a command on the user computer U1, U2, . . . or by invoking a command from a user-specified program;

(b) the first process program CP sends a message to request distribution and/or maintenance of the object software to a corresponding second process program Sp via a network 86;

(c) the second process program SP receives the message from the above first process program CP on the vendor computer for the above object software;

(d) references the software library managed by the vendor V1, V2 based on the contents of the received message and the settings of the object software specified by the message, generates an answer message to request distribution and maintenance of the above object 0software, and returns the above answer message to the first process program CP of the user that sent the corresponding message via the network 86.

(e) The first process program CP receives an answer message from the above second process program SP on the user computer U1, U2, . . . in the sender side of the above message, and performs the distribution and/or maintenance processes for the above object software based on the contents of the reply and settings of the user U1, U2, . . . .

As described above, the present invention installs the first process program, for example, the client program, on the user computer for every object software and for every user. The invention also installs the second process program, for example, the server program SP, for every software library on the vendor computer. By executing a message transfer between the client program CP and the server program SP based on standardized protocols, a standardized software distribution and maintenance system and method can be implemented on a very large scale, for example, on a worldwide scale though the method is primarily proposed for each software.

Description of the Preferred Embodiments (1) System Structure and the Network

FIG. 19 is a block diagram showing an embodiment of the software distribution and maintenance system that takes advantage of a communications network implemented with the present invention. In this figure, a user computer 91, a vendor computer 93, and a user/vendor computer 94 are connected over a network 92. Compared with FIG. 18, that shows a principle of the present invention, there is a basic difference in FIG. 19 that the user/vendor computer 94 is used by a user serving both as a user computer and a vendor computer for software. The user/vendor computer 94 is equipped with a client program CP for the software to be used as a user, and a server program SP for a software library SL (S3) to be provided as a vendor.

Further compared with FIG. 18, there is another difference in FIG. 19 that a user process procedure group (UP) corresponding to each client program CP, and a server process procedure group (VP) corresponding to a server program (SP) are added. Details of these groups are described later.

The present invention comprises a capability to send and receive messages between the client program CP installed in the user computer and the server program SP installed in the vendor computer. Detailed explanation of the above capability is given below:

This invention is based on the assumption that message communications can be performed between the client program (CP) of a certain ,user managing one piece of object software, and the server program (SP), managing a corresponding software library of the vendor supplying the object software. Such communications capability is one of basic capabilities of a network.

A specific name can be used for a process that performs a group of operations on each computer (the above CP and SP can be in a form of processes) under an operating system (OS). With this technique implemented (on a user computer, for example), a specific process name can be created for each client program (CP), which should be composed of the combination of a client program name of the system of the present invention, the user name, and the object software name.

Meantime, a network system (the internet system, for example), recognizes a process on each computer, and generally provides transmission from each process to outside, and reception from outside computers to each process. If a network address of an other computer connected to the network is given, a message can be sent to that computer.

Accordingly, by specifying a network address computer and a name of process in the receiver side, and by representing a message based on an appropriate network communications protocol, a message can be sent from a process installed in one computer (a client program, for example) to a process installed in another computer (a server program, for example) by taking advantage of the capabilities of the operating system (OS) and the network system. Thus, peer-to-peer communication can be implemented between the client program and the server program.

Of course, a main process that handles communications made by a plurality of client programs (CP) on each computer can be set. In this case, the main process handles message transmission and reception processes in parallel. Processing of distribution and parallel processing are required in this case. A destination address of the communication message is represented by the network address of the partner computer and the main process is represented as a partner process.

However, a message processing (especially, a parallel processing and a distribution processing) performed in the main process, is similar to a basic processing performed in a communications network. Thus, it is not a matter whether such processing is performed in the main process or in the general-purpose network. (Furthermore, it is an intention of the present invention to let the general-purpose operating system (OS) and the network system perform such processings as described above, instead of the main process that explicitly performs them.)

As described above, when process groups exist in each computer, communications between peer to peer can be performed as well as communications between group to group by use of established techniques.

According to the object of the present invention, a communications method implemented with the present invention is simply expressed as a method of "communications between processes over a general-purpose network", which may be either in peer to peer or in group to group performed in a ratio of 1 to 1 and a ratio of group to group.

(2) A Function of the System of the Third Embodiment

This function is similar to that of second embodiment and its explanation is abbreviated.

(3) Kind and Structure of Messages

The kind and function of the messages and the command set used in the third embodiment are similar to those of the second embodiment, and the explanation is also abbreviated. The structure and syntacs of the messages in the third embodiment are described below.

(3.1) Structure of 'Upward Messages' (from Users to Vendors)

The 'upward messages' from users to vendors have the following structure:

| | |
|---|---|
| (header part) | |
| receiver: | vendor's name and network address |
| sender: | user's name and network address |
| command line: | SDM system name, SDM command name, and name of the target software |
| in reply to: | reference to the vendor's prior message (exceptional) |
| (attributes part) | |
| user information: | information to qualify the user for the access |
| vendor information: | information of the current version of the target software |

-continued

| | |
|---|---|
| environment information: | information of user's hardware/software environments |
| (instruction part) | |
| instruction: | specifying information of the inquiry/request. optional and dependent on the command |

(3.2) Structure of 'Downward Messages' (from Vendors to Users)

The 'downward messages' from vendors to users have the following structure:

| | |
|---|---|
| (header part) | |
| receiver: | user's name and network address |
| sender: | vendor's name and network address |
| command line: | SDM system name, SDM conmand name, and name of the target software |
| in reply to: | reference to the user's inquiry/request message |
| (attributes part) | |
| user information: | information to confirm the user |
| vendor information: | (detailed) information about the vendor |
| software information: | information of the new/updated version of the target software |
| environment information: | requirements of user's hardware/software environments |
| (instruction part) | |
| instruction: | details of the reply for distribution/maintenance and instruction to users, especially the instructions of installation or updating optional depending on the command type. |
| (module part) | |
| module: | the body of new/updated modules to be deliverd |

(3.3) Syntacs of the Messages

The syntacs of the upward and downward messages is described here in the human readable textual form. Actual coding of messages on the network may depend on the network system.

The specifications of the receiver, the sender, and the command line in the header part of the message are always necessary. They are written line by line in the form of keyword-and-value (or value list) pairs using a delimiter such as a colon in between.

The attributes part is similarly written with lines of a keyword-and-value pair. In case the specification of the value is complex, the complex value may be written by a group of keyword-and-value lines enclosed in parentheses. In a manner similar to programming languages, we may define various delimiters: such as parentheses and semicolons for explicitly define a list of values (these may be replaced by spaces in an implicit but clear case of a list of values), a CR for a line break, a '/'mark (or Yen mark in Japanese) for line continuation, etc. Thus, it may be described in the following manner:

```
keyword 1:   value 1
keyword 2:   (    keyword 21: value 21)
                  keyword 22:(value 221; value 222; value 223)
                  keyword 23: value 23)
```

As the topmost keywords of the attributes part, we choose the four keywords of 'user', 'vendor', 'software', and 'environments'.

The instruction part may also be written in the form of keyword-and-value lines. For example, the instructions to add modules and to delete modules are written in this form. The keywords to be used in the instruction part may depend on the command of the message.

The module part may also be written (within a textual representation) in the form of 'module: (the body of a module)'.

One advantage in specifying the messages in the form of the keyword-and-value pairs is that the specified information may be stored in its original form (or after re-assigning the keyword) in the user management data (UD) or in the vendor management data (VD). Once the system of keywords is clearly defined in their names and semantics, the information stored in the form of keyword-and value pairs can readily be searched, updated, and analyzed.

(3.4) Hierarchical Structure of Keywords

As described above, the messages are described in a hierarchical scheme of keyword-and-value pairs. A hierarchical system of keywords is chosen in the following way:

| | |
|---|---|
| (header part) | receiver<br>sender<br>command line<br>in reply to |
| (attributes part) | |
| (user information) | |
| user: | name<br>organization<br>address<br>network address<br>status<br>id & password |
| (vendor information) | |
| vendor: | name<br>organization<br>address<br>network address<br>status<br>id & password |
| (software information) | |
| software: | name<br>version type<br>current version<br>configuration<br>form<br>description |
| (environment information) | |
| environments: | |
| hardware: | machine<br>memory |
| software: | OS |
| directory path | |
| (instruction part) | |
| instruciton: | payment<br>wanted<br>old version treatment<br>delete<br>add |
| (module part) | |
| module | |

(4) Process Performed on a User Computer

Figure 23:
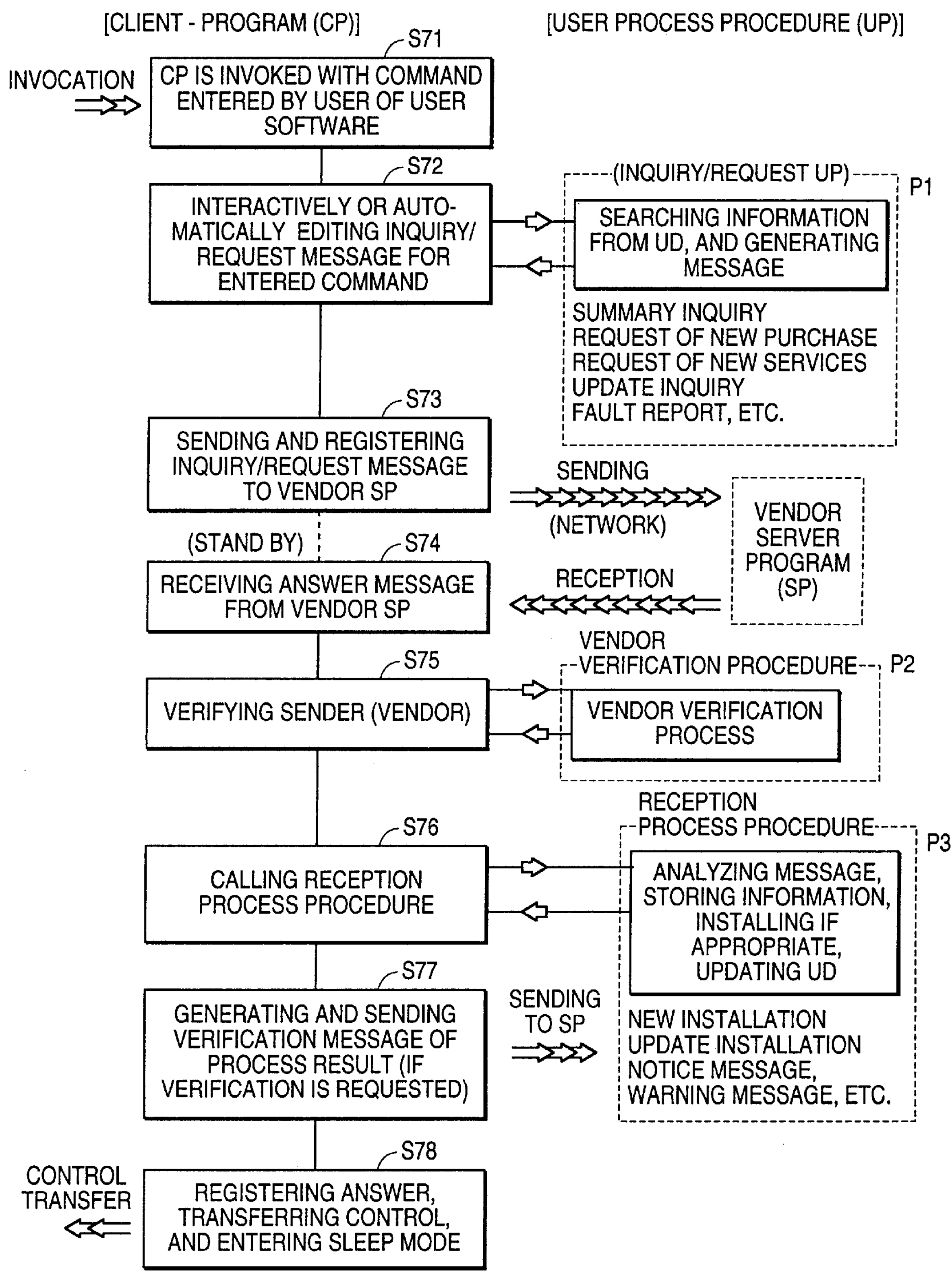
FIG. 23 shows a flowchart of an entire process performed by a client program CP according to the third embodiment.

A client program (CP) is installed on a user computer to manage an acquisition and update of one piece of object software by one user. This program edits an upward message and sends the edited message via a network when operations such as a request for a new acquisition or an update inquiry, etc. are performed by a user. It receives a reply from a server program (SP) to perform installation, etc. An entire flowchart of the process is shown in FIG. 23, and each step of the process flow is described below.

Step S71:

A client program (CP) is invoked when a command is entered by a user or by user software (a demon program, etc.), or when a command is entered at an invocation of the object software.

Step S72:

The client program calls a user process procedure to interactively or automatically edit an inquiry/request message when the command is entered. Within the user process procedure, a message is generated by referencing and searching management data for user (UD). Message types are a summary inquiry, a request to newly acquire new software, a request to receive a new service, an update inquiry, a fault report, etc.

Step 573:

The client program registers a message and sends it to a corresponding server program of a vendor via a network, and waits for a reply message. To keep confidentiality for communications, a portion or a whole of the message is sometimes encrypted before being sent.

Step S74:

The client program receives a reply message from the server program (S) of the vendor via the network.

Step 575:

The client program calls the user process procedure for a reply message (UP) P3, and verifies that the reply message is sent from the legal vendor using management data for user (UD). When a portion or a whole of the received message is encrypted, the program decrypts it using an appropriate key to prove that both the user and the vendor are legal.

Step S76:

The client program calls a user process procedure for a reply message reception when receiving the message command. Reception messages are summary information, new supply information, addition information, an update, a non-update, a notice, a warning, a reception of fault report, a comment answer, etc. The user process procedure (UP) analyzes the received message and stores its contents. When determined to be appropriate, installation is performed according to instructions being sent by the vendor to perform processes such as an update of management data for user (UD). These processes reference and update management data for user (UD) and object software.

Step S77:

When an automatic report of a result of a received message process is desired (in case of a new supply, an additional supply, and an updated message), a result of a process performed in Step S76 is monitored. An installation verification message or an installation error message is respectively returned to the server program (SP) of the vendor if the process is properly executed, or if a problem arises. Step S78:

The client program registers the reception of the reply message and a result of the process, returns a control to the process that calls the client program (CF). Then, the program is terminated (enters into an idle state).

The process of the client program (CP) described above basically conforms to those of the first and the second earlier applications. There are, however, the following differences in particular. The difference from the first earlier application is that the client program (CP) calls the user process procedures (UP) (by adopting the method of the second earlier application), to make it clear that the management data for user (UD) is used. While the difference from the second earlier application is that no sorting or parallel processings are required for a plurality of users and a plurality of types of object software management since the client program (CP) manages one piece of object software for one user, which allows simplification of the processes when receiving an answer message or when entering a command (likewise the first earlier application).

(Note that the parallel and sorting processing can be more generally performed as capabilities of an operating system (OS) and a network due to the existence of a plurality of client programs (CPs). Therefore, it may not be processed within the software distribution and maintenance system of the present invention, and the above simplification can be implemented.)

(5) Process Performed in a Vendor Computer

A server program (SP) is installed on a vendor computer to distribute and maintain object software of each vendor. Inquiry/request messages such as a request for a new software purchase, an update inquiry, etc., are sent from a number of client programs of users over a network. The server program (SP) receives these messages, generates an answer message for services such as a new software supply, update information, etc., and returns them in response to the request made by the client program over the network.

An entire flow of the message process performed by the server program (SP) of the vendor is shown in FIG. 24. Each step in the figure is described below:

Step S81: A server program (SP) installed in a vendor computer is always invoked to wait for receiving various messages of inquiry/request sent by a client program (CP) over a network.

S82: The server program receives a message from a client program (C?) over the network. (Normally, a sub-process is created to process a message performed in steps S83 through S87. The main process of the client program reenters a standby state. There is no distinguishing between the main process and the sub-process for simplicity.)

Step 383: The server program extracts a user name and user information from the messages, and calls a vendor process procedure (VP) for user qualification verification P11. With the user qualification verification VP, user information is verified to determine whether or not the user is qualified to perform an access with this command, using management data for vendor (VD).

Step S84: For an unqualified user, the server program calls an unqualified user process procedure (VP) P12, and generates an appropriate answer message such as a refusal, warning, information about acquiring qualification, etc. After that, the processing goes to Step S86.

Step S85: For a qualified user, the server program calls a vendor process procedure for a reception/answer process (VP)P13 corresponding to a command included in a received message, and generates an answer message to the user. The answer message is created according to the protocols of the software distribution and maintenance system.

The vendor process procedure (VP) analyzes the received message, extracts information from the vendor management data and the object software library to be provided, and generates a message. Additionally, it stores the provided contents, etc. in the user information included in the vendor management data (VD). There are such answer message types as a summary information supply, a new software supply, a new service supply, a message of update information, a message of no update, a comment answer, etc. There are additional message types such as a Notice message, warning message, etc. as exceptions.

(6) Usage

Basic usage and operation methods of the third embodiment of the present invention are similar to those of the second embodiment; thus the explanation of them is abbreviated. The following way of using the persent invention is new and suitable to the third embodiment of the present invention.

Bootstrapping of the Client Program

So far in our description of the embodiments of the present invention, we assume that users already own the software components (i.e., a client program (CP), user procedures (UPs), etc.) of the present software distribution and maintenance system when they want to get a new target software system. Some standard client program (CP) and user procedures (UPs), which we propose in our second embodiment of the present invention, may be obtained earlier in some conventional way such as with a portable media or with ftp. However, for making the software distribution and maintenance system in the present invention better fit to each target software, the CP and UPs should better be designed for the target software by the vendor and be supplied to the users 'beforehand'. This is particularly intended and desirable in our third embodiments of the present invention.

This problem is readily solved. By the use of the present invention, users can obtain from vendors, with minimal preparation and burden, a new target software system and a set of CP and UPs which best fits for the distribution and maintenance of the target software, in the following steps:

Step 1: A user has to prepare a minimal set of CP and UPs which has the function of sending an Inform message for summary information inquiry and of processing the ReplyInfo message to be received in reply. We may assume that this minimal set of CP and UPs is provided in public as a standard tool and is easily obtainable in any traditional way of software distribution.

Step 2: By use of the minimal set of CP and UPs, the user now sends an Inform message for obtaining summary information of any target software he wants.

The vendor sends back a ReplyInfo message which contains the summary information of the target software and a basic set of the present software distribution and maintenance system sufficient for newly requesting the target software. The basic set may include: a basic CP, user procedures(UPs) for sending a WantNew message and receiving its reply, and user management data(UD) useful for composing the WantNew message.

Step 3: By means of the basic set of software distribution and maintenance system supplied above, the user may send a WantNew message to the vendor to request the target software.

In response, when the vendor returns a NewInstall message for newly supplying the target software, the vendor provides the user with a full set of the present software distribution and maintenance system which is built best fit to the target software. The full set may contain the whole of the client program (CP), a full set of user procedures (UPs), and instructions to install these CP and UPs.

Step 4: Now the user can use the full set of the user's components of the software distribution and maintenance of the present invention; by using it, he can easily update and renew the obtained target software in the manner described so far. The method described here may be used further for the vendor of the target software to maintain the software distribution and maintenance system itself at the user's site.

This example of embodiment clearly shows that the software distribution and maintenance system suitable for the target software can be composed on users' computers without any burden of users and that the distribution and maintenance of various target software can be achieved readily by use of the present invention.

One problem of the second embodiment of the present invention is the complexity in constructing the standard client program (CP) which invokes different sets of user procedures(UPs) for handling a variety of object software systems. The interface between the CP and UPs needs careful design and can not be flexible. A solution to this problem has guided us to the third embodiment of the present invention as described above. The solution compromises the ideas of the first and second embodiments and takes advantages of them both. The third embodiment of the present invention adopts the simplicity of the first embodiment by limiting to handle only one target software system, while it adopts the whole ideas of the second embodiment to overcome the variation problems; they include clear separation among the client program (CP), user procedures (UPs), user management data (UD), and target software and the standardization of the message protocols.

Effects of the Third Embodiment

The effects of the third embodiment of the present invention are summarized here briefly:

The choice that the client program (CP) handles a single target software for a single user has released the CP's burden of complexity in the multitask processing of possibly many target software systems and many users. This makes the CP simple to handle one inquiry/request from the user at one time.

The same choice has reduced more significantly the CP's burden of complexity in adapting to the variation in target software and in user. The CP is constraint by the standard message protocols to communicate with the server program SP, but has full flexibility inside. Namely, the CP invokes its own user procedures (UPs) and the UPs access to the user management data (UD) and the target software. Thus, whole set of these CP, UPs, UD, and target software can be designed in a set according to the principles of the present invention; interfaces among them may be chosen flexibly and appropriately for each target software, without being constraint of the choices for other target software.

This has simplified the design of the CP, Ups, and UD, and has made the present invention much feasible and practical for wide variety of target software.

The proposal of message protocols for software distribution and maintenance in the third embodiment of the present invention is also an important step towards establishing such a standard. The message types used in the second embodiment of the present invention are used and the syntacs of the messages are made clearer by the definition of a hierarchy of keywords to be used in the keyword-and-value presentations of information. Such a definition of protocols needs to be examined further in the practice.

As described so far, the choice of single target software in the third embodiment does not mean to set back the software distribution and maintenance method in the present invention to be useful only for the specified target software. Rather, the choice makes the present invention widely applicable to any software system as its target of service. The client/server systems according to the third embodiment of the present invention may be constructed and used by various vendors to serve their users. Since the methods for users to use them are standardized as described in the present invention, users can use such software distribution and maintenance systems as if they were a standardized tool without noticing the differences inside them.

Just as described as the effects of the first and second embodiments of the present invention, the effects of the third embodiment of the present invention are expected to be innovative in the distribution and maintenance of software. Once vendors develop and update the software for service on vendors' computers, huge number of user in the global scales can obtain and use the new and corrected versions of software almost immediately on users' computers without burdens of labor and skills in obtaining and installing them. The software distribution and maintenance systems of the present invention take care of the automatic or semi-automatic communication between the users' and vendors' computers through the networks. The users may not notice the users' software systems are corrected automatically in this manner of network service. The rapid growth of the network in the global scale will nake the services of software distribution and maintenance according to the present invention useful and indispensable in the global scale.

What is claimed is:

1. A software distribution/maintenance system having a plurality of user computers and a vendor computer connected to the user computers via a network to manage and automatically update over the network a set of object software sent and stored in the user computers from the vendor computer via the network, comprising:

an object software library in the vendor computers;

first process means in the user computers for sending an inquiry with current configuration information of the object software stored in the user computers to the vendor computer via the network to inquire about a latest configuration, for receiving an answer from the vendor computer, and for updating the object software stored in the user computers according to an instruction in the answer; and second process means in the vendor computer for receiving the inquiry from said first process means in the user computers, for generating update instruction information for the object software to match the current configuration of the object software in the user computers with the latest configuration of an updated version in said object software library stored in the vendor computer, and for returning via the network to said first process means the answer with the update instruction information and the updated version of the object software.

2. The software distribution/maintenance system according to claim 1, wherein said first process means in the user computers automatically informs via the network the vendor computer of an abnormal termination and state if an operation of the object software abnormally terminates in the user computers.

3. The software distribution/maintenance system according to claim 2, wherein said first process means automatically informs the vendor computer of the abnormal termination, an instruction causing the abnormal termination, a reason for the abnormal termination, a series of instructions which invoked the instruction causing the abnormal termination, and an environment of software and hardware used when the abnormal termination is detected.

4. The software distribution/maintenance system according to claim 2 or claim 3, wherein said first process means can automatically inform, via the networks the vendor computer of the abnormal termination by general-purpose electronic mail.

5. A software distribution/maintenance method for managing and automatically updating a set of object software stored in user computers from a vendor computer via a network, comprising:

sending, by a first process in the user computers, current configuration information of the object software to a second process in the vendor computer via the network with an inquiry for a latest configuration of the object software;

receiving by said second process in the vendor computer the inquiry from said first process;

generating update instruction information for the object software to update a configuration of the object software in the user computers with the latest configuration of an updated version of the object software in an object software library stored in the vendor computers;

returning via the network to said first process an answer with the update instruction information and the updated version of the object software; and processing by said first process stored in the user computers the answer from said second process to update the object software according to the update instruction information in the answer, including preparing for compiling and linking of programs if necessary.

6. The software distribution/maintenance method according to claim 5, wherein when the object software is activated in the user computers, said first process immediately sends the current configuration information of the object software to said second process in the vendor computer via the network to inquire about the latest configuration, receives the answer from said second process, updates the object software according to the update instruction information in the answer, and prepares for compiling and linking programs if necessary.

7. The software distribution/maintenance method according to claim 5, wherein when said first process is activated in the user computers at a predetermined time, said first process sends the current configuration information of the object software to said second process in the vendor computer via the network to inquire about the latest configuration, receives the answer from said second process, updates the object software according to the update instruction information in the answer, and prepares for compiling and linking of programs if necessary to realize an automatic update of the object software.

8. The software distribution/maintenance method according to claim 5, wherein when a user instructs the user computers to activate said first process, said first process sends the current configuration information of the object software to said second process in the vendor computer via the network to inquire about the latest configuration, receives the answer from said second process, updates the object software according to the update instruction information in the answer, and prepares for compiling and linking of programs if necessary.

9. The software distribution/maintenance method according to claim 5, wherein following processes are interchangeably performed:

when the object software is activated in the user computers, said first process immediately sends the current configuration information of the object software to said second process in the vendor computer via the network to inquire about the latest configurations, receives the answer from said second process, updates the object software according to the update instruction information in the answer, and prepares for compiling and linking programs if necessary;

when said first process is activated in the user computers at a predetermined time, said first process sends the current configuration information of the object software to said second process in the vendor computer via the network to inquire about the latest configuration, receives the answer from said second process, updates the object software according to the update instruction information in the answer, and prepares for compiling and linking of programs if necessary to realize an automatic update of the object software; and when a user instructs the user computers to activate said first process, said first process sends the current configuration information of the object software to said second process in the vendor computer via the network to inquire about the latest configuration, receives the answer from said second process, updates the object software according to the update instruction information in the answer, and prepares for compiling and linking of programs if necessary.

10. A software distribution/maintenance system for managing distribution of object software via a network by users who use one or more sets of the object software to be distributed, managed, and maintained and by software vendors who supply the users with the object software, comprising:

first process means for managing plural sets of the object software in each user computer;

vendor software libraries in at least one vendor computer;

second process means for providing services relating to said vendor software libraries in the at least one vendor computer; and a network for connecting each user computer and the at least one vendor computer, said first process means sending via the network an object software distribution/maintenance request message according to an instruction of the users or an instruction of a user-written program to said second process means of the at least one vendor computer containing desired object software, receiving an answer message from the second process means, and distributing or maintaining the object software; and said second process means receiving the message from said first process means, referring to said vendor software libraries managed by the software vendors according to the message and settings made by the software vendors, generating an answer message in response to the object software distribution/maintenance request message, and sending the answer message to said first process means of a message sender.

11. The software distribution/maintenance system according to claim 10, wherein when any object software managed by said first process means in the user computer abnormally terminates during its operation, said first process means detects and analyzes an abnormal condition, and then automatically sends a fault report to said second process means of the vendors over the network; and said second process means of the vendors receives the fault report and informs the vendors of the fault report.

12. The software distribution/maintenance system according to claim 10 or claim 11, wherein when each version of the object software is provided for a number of the users by the vendors, a single computer user can be a user of a version of one piece of software and also a vendor of a version of another piece of software, and furthermore, a single computer can be provided with one or more first process means and one or more second process means.

13. The software distribution/maintenance system according to claim 10, claim 11, or claim 12, wherein each user computer can be designed to store user management data for each of the users or each user group, and the data can be set for each object software; and said first process means refers to the user management data to manage one or more sets of the object software.

14. The software distribution/maintenance system according to claim 13, wherein said user management data includes at least one of user identification information of each user or each user group, software management information of each object software used by each user, software configuration information, and message process method specification information.

15. The software distribution/maintenance system according to claim 14, wherein in specifying a method of processing a message according to the user management data, the users can specify a process method as a procedure for each function performed by said first process means.

16. The software distribution/maintenance system according to claim 15, wherein in specifying a method of processing a message according to the user management data., a vendor confirmation procedure can be used so that the vendor can be conformed to protect user software.

17. The software distribution/maintenance system according to claim 10, claim 11, or claim 12, wherein when said second process means of the at least one vendor computer offers services using said vendor software libraries, said second process means can refer to vendor management data stored for each vendor software library.

18. The software distribution/maintenance system according to claim 17, wherein said vendor management data includes at least one of vendor identification information, software management information, software configuration information, message process method specification information, customer information, and fault history information.

19. The software distribution/maintenance system according to claim 18, wherein when a message process method is specified using the vendor management data, the software vendors can specify a procedure for each function performed by said second process means.

20. The software distribution/maintenance system according to claim 19, wherein a user confirmation procedure can be selected when a message process method is specified using the vendor management data.

21. The software distribution/maintenance systems according to claim 10 or claim 11, wherein Each of the users can simultaneously obtain and use a plurality of versions of each object software.

22. A software distribution/maintenance method for managing distribution of object software via a network by users who use one or more sets of object software to be distributed, managed, and maintained and by software vendors who supply the users with the object software using, in user computers, the object software to be used by the users and a first process for managing one or more sets of object software; in each vendor computer, vendor software libraries and a second process for providing services relating to the vendor software libraries; and the network connecting each user computer to at least one vendor computer, comprising:

activating by a sending user the first process through a command input by the sending user in one of the user computers or through a command from a user program;

sending by the sending user from the first process in the one of the user computers via the network, an object software distribution/maintenance request message to the second process of the at least one vendor computer from which the object software is provided;

receiving by the second process in the at least one vendor computer, from which the object software is provided, the object software distribution/maintenance request message from the first process;

referring by the second process to the vendor software libraries managed by the software vendors according to the object software distribution/maintenance request message and settings made by the software vendors;

generating an answer message in response to the object software distribution/maintenance request message;

sending the answer message to the first process of the sending user;

receiving by the first process in the one of the user computers of the sending user the answer message from the second process; and performing processes for distributing or maintaining the object software according to the answer message and settings made by the users.

23. The software distribution maintenance method according to claim 22, wherein when executing object software managed by the first process in one of the user computers abnormally terminates during operation, the first process detects and analyzes an abnormal condition, and then sends a fault report message to a vendor of the executing object software via the network, and wherein the second process receives the fault report message via the network, and informs the vendor of the abnormal condition.

24. The software distribution/maintenance method according to claim 22 or claim 23, wherein each user computer stores user management data for each of the users or each user group, identifying one or more sets of the object software; and said first process refers to the user management data to manage the one or more sets of the object software.

25. The software distribution/maintenance method according to claim 24, wherein the user management data includes at least user identification information of at least one of the users, software management information of each object software used by each user in an object software group, software configuration information, and message process method specification information; and said first process refers to the user management data.

26. The software distribution/maintenance method according to claim 25, wherein in referring to a method of processing a message according to the user management data, the sending user can specify and use a process method as a procedure for each function performed by the first process.

27. The software distribution/maintenance method according to claim 26, wherein in referring to the method of processing the message according to the user management data, a user-defined vendor confirmation procedure is used so that the message received by the first process can be recognized as a correct message from a predetermined vender.

28. The software distribution/maintenance method according to claim 25, wherein when the sending user activates the first process in one of the user computers by inputting a command, the first process obtains a user name, a command name, and an object software name to generate an interactive screen displaying messages according to the command, promotes generation of a message in response to the command from the sending user by referring to the user management data of the sending user and the object software or by invoking a user-defined process procedure, sends the message to the second process of the computer of the software vendors of the object software, and returns to a standby state after recording transmission of the message.

29. The software distribution/maintenance method according to claim 25 or claim 26, wherein if the first process is activated in the one of the user computers by an input command from a program defined by the sending user or through an abnormal termination of the object software managed by the first process, the first process obtains a user name, a command name, and an object software name, promotes generation of a message in response to a command from the sending user by referring to the user management data of the sending user and the object software or by invoking a user-defined process procedure, sends the message to the second process in the at least one vendor computer, and returns to a standby state after recording transmission of the message.

30. The software distribution/maintenance method according to claim 25 or claim 26, wherein if the first process is activated in the one of the user computers by a message received from the network, then the first process obtains from a header of the answer message a destination user name identifying a specified user, a command name, and an object software name, uses the user management data for the specified user and the object software, then obtains a sender name from the header of the answer message, confirms that the message was sent by a correct vendor of the object software, also confirms that the first process is in an answer-wait state, refers to the user management data or invokes the user-defined process procedure depending on the command in the answer message, analyzes or stores message data or stores or installs the software specified by the answer message, returns, in response to a specific message which requires acknowledgment, an acknowledgment or a process state in an acknowledgment message to the second process via the network, and then returns to a standby state after recording transmission of the acknowledgment message.

31. The software distribution/maintenance method according to any of claim 25 to claim 27, wherein said first process performs following processes depending on a cause activating the first process:

when the sending user activates the first process in the sending user computers by inputting a command, the first process obtains a user name, a command name, and an object software name to generate an interactive screen displaying message according to the input command, promotes generation of a first message in response to the command from the sending user by referring to the user management data of the sending user and the object software or by invoking a user-defined process procedure, sends the message to the second process of the at least one vendor computer storing the object software, and returns to a standby state after recording transmission of the object software distribution/maintenance request message;

if the first process is activated in the one of the user computers by an input command from a program defined by the sending user or through an abnormal termination of the object software managed by the first process, the first process obtains a user name, a command name, and an object software name, promotes in response to an activated command generation of a second message in response to a command from the sending user by referring to the user management data of the sending user and the object software or by invoking a user-defined process procedure, sends the second message to the second process of the at least one vendor computer storing the object software, and returns to a standby state after recording transmission of the second message; and if the first process is activated in the one of the user computers by a received message from the network, then the first process obtains from a header of the received message a destination user name, a command name, and an object software name, uses the user management data for a specified user and the object software, then obtains a sender name from the header of the received message, confirms that the received message was sent by a correct vendor of the object software, also confirms that the first process is in an answer-wait state, refers to the user management data or invokes the user-defined process procedure depending on the command name in the received message, analyzes or stores message data or stores or installs the software specified by the received message, returns, if the received message requires acknowledgment, an acknowledgment message with an acknowledgment or a process state to the second process via the network, and then returns to a standby state after recording a transmission of the acknowledgment message.

32. The software distribution/maintenance method according to claim 31, wherein each time the first process is activated, a new process is generated to allow plural processes to be performed in parallel on processes other than for a single set of object software for a single user.

33. The software distribution/maintenance method according to claim 22 or claim 23, wherein when the second process in the at least one vendor computer offers services using the vendor software libraries, vendor management data, stored for each vendor software library, is referred to.

34. The software distribution/maintenance method according to claim 33, wherein when the second process refers to the vendor management data, reference is made corresponding to the vendor software library to at least vendor identification information, software management information, software configuration information, message process method specification information, customer information, update history information, and fault history information.

35. The software distribution/maintenance method according to claim 34, wherein when a message process method is referred to using the vendor management data, a procedure each function performed by the second process is invoked.

36. The software distribution/maintenance method according to claim 35, wherein when the message process method is referred to using the vendor management data, a user confirmation procedure can be invoked to confirm an identification of the sending user of the object software distribution/maintenance request message, determine a qualification of the sending user, and return an appropriate answer to the sending user.

37. The software distribution/maintenance method according to claim 36, wherein in the user confirmation procedure as a part of the vendor management data, the qualification of the sending user can be determined based on commercial relations including at least one of contracts relating to the object software, payments relating to the object software, and payments relating to new services for the object software.

38. The software distribution/maintenance method according to claim 36, wherein in the user confirmation procedure depending on the vendor management data, the object software is provided and distributed only to qualified users by referring to identification information including at least one of organizations, titles, and personal names thereof.

39. The software distribution/maintenance method according to claim 36, wherein in the user confirmation procedure as a part of the vendor management data, the user can be identified by a password.

40. The software distribution/maintenance method according to claim 22 or claim 23, wherein the one of the user computers and the at least one vendor computer are connected to the network only when sending and receiving messages between each other or a relaying device in the network.

41. The software distribution/maintenance method according to claim 22, or claim 23 wherein the object software distribution/maintenance request message transmitted via the network has a destination and a source of the message, and a title column specifying a name of a software distribution/maintenance system, a name of a software distribution/maintenance process type, and a name of the object software.

42. The software distribution/maintenance method according to claim 22, claim 23, or any of claims 33 to 39, wherein the second process in the at least one vendor computer is normally in a standby state, and upon being activated by receiving the object software distribution/maintenance request message from the first process via the network obtains a command name and an object software name of specified software from a header of the object software distribution/maintenance request message, assigns processes to be performed, obtains a name of the sending user and user identification information from the object software distribution/maintenance request message, compares the name of the sending user with vendor management data to determine a user access qualification relating to the command name, analyzes the object software distribution/ maintenance request message if the sending user qualifies, provides summary information of the specified software, provides new services for the specified software, supplies updated software and instructions to correctly update the specified software, retrieves information of other messages, generates the answer message, records a summary of the answer message to the sending user, sends the answer message to the first process of the sending user via the network, and returns to the standby state.

43. The software distribution/maintenance method according to claim 42, wherein each time the second process is activated, a new process is generated to allow a plurality of processes to be concurrently performed on processes other than for a single set of object software for a single user.

44. The software distribution/maintenance method according to claim 22, or claim 23 wherein when the users obtain summary information of the object software not yet used by the users, following processes are performed:

in the one of the user computers, the sending user enters a summary inquiry command, activates the first process in the one of the user computers, sets a name of specified object software, a name of a specified vendor, a network address of the specified vendor, and an answer information storage directory, and generates a summary information inquiry message;

the first process sends the summary information inquiry message to the second process of the specified vendor;

in the at least one vendor computer, the second process is activated when the summary information inquiry message is received via the network;

the second process refers to vendor management data about the specified object software cited by the summary information inquiry message to confirm an identification of the sending user and determine access qualification of the sending user;

invokes, if the sending user is qualified, a vendor-defined procedure to provide summary information in a summary information message; and sends the summary information message to the first process of the sending user via the network.

45. The software distribution/maintenance method according to claim 22 or claim 23, wherein when the users newly obtain the object software not yet used by the users, following processes are performed:

in the one of the user computers, the sending user enters a new installation command, activates the first process in the one of the user computers, sets user identification information, software information of specified object software, vendor identification information, and user installation process information, and generates a new installation request message; and the first process sends the new installation request message to the second process managing the specified object software;

in the at least one vendor computer, the second process is activated when the new installation request message is received via the network, the second process refers to vendor management data about the specified object software to confirm identification of the sending user and determine access qualification of the sending user;

invokes, if the sending user is qualified, a vendor-defined procedure for new installation to determine a version to be provided, obtains a set of modules of the version to be provided, organizes instruction information of the new installation in the one of the user computers, and generates a new installation message as the answer message, sends the new installation message as the answer message to the first process of the sending user via the network;

in the user computer, the first process is activated when the new installation message is received via the network, the first process obtains a name of a destination user and a name of specified object software from a header of the new installation message, refers to corresponding user management data, confirms that the first process is currently in a new installation standby state and that a correct vendor sent the new installation message, invokes a user-defined new installation process procedure, refers to installation information in the new installation message, stores the specified object software to be newly installed in the one of the user computers, installs the set of modules if the new installation is acceptable, records the new installation message and a process result, and returns to the standby state.

46. The software distribution/maintenance method according to claim 22, or claim 23, wherein when the users add or switch to a new service of the object software already used by the users, following processes are performed:

in the one of the user computers, the sending user enters a new service request command, activates the first process in the one of the user computers, sets user identification information, software information of specified object software, vendor identification information, and user installation process information, and generates a new service request message;

the first process sends the new service request message to the second process of the at least one vendor computer;

in the at least one vendor computer, the second process is activated when the new service request message is received via the network;

the second process refers to vendor management data about the specified object software cited by the new service request to confirm identification of the sending user and determine access qualification of the sending users, invokes, if the sending user is qualified, a vendor-defined procedure for a supply of the new service to determine a version to be provided, obtains a set of modules of the version to be provided, organizes instruction information of installation in the one of the user computers, specifies a process to be performed on an old service, generates a new installation message as an answer, and sends the new installation message as the answer to the first process of the sending user via the network;

in the user computer, the first process is activated when the new installation message is received via the network;

the first process obtains a name of a destination user and the name of the specified object software from a header of the new installation message, refers to corresponding user management data, confirms that the third process is currently in a new installation standby state and a correct vendor sent the new installation message, invokes a user-defined process procedure, refers to installation information in the new installation message, stores specified software supplied as the new service in the one of the user computers, stores the new service of the specified software if the new service is acceptable, records the new installation message and a process result, and returns to the standby state.

47. The software distribution/maintenance method according to claim 22 or claim 23, wherein when the users inquire of the vendors about an update state of installed object software already used by the users and request updated object software, following processes are performed:

in the one of the user computers, the sending user enters an update inquiry command, activates the first process in the one of the user computers, sets user identification information, software information of the installed object software, vendor identification information, software management information, and user installation process information, and generates an update inquiry message;

the first process sends the update inquiry message to the second process of a specified vendor identified by the vendor identification information;

in the at least one vendor computer, the second process is activated when the update inquiry message is received via the network;

the second process refers to vendor management data about the installed object software cited by the update inquiry message to confirm identification of the sending user and determine access qualification of the sending user, invokes, if the sending user is qualified, a vendor-defined update inquiry answering procedure to determine a version type to be supplied and a latest version and compares the latest version with a current version of the sending user;

if the current version of the sending user matches the latest version, then the second process generates a non-update message, and sends the non-update message to the first process of the sending user;

if the undated object software with the version type of the current version of the installed object software exists, then the second process generates module delete/add instruction information about modules to be added in an update instruction message as an answer, and sends the answer to the first process of the sending user via the network;

if the current version should be switched to a newly served version of the installed object software, then the second process generates the non-update message and an information message about the newly served version, and sends the non-update message and the information message to the first process of the sending user via the network;

in the one of the user computers, the first process is activated when a received message is the update instruction message or the non-update message received via the network;

the first process obtains a name of a destination user and a name of specified object software from a header of the received message, refers to corresponding user management data, and confirms that the first process is currently in a standby state after inquiry and that a correct vendor sent the received message;

if the non-update message is received, the first process records the non-update message and returns to the standby state;

if the update instruction message is received, the first process invokes a user-defined update reception process procedure, refers to the module delete/add instruction information in the received message, stores in the one of the user computers the specified object software specified by the update instruction message, installs the specified object software if the specified object software is acceptable, and records the received message and a process result, and returns to the standby state.

48. The software distribution/maintenance method according to claim 22 or claim 23, wherein when the users inquire about an update state of installed object software already used by the users and request updated object software, following processes are performed:

in the one of the user computers, the first process is activated according to an update inquiry command instruction of a user program, invokes a user-defined automatically-editing update inquiry procedure, refers to user management data, and generates an update inquiry message;

the first process sends the update inquiry message to the second process of a specified vendor of the installed object software;

in the at least one vendor computer, the second process is activated when the update inquiry message is received via the network;

the second process refers to vendor management data about the installed object software cited by the update inquiry message to confirm identification of the sending user and determine access qualification of the sending user, and invokes, if the sending user is qualified, a vendor-defined update inquiry answering procedure to determine a version type to be supplied and a latest version and compare the latest version with the current version of the sending user;

if the current version of the sending user matches the latest version, then the second process generates a non-update message, and sends the non-update message to the first process of the sending user;

if the installed object software of the version type of the current version of the sending user has been updated, then the second process generates module delete/add instruction information and information about modules to be added in an update instruction message as an answer, and sends the updated instruction message to the first process of the sending user via the network;

if the current version should be switched to a newly served version of the installed object software, then the second process generates a non-update message and an information message about the newly served version, and sends the non-update message to the first process of the sending user via the network;

in the user computer, the first process is activated when the update instruction message or the non-update message is received from the second process via the network;

the first process obtains a name of a destination user and a name of the object software from a header of a received message, refers to corresponding user management data, and confirms that the first process is currently in a standby state after inquiry and that a correct vendor sent the received message;

if the non-update message is received, the first process records the received message and returns to the standby state;

if the update instruction message is received, the first process invokes a user-defined update reception process procedure, refers to the module delete/add instruction information in the received message, stores in the one of the user computers the modules to be added specified by the update instruction message, installs the modules to be added if acceptable, records the received message and a process result, and returns to the standby state.

49. The software distribution/maintenance method according to any of claim 45 to claim 48, wherein if the first process receives a message from a sending vendor, and stores or installs in the one of the user computers new software, newly served software, or updated software received from the sending vendor, then the first process monitors a result of processes and sends to the second process via the network a process result confirmation message informing whether the processes have terminated normally or abnormally.

50. A software distribution/maintenance system having a plurality of user computers and a vendor computer to manage and automatically update object software provided for the plurality of user computers from the vendor computer, comprising:

network means for connecting the user computers to the vendor computer; and process means in each of the user computers, for sending current configuration information of the object software stored in the user computers to the vendor computer via said network means to inquire about a latest configuration, for receiving an answer from the vendor computer, and for updating the object software stored in the user computers according to an instruction in a received answer.

51. The software distribution/maintenance system according to the claim 50, wherein said process means in the user computers automatically informs via said network means the vendor computer of an abnormal termination and state if an operation of the object software abnormally terminates in the user computers.

52. The software distribution/maintenance system according to claim 51, wherein said process means automatically informs the vendor computer of the abnormal termination, an instruction causing the abnormal termination, a reason for the abnormal termination, a series of instructions which invoked the instruction causing the abnormal termination, and an environment of software and hardware used when the abnormal termination is detected.

53. The software distribution/maintenance system according to claim 51, wherein said process means automatically informs via said network means the vendor computer of the abnormal termination by general-purpose electronic mail.

54. A software distribution/maintenance system having a plurality of user computers and a vendor computer to manage and automatically update object software provided for the plurality of user computers from the vendor computer, comprising:

network means for connecting the user computers to the vendor computers; and process means in the vendor computer for receiving an inquiry from the user computer, for generating update instruction information for the object software to match a configuration of the object software in the user computer with the configuration of an updated version in an object software library stored in the vendor computer, and for returning via said network means to the user computer the update instruction information and the updated version of the object software.

55. A software distribution/maintenance method for managing and automatically updating a set of object software stored in user computers from a vendor computer via a network, comprising:

sending by a process in the user computers current configuration information of the object software to the vendor computer via the network to inquire about a latest configuration;

receiving by the process an answer with update instruction information from the vendor computer; and updating the object software according to the update instruction information about the object software to match a configuration of the object software with the latest configuration stored in an object software library in the vendor computer, including preparing for compiling and linking of programs if necessary.

56. The software distribution/maintenance method according to claim 55, wherein when the object software is activated in the user computers, the process in the user computers immediately sends the current configuration information of the object software to the vendor computer via the network to inquire about the latest configuration, receives the answer from the vendor computer, updates the object software according to the update instruction information in the answer, and prepares for compiling and linking of programs if necessary.

57. The software distribution/maintenance method according to claim 55, wherein when the process is activated in the user computers at a predetermined time, the process sends the current configuration information of the object software to the vendor computer via the network to inquire about the latest configuration, receives the answer from the vendor computer, updates the object software according to the update instruction information in the answer, and prepares for the compiling and linking of programs if necessary to realize an automatic update of the object software.

58. The software distribution/maintenance method according to claim 55, wherein when a user instructs the user computers to activate the process, the process sends the current configuration information of the object software to the vendor computer via the network to inquire about the latest configuration, receives the answer from the vendor computer, updates the object software according to the update instruction information in the answer, and prepares for the compiling and linking of programs if necessary.

59. The software distribution/maintenance method according to claim 55, wherein following processes are interchangeably performed:

when the object software is activated in the user computers, the process immediately sends the current configuration information of the object software to the vendor computer via the network to inquire about the latest configuration, receives the answer from the vendor computer, updates the object software according to the update instruction information in the answer, and prepares for compiling and linking of programs if necessary;

when the process is activated in the user computers at a predetermined time, the process sends the current configuration information of the object software to the vendor computer via the network to inquire about the latest configuration, receives the answer from the vendor computer, updates the object software according to the update instruction information in the answer, and prepares for the compiling and linking of programs if necessary to realize an automatic update of the object software; and when a user instructs the user computers to activate the process, the process sends the current configuration information of the object software to the vendor computer via the network to inquire about the latest configuration, receives the answer from the vendor computer, updates the object software according to the update instruction information in the answer, and prepares for the compiling and linking of programs if necessary.

60. A software distribution/maintenance method for managing and automatically updating a set of object software stored in user computers from a vendor computer via a network, comprising:

receiving by a process stored in the vendor computer an inquiry from an inquiring user computer about current configuration information of the object software, in the user computer;

generating update instruction information about the object software to update the current configuration of the object software in the user computer with a latest configuration version in an object software library in the vendor computer; and returning the update instruction information and an updated version of the object software to the inquiring user computer via the network.

61. A software distribution/maintenance system for managing distribution of object software via a network accessed by users of user computers who use sets of the object software distributed, managed, and maintained by software vendors who supply the users with the object software from at least one vendor computer, comprising:

a network for connecting each user computer and the at least one vendor computer; and process means in each user computer for executing the object software to be used by the users, for managing the sets of object software in each user computer, for sending via the network an object software distribution/maintenance request message according to an instruction of the users or an instruction of a user-written program to the at least one vendor computer which has a software library containing the object software, for receiving an answer message from the at least one vendor computer, and for distributing or maintaining the object software.

62. The software distribution/maintenance system according to claim 61, wherein when any object software managed by said process means in each user computer abnormally terminates during operation, said process means detects and analyzes an abnormal condition, and then automatically sends a fault report to the at least one vendor computer via said network.

63. The software distribution/maintenance system according to claim 61, wherein each user computer can store user management data for each of the users or each user group, and for each set of the object software; and said process means refers to the user management data to manage one or more sets of the object software.

64. The software distribution/maintenance system according to claim 63, wherein said user management data includes user identification information of each user or each user group, software management information of each set of the object software used by each user, software configuration information, and message process method specification information.

65. The software distribution/maintenance system according to claim 64, wherein in specifying a method of processing a message according to the user management data, the users can specify a process method as a procedure for each function performed by said process means.

66. The software distribution/maintenance system according to claim 65, wherein in specifying a method of processing a message according to the user management data, a vendor confirmation procedure can be used so that the vendor can be confirmed to protect user software.

67. A software distribution/maintenance system for managing distribution of object software via a communications network accessed by users of user computers use sets of the object software distributed, managed, and maintained by software vendors who supply the users with the object software from at least one vendor computer, comprising:

network means for connecting each user computer and the at least one vendor computer;

vendor software libraries; and process means for providing services relating to said vendor software libraries, for receiving an object software distribution/maintenance request message from an inquiring user computer via said network means, for referring to one of said vendor software libraries, managed by a vendors according to contents of the object software distribution/maintenance request message and settings of the vendor, for generating an answer message in response to the object software distribution/maintenance request message, and for sending the answer message to the inquiring user computer via said network means.

68. The software distribution/maintenance system according to claim 67, wherein when any object software abnormally terminates during operation in one of the user computers, said process means sends a fault report received from the one of the user computers via said network means to the vendor of the object software which abnormally terminated.

69. The software distribution/maintenance system according to claim 67, wherein when said process means of the at least one vendor computer offers services using said vendor software libraries, said process means refers to vendor management data stored for each vendor software library.

70. The software distribution/maintenance system according to claim 69, wherein said vendor management data can be designed to comprise vendor identification information, software management information, software configuration information, message process method specification information, customer information, and fault history information.

71. The software distribution/maintenance system according to claim 70, wherein when a message process method is specified using the vendor management data, the software vendors can specify the message process method as a procedure for each function performed by said process means.

72. The software distribution/maintenance system according to claim 70, wherein a user confirmation procedure can be selected when a message process method is specified using the vendor management data.

73. A software distribution/maintenance method for managing distribution of object software via a network accessed by users of user computers who use sets of the object software distributed, managed, and maintained by software vendors who supply the users with the object software from at least one vendor computer using, in each user computer, the object software to be used by the users and a process managing the sets of the object software, and the network connecting each user computer and the at least one vendor computer, comprising:

activating by the users the process through a command input by the users or through a command from a user-written program;

sending by the process via the network an object software distribution/maintenance request message to the at least one vendor computer from which the object software is provided;

receiving by the process the answer message from the at least one vendor computer; and performing processes for at least one of distributing and maintaining the object software according to the answer message and settings made by the users.

74. A software distribution/maintenance method for managing distribution of object software via a network accessed by users of user computers who use sets of the object software distributed, managed, and maintained by software vendors who supply the users with the object software using, in each vendor computer, vendor software libraries and a vendor process providing services relating to the vendor software libraries, the network connecting each user computer and each vendor computer, said software distribution/maintenance method comprising:

receiving by the vendor process an object software distribution/maintenance request message from one of the user computers via the network;

referring by the vendor process to the vendor software libraries managed by one of the vendors according to the object software distribution/maintenance request message and settings made by the one of the vendors;

generating an answer message in response to the object software distribution/maintenance request message; and sending the answer message to the one of the user computers which issued the object software distribution/maintenance request message.

75. A software distribution and maintenance system using a network in which a plurality of users using a number of types of object software to be distributed, managed, and maintained, and a plurality of software vendors supplying the object software manage the distribution and maintenance of the object software over a computer network, comprising:

one or more first process means CP installed in each of user computers, that manage a plurality of object software groups to be used by one or more users individually for every object software and for every user;

one or more second process means installed in one or more software vendor computers, that each providing services to a Plurality of vendor software libraries for each of the software libraries; and a network that connects the first process means installed in the user computer to the second process means, based on standardized communications protocols, said first process means having a capability to perform distribution or maintenance of the object software by sending a message a request of distribution or maintenance of the object software for one piece of object software over the network, according to instructions given by one or more of the users or a user defined program, receiving an answer message from the second process means SP, and processing based on contents of the answer message and settings made by the users, and said second process means having a capability to receive the message from each first process means to reference one or more of the software libraries managed by one or more of the vendors depending on the contents of the message and settings made by the vendors for the object software specified with the message, to generate the answer message to answer the request of distribution or maintenance of the object software, and to send the answer message to said first process means that generated the message.

76. The software distribution and maintenance system using a network according to claim 75, used by the users taking advantage of one or more pieces of the object software included in the object software groups, and the vendors supplying one or more pieces of the object software in the object software groups, wherein one or more computers each comprise both said one or more first process programs and said one or more second process means.

77. The software distribution and maintenance system using a network according to claim 75, wherein the message, sent and received over said network between said first process means installed in one of the user computers, and said second process means installed in one of the vendor computers, consists of a header part of the message, an attribute part as fixed data, an instructing part as a specific request and instruction data, and a module part as corresponding software.

78. The software distribution and maintenance system using a network according to claim 75, wherein the attribute part forming a part of the message is configured as hierarchical structure data of a pair of a keyword and a value, facilitates referencing and updating management data for user set for every object software and for every user, and management data for vendor set for every object software library and for every vendor.

79. User computers used in a software distribution and maintenance system using a network in which a plurality of users using a plurality of types of object software to be distributed, managed, and maintained, and a plurality of software vendors supplying the object software manage the distribution and maintenance of the object software over said network, comprising:

one or more process means that manage a plurality of object software groups to be used by the users individually for every object software and for every user using the object software; and storage means for storing management data for user set for every user for every object software and user process procedures which are process procedures for said process means to distribute and maintain the object software, set for every object software and for every user, said process means calling said user process procedures to reference the management data for user, send a message to request distribution and maintenance of the object software to the vendor of the object software over said network according to standardized protocols in the system, and perform distribution and maintenance of the target software.

80. The user computers in the software distribution and maintenance system using a network according to claim 79, wherein the management data for user includes user identification information corresponding to each user, vendor identification information corresponding to each object software vendor, software identification information corresponding to each object software, and environment information.

81. The user computers in the software distribution and maintenance system using a network according to claim 79, wherein each user process procedure comprises:

message-editing procedures that edit a message to request distribution and maintenance sent from said user process procedure to the vendor of the object software;

a vendor verification procedure that verifies a vendor of the object software; and reception process procedures that process an answer message from the vendor of the object software.

82. The user computers in the software distribution and maintenance system using a network according to claim 79, each comprises said management data for user, said user process procedures, and said first process means for each of the plurality of versions of the object software so that every user can utilize the plurality of versions.

83. The user computers in the software distribution and maintenance system using a network according to claim 79, each comprises data for specifying a plurality of versions for said management data for user, and both said user process procedures and said first process means for the plurality of versions so that every user can utilize a plurality of versions of an identical piece of the object software at the same time.

84. A vendor computer in a software distribution and maintenance system using a network in which a plurality of users using a plurality of types of object software to be distributed, managed, and maintained, and a plurality of software vendors supplying the object software manage the object software distribution for distributing the object software over said network, comprising:

at least one process means for providing services of each of the software libraries and each of the vendor software libraries; and storage means for storing management data for vendor set for every vendor and for every software library, and vendor process procedures which are process procedures for said process means to distribute and maintain the object software on the user computers, set for every vendor and for every software library, said process means performing a corresponding process for a message of the object software from the user, set for every vendor and for every object software library.

85. The vendor computer in the software distribution and maintenance system using a network according to claim 84, wherein said management data for each vendor includes user identification information concerning all the users of the object software, vendor identification information concerning the vendor of the object software library, software information concerning the object software library, and environment information.

86. The vendor computer in the software distribution and maintenance system using a network according to claim 84, wherein said vendor process procedures include a user qualification verification procedure for the object software, an unqualified user process procedure, reception and answer process procedures for analyzing a message received from the user, and generating an answer message.

87. The vendor computer in the software distribution and maintenance system using a network according to claim 84, wherein said object software library includes a plurality of versions of the object software, and said process means corresponding to the object software library gives services to said object software library using management data for vendor and vendor process procedures that correspond to a plurality of versions.

88. A software distribution and maintenance method in which a plurality of users using a plurality of types of object software to be distributed, managed, and maintained, and a plurality of software vendors supplying the object software, manage distribution and maintenance of the object software, said method utilizing at least one first process in each of a plurality of user computers, that manage object software groups to be used by the users individually for every object software and for every user using the object software, at least one second process in vendor computers, that provide services to vendor software libraries for each of the vendor software libraries, and a network that connects the user computers to the vendor computers standardized communication protocols, said method comprising:

invoking a first process with a command entered by one of the users on one of the user computers or with a command invoked from a user-defined program;

sending a request message from the first process to request distribution or maintenance of at least one piece of the object software to a second process managing at least one of the vendor software libraries of the object software;

receiving the request message by the second process in one of the vendor computers;

generating an answer message to answer the request message by referencing at least one of the vendor software libraries managed by at least one of the software vendors for the at least one piece of the object software specified by the request message;

returning the answer message to the first process;

receiving the answer message by the first process; and processing the answer message depending on contents of the answer message and settings made by the one of the users for the distribution or maintenance of the at least one piece of the object software.

89. The software distribution and maintenance method using a network according to claim 88, wherein the first process means installed in the user computers, which is invoked with a command entered by the user on the user computers, or a command in a user-defined program, calls a message-editing procedure which is one of user process procedures for distributing and maintaining the object software, edits a message to request distribution and maintenance based on the standardized protocols within the system while referencing the management data for user set for message and generating an answer message, references the object software library while referencing and updating said management data for vendor, and generates an answer message for distribution and maintenance of the object software in response to the received message to request distribution and maintenance, and returns the answer message to the first process means.

90. The software distribution and maintenance method using a network according to claim 88, wherein the first process installed in the user computers, receives the answer message returned from the second process in response to the request message sent by the first process to request distribution or maintenance of the object software, verifies that the answer message is returned from a legal vendor, calls a reception process procedure which is one of user process procedures set for the one of the users and for the object software, performs distribution and maintenance of the object software according to contents of the answer message, and prepares for execution of the object software according to a determination made by the first process while referencing and updating management data for user set for the one of the users and for the object software.

91. The software distribution and maintenance method using a network according to claim 88, wherein the first process installed in the one of the user computers receives the answer message returned by the second process in response to the request message sent by the first process to request distribution and maintenance of the object software, performs distribution and maintenance of the object software according to the answer message, and then automatically returns a response message to the second process indicating whether the distribution and maintenance was properly executed on the one of the user computers.

92. The software distribution and maintenance method using a network according to claim 88, wherein said second process installed in the vendor computers receives the request message from the first process to request distribution and maintenance of the object software belonging to the vendor software libraries managed by the second process, verifies that the request message to request distribution and maintenance is sent from a legal user by referencing user identification information included in vendor management data set for the software vendors and for the vendor software libraries, calls a reception/answer process procedure for analyzing the request message and generating the answer message, references the at least one of the vendor software libraries while referencing and updating the vendor management data, generates the answer message for distribution and maintenance of the object software in response to the request message to request distribution and maintenance, and returns the answer message to the first process.

93. The software distribution and maintenance method using a network according to claim 88, wherein a message, which is sent and received over the network between the first process means (CP) installed in one of the user computers and the second process means installed in one of the vendor computers, consists of a header part of the message, an attribute part as fixed data, an instructing part, a specific request and instruction data, an instructing part as instruction data, and a module part as corresponding software.

94. A method for purchasing new software in a software distribution and maintenance system using a network, in which a plurality of users using a plurality of types of object software to be distributed, managed, and maintained, and a number of software vendors supplying the object software manage the distribution and maintenance of the object software over a network, comprising:

one of the users sending a message to request summary information of the object software from first process means in the user computers to second process means over said network by use of any of the first process means which simply has the capability to request summary information and of receiving an answer message to the request of summary information;

the second process means providing basic components of the first process means and user process procedures sufficient for a new purchase of the object software as part of the answer message in response to the summary inquiry to the user computers over the network;

the user sending a message to request a new purchase to the second process means over the network using the basic components of the first process means and the user process procedures;

the second process means providing the whole set of said first process means and user process procedures appropriate for the distribution and maintenance of the object software to the user's first process means over the network;

the user computers thereafter distributing and maintaining the object software using the first process means and the user process procedures.

* * * * *

UNITED STATES PATENT AND TRADEMARK OFFICE

CERTIFICATE OF CORRECTION

PATENT NO. : 5,835,911

DATED : November 10, 1998

INVENTOR(S) : Nakagawa et al.

It is certified that error appears in the above-identified patent and that said Letters Patent is hereby corrected as shown below:

Title Page, [73], "Kanagawa" should be --Kawasaki--.

Col. 4, line 24, "method" should be --method.--.

Col. 9, line 54, BEGIN A NEW PARAGRAPH with "The second..."

Col. 10, line 17, "stared" should be --stored--;
line 49, delete "is".

Col. 11, line 54, BEGIN A NEW PARAGRAPH with "The first...";
line 62, "1a" should be --3a--.

Col. 13, line 2, BEGIN A NEW PARAGRAPH with "The user...";
line 17, "U2," should be --U2,.....--.

Col. 18, line 37, "user" should be --user.--.

Col. 22, line 38, BEGIN A NEW PARAGRAPH with "Furthermore..";
line 55, BEGIN A NEW PARAGRAPH with "If the..."

Col. 24, line 16, "S11" should be -- SL1--;
line 59, "SL2," should be --SL2,....--.

Col. 27, line 17, "De" should be --be--;
line 40, "intra-of fice" should be --intra-office--.

Col. 28, line 32, "by" should be --by an--;
line 61, "stores;" should be --stores--.

UNITED STATES PATENT AND TRADEMARK OFFICE

CERTIFICATE OF CORRECTION

PATENT NO. : 5,835,911

DATED : November 10, 1998

INVENTOR(S) : Nakagawa et al.

It is certified that error appears in the above-identified patent and that said Letters Patent is hereby corrected as shown below:

Col. 32, line 25, "13" should be --B--;
line 28, after "information" insert --is--.

Col. 36, line 3, "software" should be --software.--;
line 49, "follow ing" should be --following--.

Col. 37, line 6, "Asoftware" should be --A software--.

Col. 38, line 16, "Fig. 6" should be --Fig. 8--.

Col. 42, [Table 2], "ANSER" should be --ANSWER--.

Col. 43, line 2, "process" should be --process.--;
line 16, "a" should be --□--;
line 17, "A" should be --Δ--;
line 37, "Δ" should be --□--.

Col. 45, line 15, "0" should be --□--;
line 36, "Δ" should be --□--.

Col. 46, line 27, "of" should be --of user--;
line 62, "□" should be --0--.

Col. 55, line 50, " 1" " should be --1'--.

Col. 56, line 35, BEGIN A NEW PARAGRAPH with "In step.."

Col. 67, line 5, "auser" should be --a user--.

UNITED STATES PATENT AND TRADEMARK OFFICE
CERTIFICATE OF CORRECTION

PATENT NO. : 5,835,911

DATED : November 10, 1998

INVENTOR(S) : Nakagawa et al.

It is certified that error appears in the above-identified patent and that said Letters Patent is hereby corrected as shown below:

Col. 72, line 53, "S1" should be --SL--.

Col. 74, line 5, "With-these" should be --With these--;
line 52, User 1" should be --User 1@--;
line 53, BEGIN A NEW PARAGRAPH with "Subject:..."

Col. 75, line 11, "itself" should be --itself.--;
line 29, "is" should be --is,--;
line 32, "mb.2" should be --Mb.2--.

Col. 76, line 34, "data" should be --data)--.

Col. 78, line 39, delete entire line.

Col. 80, line 9, "Me.2" should be --Mb.2--.

Col. 82, line 63, "Object" should be --object--.

Col. 84, line 27, BEGIN A NEW PARAGRAPH with "The software..."

Col. 87, line 45, delete ",".

Col. 91, line 59, delete "Step S78:";
line 60, before "The" insert new line with --Step S78--.

Col. 92, line 37, "(C?)" should be --(CP)--;
line 43, "383" should be --S83--.

UNITED STATES PATENT AND TRADEMARK OFFICE

CERTIFICATE OF CORRECTION

PATENT NO. : 5,835,911

DATED : November 10, 1998

INVENTOR(S) : Nakagawa et al.

It is certified that error appears in the above-identified patent and that said Letters Patent is hereby corrected as shown below:

Col. 94, line 48, after "software." continue with line 50 (NO NEW PARAGRAPH).

Col. 98, line 67, after "wherein" START A NEW PARAGRAPH with "a user...".

Col. 99, line 5, "Each" should be --each--;
line 65, "after "wherein" START A NEW PARAGRAPH with "the user...".

Col. 101, line 5, after "message," START A NEW LINE with "returns,..".

Col. 111, line 44, "vendors" should be --vendor,--.

Col. 112, line 66, delete "CP".

Col. 113, line 5, "Plurality" should be --plurality--.

Col. 115, line 30, after "computers" (second occurrence) insert --and uses--.

Signed and Sealed this

Twentieth Day of July, 1999

Attest:

Q. TODD DICKINSON

*Attesting Officer*

*Acting Commissioner of Patents and Trademarks*